United States Patent
Takano et al.

(10) Patent No.: US 7,346,034 B2
(45) Date of Patent: Mar. 18, 2008

(54) CELLULAR SYSTEM, MOBILE STATION, BASE STATION AND TRANSMISSION POWER CONTROL METHOD AS WELL AS PROGRAM TO BE EXECUTED FOR IMPLEMENTING THE METHOD

(75) Inventors: Nahoko Takano, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 950 days.

(21) Appl. No.: 10/642,896

(22) Filed: Aug. 14, 2003

(65) Prior Publication Data

US 2005/0043051 A1    Feb. 24, 2005

(30) Foreign Application Priority Data

Aug. 14, 2002 (JP) .............................. 2002-236280

(51) Int. Cl.
*H04Q 7/00* (2006.01)
(52) U.S. Cl. ........................................ 370/331; 455/522
(58) Field of Classification Search .................... None
See application file for complete search history.

(56) References Cited

FOREIGN PATENT DOCUMENTS

JP          11-261480        3/2000

OTHER PUBLICATIONS

R1-02-0760, Simulation Results on HS-DPCCH power control, downloadable from the Internet, pp. 1-12, May 2002.*
R1-02-1315, Modified TP for HS-DPCCH operation in SHO, downloadable from the Internet, pp. 1-5, Nov. 2002.*
TSGR1-02-0719, HS-DPCCH Power Control in Soft-Handoff, downloadable from the Internet, pp. 1-12, May 2002.*
Akhtar et al, A Comparative Study of Power Control Strategies for Soft Handover in UTRA FDD WCDMA System, IEEE, pp. 2680-2684, 2001.*

* cited by examiner

*Primary Examiner*—Frank Duong
(74) *Attorney, Agent, or Firm*—Katten Muchin Resenman LLP

(57) ABSTRACT

In a cellular system, each mobile station concurrently linked to plural link base stations in soft handover state and receiving packet from the packet-transmitting base station controls a transmission power of an up-link dedicated physical channel based on a first transmission power control information included in down-link dedicated physical channels of the link base stations. In other state, the mobile station controls the transmission power based on a second transmission power control information included in a down-link dedicated physical channel of the packet-transmitting base station. This accelerates the power increase up to a target power level causing that the measured signal-to-interference-ratio at the packet-transmitting base station reaches a target signal-to-interference-ratio, thereby improving receiving quality of control signal from the mobile station at the packet-transmitting base station.

58 Claims, 18 Drawing Sheets

PRIOR ART

PRIOR ART

PRIOR ART

CELLULAR SYSTEM, MOBILE STATION, BASE STATION AND TRANSMISSION POWER CONTROL METHOD AS WELL AS PROGRAM TO BE EXECUTED FOR IMPLEMENTING THE METHOD

BACKGROUND OF THE INVENTION

1. Field of the Invention

The present invention relates to a cellular system, a mobile station, a base station, and a transmission power control method as well as a program to be executed for implementing the method, and more particularly to a method of controlling a transmission power for a high speed data transmission from a base station through a down-link to a mobile station in a cellular system.

All of patents, patent applications, patent publications, scientific articles and the like, which will hereinafter be cited or identified in the present application, will, hereby, be incorporated by references in their entirety in order to describe more fully the state of the art, to which the present invention pertains.

2. Description of the Related Art

In 3rd Generation Partnership Project, a high speed down-link packet access (HSDPA) has been proposed as a method for a high speed data transmission through a down-link from a base station to a mobile station in the cellular system.

This high speed down-link packet access (HSDPA) utilizes a high-speed physical down-link shared channel (HS-PDSCH) for data transmission through the down-link from the base station to the mobile station. This high-speed physical downlink shared channel (HS-PDSCH) is used for data transmission from each base station to a plurality of mobile stations, wherein the base station or its control station decides a schedule for time division data transmissions at different timing to the plural mobile stations.

Each dedicated physical channel (DPCH) is provided between each base station and each of plural mobile stations belonging to the each base station for bi-directional data transmissions between the each base station and the plural mobile stations belonging to the each base station, wherein the each dedicated physical channel (DPCH) provides a down-link for transmitting signals or data from the base station to the mobile station and a up-link for transmitting the signals or data from the mobile stations to the base station.

The each mobile station has a small ratio of time to receive data through the high-speed physical downlink shared channel (HS-PDSCH). Notwithstanding, the each mobile station is configured to continuously set the dedicated physical channel (DPCH) to the base station, to which this mobile station belongs, during a stand-by state for receiving data, so as to enable a prompt commence of the data transmission upon receipt of a request for the data transmission. The each base station can establish a current data transmission to one of the plural mobile stations, while can establish plural the dedicated physical channels (DPCH) to the remaining plural mobile stations which are in the stand-by state.

A soft handover can be used in the cellular system for concurrently establishing plural channels between each mobile station and plural base stations. Plural base stations transmit a common pilot signal at a predetermined transmission power, so that each of the mobile stations can establish the dedicated physical channel (DPCH) to one of the plural base stations, which has transmitted the common pilot signal with a maximum received power. Namely, the each mobile station receives the plural common pilot signal with possible different receiving powers from the plural base stations. The each mobile station detects one common pilot signal with the maximum receiving power, so that the each mobile station establishes the dedicated physical channel (DPCH) to the base station which has transmitted the common pilot signal with the maximum receiving power. In accordance with the soft handover technique, the each mobile station further establishes another dedicated physical channel (DPCH) to another base station which has transmitted the common pilot signal with a receiving power which is slightly lower than the above maximum receiving power. Namely, the each mobile station can establish concurrently the plural dedicated physical channels (DPCH) to plural base stations. The base station which establishes the dedicated physical channel (DPCH) during the soft handover will, hereinafter, be referred to as "link base station".

The cellular system utilizes a high speed closed loop transmission power control. For control of the transmission power through the up-link of the dedicated physical channel (DPCH), the base station utilizes a discrete pilot signal included in the up-link signal transmitted through the up-link in order to measure a received signal-to-interference-ratio (SIR) and compare the measured value to a predetermined target signal-to-interference-ratio (SIR). If the measured value is smaller than the target value, then the base station generates a transmit power control bit (TPC_UP) which indicates the power-up, and transmits the down-link signal including this transmit power control bit (TPC_UP) to the mobile station through the down-link. If the measured value is not smaller than the target value, then the base station generates another transmit power control bit (TPC_DOWN) which indicates the power-down, and transmits the down-link signal including this transmit power control bit (TPC_DOWN) to the mobile station through the down-link. Upon receipt of the transmit power control bit (TPC), the mobile station adjusts to increase or decrease the transmission power based on the received transmit power control bit (TPC).

A method of deciding the transmission power control from the received transmit power control bit (TPC) is disclosed in 3GPP TS25. 214 v.5.1.0 (2002-06) "3rd Generation Partnership Project:Technical Specification Group Ratio Access Network:Physical Layer Procedures (FDD) (Release 5)". In this method, the following two algorithms are presented.

In accordance with the first algorithm, upon receipts every time of the transmit power control signals (TPC), the mobile station adjusts the transmission power of the dedicated physical channel (DPCH) in accordance with the received transmit power control signal (TPC). In case that the transmit power control signals (TPC) are used together with the soft handover, the mobile station receives respective transmit power control signals (TPC) from the plural link base stations. If at least one of the received plural transmit power control signals (TPC) is TPC_DOWN, then the mobile station decreases the transmission power of the dedicated physical channel (DPCH). If all the received plural transmit power control signals (TPC) are TPC_UP, then the mobile station increases the transmission power of the dedicated physical channel (DPCH). This transmission power control enables that a receiving quality of the up-link signal satisfies the target signal-to-interference-ratio (SIR), and also prevents that receiving qualities of all the up-link signals to all the link base stations exceed the target signal-to-interference-ratio (SIR), as an upper limit, thereby avoiding any substantive increase of an interference wave power of the up-link.

In accordance with the second algorithm, the mobile station does not change or adjust the transmission power until the mobile station has received the transmit power control signals (TPC) five times after the mobile station has made the last transmission power control. Upon the fifth receipt of the transmit power control signal (TPC) after the mobile station has made the last transmission power control, then the mobile station adjusts the transmission power based on a synthesized signal of the five received transmit power control signals (TPC). If all of the five received transmit power control signals (TPC) indicate the increase of the transmission power, then the synthesized transmit power control signal (TPC) also indicates the increase of the transmission power. If all of the five received transmit power control signals (TPC) indicate the decrease of the transmission power, then the synthesized transmit power control signal (TPC) also indicates the decrease of the transmission power. If all of the five received transmit power control signals (TPC) do not indicate either the decrease or the increase uniformly, then the synthesized transmit power control signal (TPC) indicates no change of the transmission power.

In case that the last-described second algorithm is used together with the soft handover, the mobile station does not change or adjust the transmission power until the mobile station has received the transmit power control signals (TPC) five times from each of the link base stations after the mobile station has made the last transmission power control to each of the link base stations. Upon the fifth receipt of the transmit power control signal (TPC) from each of the link base stations after the mobile station has made the last transmission power control to the each of the link base stations, then the mobile station adjusts the transmission power to the each of the link base stations based on the each synthesized signal of the five received transmit power control signals (TPC) from the each of the link base stations. Namely, the mobile station generates respective synthesized signals for the plural link base stations, respectively, wherein each of the synthesized signals depends on the five received transmit power control signals (TPC) from each of the plural link base stations. If the number of the synthesized signals indicating the decrease of the transmission power exceeds a predetermined number, then the mobile station decreases the transmission power to the plural link base stations. If the number of the synthesized signals indicating the increase of the transmission power exceeds a predetermined number, then the mobile station increases the transmission power to the plural link base stations. If the number of the synthesized signals indicating the decrease of the transmission power exceeds the predetermined number and the number of the synthesized signals indicating the increase of the transmission power exceeds the predetermined number, then the mobile station does not change the transmission power to the plural link base stations.

Consequently, the use of the second algorithm makes the transmission power control cycle slower as compared to the use of the first algorithm. The slow transmission power control cycle means an undesired slow follow-up to the variation in quality of the received signals. The synthesis of the five or plural transmit power control signals (TPC) reduces the probability of undesired erroneous controls to be made. The co-use of the second algorithm with the soft handover allows the mobile station to increase the transmission power, but only when the number of the link base stations requesting the increase of the transmission power exceeds the predetermined number. This is effective to reduce the interference wave power of the up-link.

As described above, the transmission power control and the soft handover are effective techniques for reducing the transmission power and the interference wave power in order to increase a line capacity in a wire-less access system, particularly a code division multiple access (CDMA).

FIG. 1 is a schematic view illustrative of the general operation in the conventional cellular system. During soft handover, as shown in FIG. 1, a mobile station 32 can concurrently establish plural dedicated physical channels (DPCH) to plural base stations 31-1 and 31-2, while the mobile station 32 can concurrently establish only a single high-speed physical downlink shared channel (HS-PDSCH) to one base station 31-1. Since the high-speed physical downlink shared channel (HS-PDSCH) is the common channel, then it is necessary to notice which mobile station is set as a destination for receiving a transmission packet.

Informations about the mobile station as the destination for receiving the transmission packet and also control informations necessary for receiving the packet are transmitted through a high-speed shared control channel (HS-SCCH). It should also be noted that the mobile station 32 can concurrently establish only a single high-speed shared control channel (HS-SCCH) to one base station 31-1. Further, it is necessary that the mobile station 32 sends the base station 31-1 a delivery acknowledge notification (acknowledge/non-acknowledge signal: ACK/NACK signal) which indicates whether or not the mobile station 32 has safely received the packet transmitted through the high-speed physical downlink shared channel (HS-PDSCH). This delivery acknowledge notification is transmitted through a high-speed dedicated physical control channel (HS-DPCCH) as the up-link from the mobile station 32 to the base station 31-1.

FIG. 2 is a diagram illustrative of respective formats of the high-speed dedicated physical control channel (HS-DPCCH) as the up-link and the dedicated physical channel (DPCH) as the other up-link. The dedicated physical channel (DPCH) comprises a dedicated physical control channel (DPCCH) and a dedicated physical data channel (DPDCH). The dedicated physical control channel (DPCCH) includes discrete pilot channels "Pilot", discrete transmit power control bits "TPC", and discrete feedback informations "FBI". The dedicated physical data channel (DPDCH) comprise data "Data" which include user informations and control informations. The dedicated physical control channel (DPCCH) and the dedicated physical data channel (DPDCH) are modified and multiplexed for subsequent transmission.

The high-speed dedicated physical control channel (HS-DPCCH) has a single slot length corresponding to three slots of each of the dedicated physical control channel (DPCCH) and the dedicated physical data channel (DPDCH). One slot of the dedicated physical control channel (DPCCH) comprises a single set of the pilot channel "Pilot", the transmit power control bit "TPC" and the feedback information "FBI". One slot of the dedicated physical data channel (DPDCH) comprises a single set of data "Data". The single slot length of the high-speed dedicated physical control channel (HS-DPCCH) includes a delivery acknowledge notification (acknowledge/non-acknowledge signal: ACK/NACK signal) and a channel quality indicator (CQI) which indicates the quality of the down-link. A judgement of the acknowledge/non-acknowledge signal (ACK/NACK) included in the high-speed dedicated physical control channel (HS-DPCCH) is made by the base station which has the high-speed dedicated physical control channel (HS-DPCCH) and has transmitted the packet. For this reason, any diversity synthesis between the base stations is not made.

The up-links of the dedicated physical channels (DPCH) are subjected to a diversity synthesis between the link base stations 31-1 and 31-2, wherein the diversity synthesis is made by a wire-less network control station (BSC) as shown in FIG. 1. This dedicated physical channel (DPCH) is subjected to the above-described high speed closed loop transmission power control, so that the dedicated physical channel (DPCH) has a predetermined receiving quality. A transmission power (PH) of the high-speed dedicated physical control channel (HS-DPCCH) is equal to a sum of a transmission power (PD) of the dedicated physical channel (DPCH) and a predetermined offset power (.).

$$PH=PD+. \quad (1)$$

The base station, which transmitted the packet, judges whether or not the mobile station has safely received the packet, based on the received acknowledge/non-acknowledge signal (ACK/NACK) included in the high-speed dedicated physical control channel (HS-DPCCH). If the base station judged that the mobile station has not safely received the packet based on the non-acknowledge signal (NACK), then the base station will transmit again the same packet to the mobile station for avoiding any packet loss.

If the delivery acknowledge notification erroneously and incorrectly indicates "ACK" even the mobile station has in fact not safely received the packet, then the base station miss-judged that the mobile station has safely received the packet, and the base station does not transmits the packet again, whereby the mobile station does not receive the packet. Namely, the problem with the packet loss will be raised. It is necessary that a receiving error rate of the non-acknowledge signal (NACK) is much lower than another receiving error rate of the acknowledge signal (ACK). In other words, a sufficiently high receiving quality of the acknowledge/non-acknowledge signal (ACK/NACK) at the base station which transmitted the packet is needed.

If no countermeasure is made to the above-issues, then this allows a deterioration of the receiving quality of the acknowledge/non-acknowledge signal (ACK/NACK) through the following operations or processes. During the soft handover, a transmission power of an up-link dedicated physical channel (UL-DPCH) as a reference to the transmission power of the dedicated physical channel (DPCH) is controlled as follows. If the received signal-to-interference-ratio (SIR) of the up-link dedicated physical channel (UL-DPCH) is larger than a predetermined reference signal-to-interference-ratio (SIR), then the link base station transmits the transmit power control signal (TPC) which indicates the decrease of the transmission power. If the synthesized received signal-to-interference-ratio (SIR) is smaller than the predetermined reference signal-to-interference-ratio (SIR), then the link base station transmits the transmit power control signal (TPC) which indicates the increase of the transmission power.

During the soft handover, in accordance with the first algorithm, the mobile station receives the respective transmit power control signals (TPC) from the respective link base stations. If all of the received transmit power control signals (TPC) indicate the increase of the transmission power (TPC_UP), then the mobile station increases the transmission power of the dedicated physical channel (DPCH). If at least one of the received transmit power control signals (TPC) indicate the decrease of the transmission power (TPC_DOWN), then the mobile station decreases the transmission power of the dedicated physical channel (DPCH).

During the soft handover, in accordance with the second algorithm, the mobile station receives the respective transmit power control signals (TPC) from the respective link base stations. If the number of the synthesized signals indicating the decrease of the transmission power exceeds a predetermined number, then the mobile station decreases the transmission power to the plural link base stations. If the number of the synthesized signals indicating the increase of the transmission power exceeds a predetermined number, then the mobile station increases the transmission power to the plural link base stations. If the number of the synthesized signals indicating the decrease of the transmission power exceeds the predetermined number and the number of the synthesized signals indicating the increase of the transmission power exceeds the predetermined number, then the mobile station does not change the transmission power to the plural link base stations.

In the above-case, even if the received signal-to-interference-ratio (SIR) of the up-link dedicated physical channel (UL-DPCH) of the packet-transmitting base station is less than the reference signal-to-interference-ratio (SIR), and if the received signal-to-interference-ratios (SIR) of the up-link dedicated physical channels (UL-DPCH) of the other base stations are more than the reference signal-to-interference-ratio (SIR), and if the above-conditions for increasing the transmission power are not satisfied, then the mobile station does not increase the transmission power of the up-link dedicated physical channels (UL-DPCH), thereby causing a deterioration of the received signal-to-interference-ratio (SIR) of the up-link dedicated physical channel (UL-DPCH) of the packet-transmitting base station, resulting also in a deterioration in the receiving quality of the high-speed dedicated physical control channel (HS-DPCCH).

There are two conventional methods for solving the above problems. The first conventional method is that the mobile station controls the transmission power of itself based on only the transmit power control signal (TPC) transmitted from the packet-transmitting base station even when the mobile station executes the soft handover. This first conventional method will hereinafter be referred to as "first conventional technique". In accordance with this first conventional technique, the transmission power of the mobile station is so controlled that the received signal-to-interference-ratio (SIR) of the up-link dedicated physical channel (UL-DPCH) of the packet-transmitting base station satisfies the reference signal-to-interference-ratio (SIR), in order to improve the receiving quality of the high-speed dedicated physical control channel (HS-DPCCH), thereby improving the receiving quality of the acknowledge/non-acknowledge signal (ACK/NACK).

In accordance with the first conventional technique, only when the mobile station is on the receipt of the packet from the packet-transmitting base station, then the mobile station performs the transmission power control based on only the transmit power control signal (TPC) transmitted from the packet-transmitting base station. If the mobile station is not on the receipt of the packet, then the mobile station performs the normal transmission power control during the soft handover. If the mobile station does not receive the packet and the acknowledge/non-acknowledge signal (ACK/NACK) is not transmitted for the high-speed dedicated physical control channel (HS-DPCCH), then any increase of the up-link interference wave power is prevented. This first conventional technique is disclosed in the article "R1-02-0537 entitled "Discussion on ACK/NACK Signaling" filed in the first meeting #25 of 3GPP RAN (radio Access Network) WG (Working Group).

A similar conventional technique, which will hereinafter be referred to as a second conventional technique, is disclosed in the article "R1-02-0929 entitled "Enhanced HS-DPCCH power control in soft handover" filed in the first meeting #27 of 3GPP RAN (radio Access Network) WG (Working Group).

In accordance with the second conventional technique, the transmit power control signal (TPC) transmitted from the packet-transmitting base station is compared to a synthesized signal of all the transmit power control signals (TPC) transmitted from all of the link base stations, so that the number of times of detected differences between the both signals is cyclically counted for each predetermined cycle time period "K". As the counted number just prior to the transmission of the acknowledge/non-acknowledge signal (ACK/NACK) is large, then an off-set power to be added for commencing the transmission of the acknowledge/non-acknowledge signal (ACK/NACK) is large.

The detection of the difference between the above-both signals means that even the target signal-to-interference-ratio (SIR) is not satisfied in the packet-transmitting base station and the transmit power control signal (TPC) indicating the increase of the transmission power is transmitted from the packet-transmitting base station, while the other link base stations have higher receiving qualities than the target signal-to-interference-ratio (SIR), whereby the transmit power control signals (TPC) indicating the decrease of the transmission power are transmitted from the other link base stations. This means that a propagation loss at the packet-transmitting base station is higher than other propagation losses at the other link base stations. As the propagation loss at the packet-transmitting base station becomes high, then a probability of the difference between the both transmit power control signals (TPC) becomes also high, and the off-set power to be added becomes high, thereby improving the receiving quality of the acknowledge/non-acknowledge signal (ACK/NACK) at the packet-transmitting base station.

In accordance with the second conventional technique, after the off-set power is added and the transmission of the acknowledge/non-acknowledge signal (ACK/NACK) is commenced, then the mobile station performs the transmission power control based on only the transmit power control signal (TPC) transmitted from the packet-transmitting base station similarly to the above-described first conventional technique.

In accordance with the above-described conventional method of controlling the transmission power, it is possible in the following case that the receiving quality of the high-speed dedicated physical control channel (HS-DPCCH) during receipt of the packet is deteriorated.

In the normal transmission power control except when the mobile station receives the packet, the transmission power of the mobile station is decreased or remains unchanged, provided that at least one of the link base stations satisfies the target signal-to-interference-ratio (SIR). During receipt of the packet, even if the other link base stations satisfy the target signal-to-interference-ratio (SIR), then the transmission power control is made by giving a priority to the packet-transmitting base station, wherein the transmission power is increased until the target signal-to-interference-ratio (SIR) becomes satisfied at the packet-transmitting base station.

In general, the above-described transmission power control giving the priority to the packet-transmitting base station needs a higher transmission power than the normal transmission power control. In accordance with the first conventional technique, immediately after the mobile station is placed into a packet receiving state and the mobile station is shifted from the normal transmission power control to the transmission power control giving the priority to the packet-transmitting base station, then it is highly possible that the transmission power is not sufficiently high for satisfying the target signal-to-interference-ratio (SIR) of the up-link dedicated physical channel (UL-DPCH) of the packet-transmitting base station. If the transmission power is not sufficiently high, then it takes a long time to increase the transmission power up to a sufficiently high power level. Until the transmission power becomes sufficiently high, the receiving quality of the high-speed dedicated physical control channel (HS-DPCCH) is low.

In general, the packets through the down-links have been received and multiplexed and the presence or absence of the receiving error has been confirmed, before the acknowledge/non-acknowledge signal (ACK/NACK) is transmitted at the high-speed dedicated physical control channel (HS-DPCCH). FIG. 3 is a timing chart illustrative of the first conventional technique of the transmission power control in the cellular system. As shown in FIG. 3, a necessary control signal for receiving the packet is received at the high-speed shared control channel (HS-SCCH). This causes a predetermined time delay "$T_D$" of a transmission time "$T_T$" of transmitting the acknowledge/non-acknowledge signal (ACK/NACK) from a packet receiving state time "$T_S$" at which the mobile station is placed in a packet receiving state.

Under conditions shown in FIG. 3, during this time delay "$T_D$", the transmission power of the mobile station is increased up to a sufficiently high transmission power level for satisfying the target signal-to-interference-ratio (SIR) at the packet-transmitting base station, whereby no substantive deterioration of the acknowledge/non-acknowledge signal (ACK/NACK) is caused.

In the following case, during the time delay "$T_D$", the transmission power of the mobile station is not increased up to a sufficiently high transmission power level for satisfying the target signal-to-interference-ratio (SIR) at the packet-transmitting base station, whereby a substantive deterioration of the acknowledge/non-acknowledge signal (ACK/NACK) is caused.

First, if the propagation loss at the packet-transmitting base station is much larger than the propagation losses at the other link base stations, then it is possible that the continuous increase of the transmission power during the time delay "$T_D$" does not cause the increased transmission power to reach the target sufficient high power level.

Second, a high receiving error rate of the transmit power control signal (TPC) transmitted from the packet-transmitting base station may cause a high probability of decreasing the power by the mobile station due to the receiving error of the transmit power control signal (TPC), even the packet-transmitting base station indicates the increase of the transmission power, whereby the transmission power is not increased up to the target sufficient high power level.

Third, a delayed control cycle of the transmission power control results in a reduced umber of time of the transmission power control during the time delay "$T_D$", while a single time increase of the transmission power is limited in its increasing level, whereby the transmission power is not increased up to the target sufficient high power level, resulting in an increased probability of appearance of the deterioration of the acknowledge/non-acknowledge signal (ACK/NACK).

In accordance with the above-described second conventional technique, the off-set power is added for subsequent transmission of the acknowledge/non-acknowledge signal (ACK/NACK), wherein the off-set power depends on a probability that the propagation loss at the packet-transmitting base station becomes higher than the propagation losses at the other link base stations in the predetermined time period "K". This means that the time period "K" may be selected so that the off-set power compensates the difference of the propagation loss at the packet-transmitting base station and the propagation losses at the other link base stations, even if the difference is large. This second conventional technique needs the mobile station to cyclically count the number of times of detected differences between the both signals for each predetermined cycle time period "K". This means that the mobile station has an increased load to the process.

In the above circumstances, the development of a novel cellular system free from the above problems is desirable.

SUMMARY OF THE INVENTION

Accordingly, it is an object of the present invention to provide a novel cellular system free from the above problems.

It is a further object of the present invention to provide a novel cellular system enabling a packet-transmitting base station to receive an acknowledge/non-acknowledge signal (ACK/NACK) at a sufficiently high quality.

It is a still further object of the present invention to provide a novel mobile station included in a cellular system free from the above problems.

It is yet a further object of the present invention to provide a novel mobile station included in a cellular system enabling a packet-transmitting base station to receive an acknowledge/non-acknowledge signal (ACK/NACK) at a sufficiently high quality.

It is still more object of the present invention to provide a novel base station included in a cellular system free from the above problems.

It is yet more object of the present invention to provide a novel base station included in a cellular system enabling a packet-transmitting base station to receive an acknowledge/non-acknowledge signal (ACK/NACK) at a sufficiently high quality.

It is moreover object of the present invention to provide a novel transmission power control method free from the above problems.

It is furthermore object of the present invention to provide a novel transmission power control method enabling a packet-transmitting base station to receive an acknowledge/non-acknowledge signal (ACK/NACK) at a sufficiently high quality.

It is another object of the present invention to provide a novel program to be executed for implementing a transmission power control method free from the above problems.

It is further another object of the present invention to provide a novel program to be executed for implementing a transmission power control method enabling a packet-transmitting base station to receive an acknowledge/non-acknowledge signal (ACK/NACK) at a sufficiently high quality.

The present invention primarily provides a cellular system including : at least one mobile station being concurrently linked through dedicated physical channels to plural link base stations in a soft handover state. At least one packet-transmitting base station of the plural base stations transmits at least one packet through a common channel to the at least one mobile station. The at least one mobile station includes: a first transmission power control function of controlling a current transmission power of an up-link of the dedicated physical channel based on a first transmission power control information included in down-links of the dedicated physical channels of the plural link base stations; and a second transmission power control function of controlling the current transmission power of the up-link of the dedicated physical channel based on a second transmission power control information included in a down-link of the dedicated physical channel of the at least one packet-transmitting base station. If the at least one mobile station is placed in a first state to receive a packet from the at least one packet-transmitting base station, then the at least one mobile station activates the second transmission power control function. If the at least one mobile station is placed in a second state other than the first state, then the at least one mobile station activates the first transmission power control function. This realizes a desired acceleration of the current transmission power increase up to a predetermined target power level necessary for causing that the measured signal-to-interference-ratio (SIR) at the packet-transmitting base station reaches a predetermined target signal-to-interference-ratio (SIR), thereby improving a receiving quality of any control signal from said at least one mobile station at the packet-transmitting base station.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

DETAILED DESCRIPTION OF THE PREFERRED EMBODIMENTS

Cellular System

Figure 1:
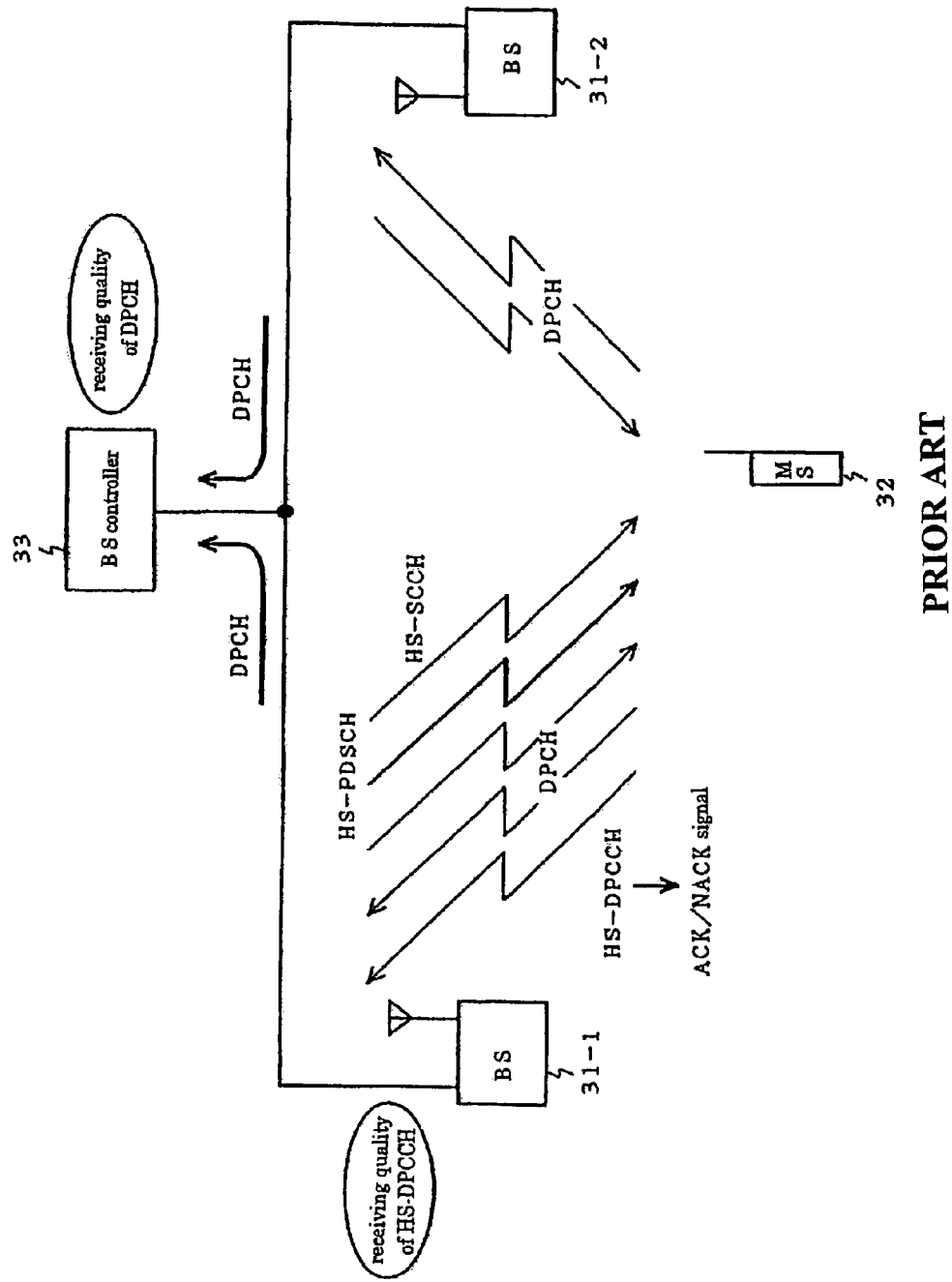
FIG. 1 is a schematic view illustrative of the general operation in the conventional cellular system.
Figure 2:
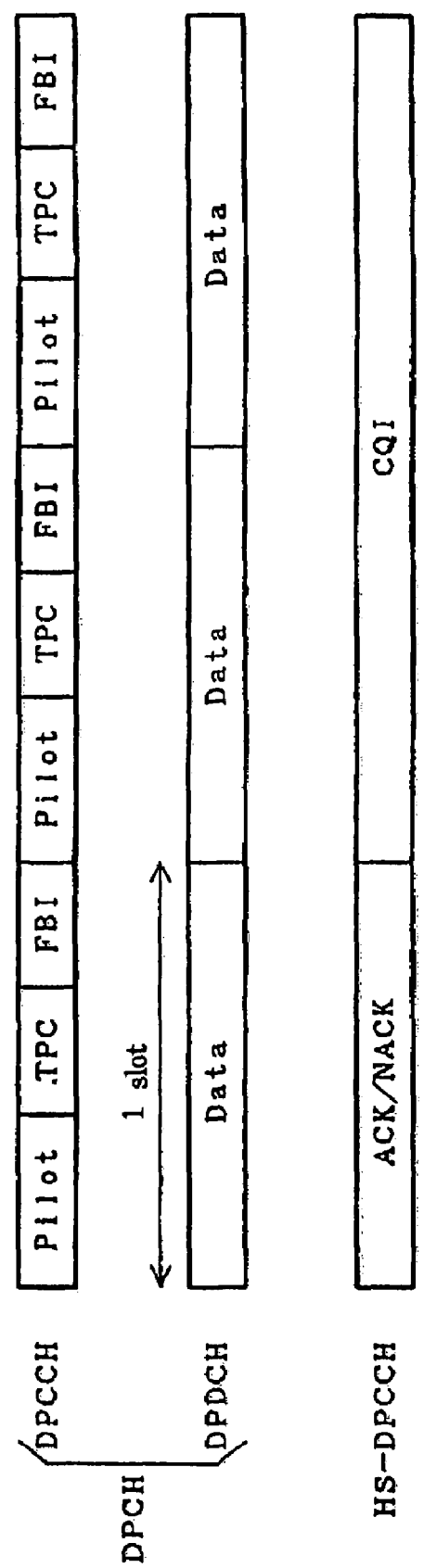
FIG. 2 is a diagram illustrative of respective formats of the high-speed dedicated physical control channel (HS-DPCCH) as the up-link and the dedicated physical channel (DPCH) as the other up-link.
Figure 3:
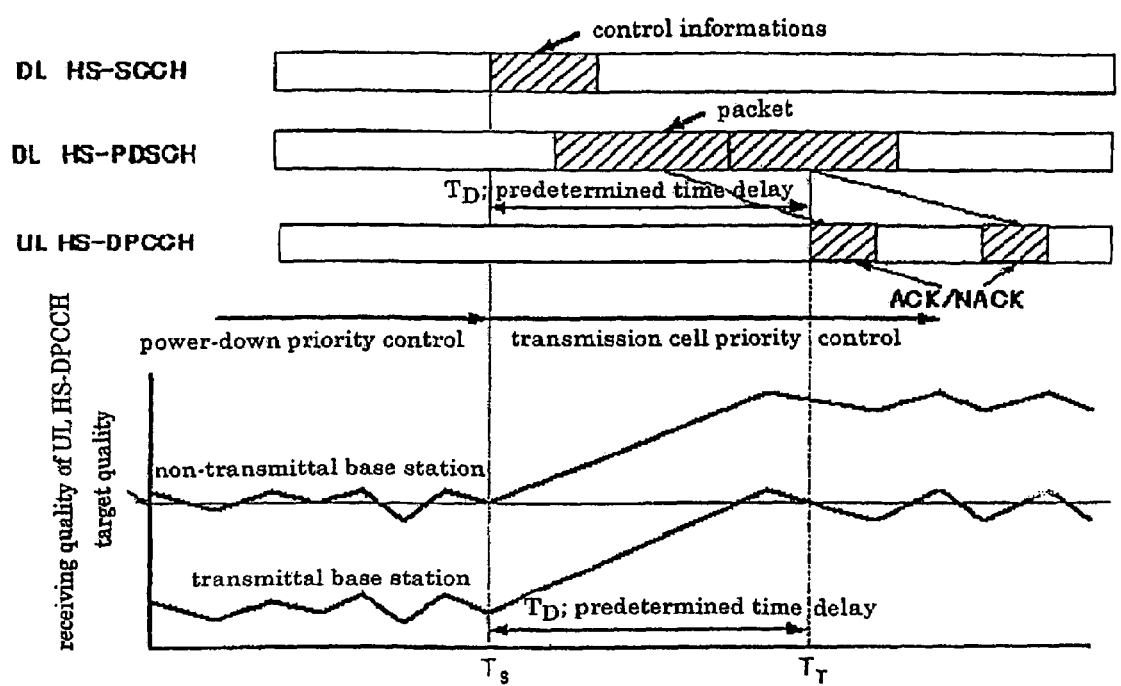
FIG. 3 is a timing chart illustrative of the first conventional technique of the transmission power control in the cellular system.

A first aspect of the present invention is a cellular system including: at least one mobile station being concurrently linked through dedicated physical channels to plural link base stations in a soft handover state. At least one packet-transmitting base station of the plural base stations transmits at least one packet through a common channel to the at least one mobile station. The at least one mobile station includes: a first transmission power control function of controlling a current transmission power of an up-link of the dedicated physical channel based on a first transmission power control information included in down-links of the dedicated physical channels of the plural link base stations; and a second transmission power control function of controlling the current transmission power of the up-link of the dedicated physical channel based on a second transmission power control information included in a down-link of the dedicated physical channel of the at least one packet-transmitting base station. If the at least one mobile station is placed in a first state to receive a packet from the at least one packet-transmitting base station, then the at least one mobile station activates the second transmission power control function. If the at least one mobile station is placed in a second state other than the first state, then the at least one mobile station activates the first transmission power control function. This realizes a desired acceleration of the current transmission power increase up to a predetermined target power level necessary for causing that the measured signal-to-interference-ratio (SIR) at the packet-transmitting base station reaches a predetermined target signal-to-interference-ratio (SIR), thereby improving a receiving quality of any control signal from said at least one mobile station at the packet-transmitting base station.

It is possible that after the at least one mobile station has been placed in the first state, then the second transmission power control function decides an off-set power based on the second transmission power control information and increases the current transmission power by the off-set power, before the at least one mobile station will make a first transmission of an acknowledge/non-acknowledge signal to the at least one packet-transmitting base station.

In accordance with this configuration, the mobile station adds the off-set power.P to the current transmission power for acceleration of the current transmission power increase up to a predetermined target power level necessary for causing that the measured signal-to-interference-ratio (SIR) at the packet-transmitting base station reaches a predetermined target signal-to-interference-ratio (SIR), thereby improving a receiving quality of the acknowledge/non-acknowledge signal (ACK/NACK) at the packet-transmitting base station.

It is also possible that the second transmission power control function adjusts the off-set power based on the second transmission power control information which includes a difference in propagation loss between the at least one packet-transmitting base station and other of the plural link base stations in the soft handover state than the at least one packet-transmitting base station.

In accordance with this configuration, the mobile station decides the off-set power.P based on the difference between the propagation loss to the packet-transmitting base station and the other propagation loss to the other link base stations. The mobile station adds a large off-set power if the difference of the current transmission power from the target transmission power is large. The mobile station also adds a small off-set power if the difference of the current transmission power from the target transmission power is small. This allows keeping a desired high receiving quality of the acknowledge/non-acknowledge signal (ACK/NACK) at the packet-transmitting base station and also reducing any substantive interference on the up-link, independently from the propagation loss.

It is also possible that the second transmission power control function adjusts the off-set power based on the second transmission power control information which includes the number of times of receipt of a first transmission power control signal indicating a request for power-increase from the at least one packet-transmitting base station for a predetermined period of time.

In accordance with this configuration, the mobile station decides the off-set power .P based on the number of times of the request for power-up from the packet-transmitting base station. If the current transmission power does not reach the target transmission power at the time of transmitting the acknowledge/non-acknowledge signal (ACK/NACK), then the counted number of times of the request for power-up is sill larger than the predetermined threshold value, whereby the large off-set power is added to the current transmission power. Accordingly, the off-set power level can be decided depending upon the issue of whether the current transmission power does not reach the target transmission power at the time of transmitting the acknowledge/non-acknowledge signal (ACK/NACK). This allows keeping a desired high receiving quality of the acknowledge/non-acknowledge signal (ACK/NACK) at the packet-transmitting base station and also reducing any substantive interference on the up-link.

In accordance with this configuration, after the mobile station has been placed into the state of receiving the packet, then the mobile station may commence to count up the number of times of the request for power-up from the base station. This reduces the number of processes by the mobile station if the mobile station is in the other state, thereby making the cellular system free from the above-described problem engaged with the second conventional technique.

It is also possible that the second transmission power control function adjusts the off-set power based on the second transmission power control information which includes a receiving quality of a common pilot signal transmitted from each of the plural link base stations in the soft handover state.

It is also possible that the second transmission power control function adjusts the off-set power based on the second transmission power control information which includes the number of times of receipt of a null transmission power control signal having a receiving quality lower than a predetermined threshold receiving quality level transmitted from the at least one packet-transmitting base station.

In accordance with this configuration, the mobile station decides the off-set power .P based on the counted number of times (Nign) of receipts of the null transmission power control signals having lower receiving qualities than the predetermined threshold receiving quality level transmitted from the packet-transmitting base station. If the propagation loss is light, then a probability of deterioration of the transmission power control signal is also high. In accordance with this configuration, if the propagation loss is light, then a large off-set power is added to the current transmission power. This allows keeping a desired high receiving quality of the acknowledge/non-acknowledge signal (ACK/NACK) at the packet-transmitting base station and also reducing any substantive interference on the up-link.

It is also possible that after the at least one mobile station has activated the second transmission power control function, then the second transmission power control function decides the off-set power.

It is also possible that after the at least one mobile station has activated the second transmission power control function, then the second transmission power control function decides the off-set power based on a difference between the second transmission power control information received from the at least one packet-transmitting base station and other transmission power control information received from other of the plural link base stations in the soft handover state than the at least one packet-transmitting base station.

It is also possible that the at least one packet-transmitting base station includes an additional function of increasing, by a predetermined secondary off-set power, a secondary transmission power for transmitting the second transmission power control information to the at least one mobile station, after the at least one packet-transmitting base station has transmitted an advance notice of packet transmission to the at least one mobile station. In this case, the additional function further decreases the increased secondary transmission power by the predetermined secondary off-set power, after the at least one packet-transmitting base station has received a notice of completion of packet transmission from the at least one mobile station.

In accordance with this configuration, after the packet transmission has been completed, then the increased secondary transmission power for transmitting the transmission power control signal is made into the original transmission power, thereby improving the high receiving quality of the acknowledge/non-ac-knowledge signal (ACK/NACK) at the packet-transmitting base station and also reducing any substantive interference on the up-link.

It is also possible that the second transmission power control information includes a first number of times of receipt of a first transmission power control signal which indicates a first request for power-increase, and a second number of times of receipt of a second transmission power control signal which indicates a second request for power-decrease. The second transmission power control function counts the first and second transmission power control signals separately, and the second transmission power control function compares the first number counted to a predetermined first threshold value and also compares the second number counted to a predetermined second threshold value. If the first number counted exceeds the predetermined first threshold value, then the second transmission power control function increases the current transmission power, and if the number counted exceeds the predetermined second threshold value, then the second transmission power control function decreases the current transmission power. It is preferable that the predetermined first threshold value is smaller than the predetermined second threshold value.

In accordance with this configuration, the mobile station does not change the current transmission power until the mobile station has received plural times of receipts of either the first transmission power control signals or the second transmission power control signals. This reduces a probability that the mobile station makes undesired erroneous transmission power control opposite to the request from the packet-transmitting base station.

In accordance with this configuration, the first predetermined threshold value is smaller than the second predetermined threshold value in order to reduce a probability that the mobile station makes undesired erroneous control of decreasing the transmission power opposite to the request for power-up from the packet-transmitting base station.

In accordance with this configuration, a reduced number of commands is necessary for increasing the current transmission power. This improves the responsibility to the request for power-up. The mobile station accelerates the transmission power increase up to the target power level necessary for causing that the measured signal-to-interference-ratio (SIR) at the packet-transmitting base station reaches the predetermined target signal-to-interference-ratio (SIR), thereby improving the receiving quality of the acknowledge/non-acknowledge signal (ACK/NACK) at the packet-transmitting base station.

In accordance with this configuration, during receipt of the packet, the mobile station adds the off-set power to the current transmission power of the transmission power control signal transmitted from the packet-transmitting base station, so as to reduce a probability that the mobile station erroneously receives the transmission power control signal transmitted from the packet-transmitting base station.

This configuration allows keeping a desired high receiving quality of the acknowledge/non-acknowledge signal (ACK/NACK) at the packet-transmitting base station.

In accordance with this configuration, after the packet transmission has been completed, then the increased transmission power for transmitting the transmission power control signal is made into the original transmission power, thereby improving the high receiving quality of the acknowledge/non-acknowledge signal (ACK/NACK) at the packet-transmitting base station and also reducing any substantive interference on the up-link.

It is also possible that the second transmission power control information includes a transmission power control signal transmitted from the at least one packet-transmitting base station, and the second transmission power control function measures a receiving quality of the transmission power control signal and compares the receiving quality measured to a predetermined threshold value. If the receiving quality measured is lower than the predetermined threshold value, then the second transmission power control function considers that the transmission power control signal indicates a first request for power-increase, and the second transmission power control function increases the current transmission power.

In accordance with this configuration, if the receiving quality of the transmission power control signal transmitted from the packet-transmitting base station is poor which indicates a low reliability, then the mobile station increases the transmission power. This reduces a probability that the mobile station erroneously receives the transmission power control signal and decreases the transmission power opposite to the request for the power-up from the packet-transmitting base station.

As the propagation loss is high, then the probability of the deteriorated receiving quality of the transmission power control signal is high. For this reason, it is, in general, possible that the mobile station erroneously receives the transmission power control signal and decreases the transmission power opposite to the request for the power-up from the packet-transmitting base station. As described above, in accordance with this embodiment, however, the above configuration reduces a probability that the mobile station erroneously receives the transmission power control signal and decreases the transmission power opposite to the request for the power-up from the packet-transmitting base station, thereby improving the receiving quality of the acknowledge/non-acknowledge signal (ACK/NACK) at the packet-transmitting base station.

In case that the transmission power control signal indicates the power-down, if the receiving quality of the transmission power control signal is lower than the predetermined threshold value, then the mobile station unnecessarily increases the current transmission power which reaches the target transmission power. In accordance with this embodiment, after the mobile station transmitted the first acknowledge/non-acknowledge signal (ACK/NACK), then the mobile station makes the changed execution condition for the receiving quality deterioration of the transmission power control signal into the original execution condition, in order to prevent that the controlled transmission power exceeds the target transmission power and also to reduce the interference on the up-link.

It is also possible that the first transmission power control information includes a first synthesized signal from a first number of first transmission control signals received the first number of times and transmitted from each of the plural link base stations. The first transmission power control function controls the current transmission power based on the first synthesized signal. The second transmission power control information includes a second synthesized signal from a second number of second transmission control signals received the second number of times and transmitted from the at least one packet-transmitting base station as well as a third synthesized signal from the first number of second transmission control signals received the first number of times and transmitted from the at least one packet-transmitting base station. The second transmission power control function controls the current transmission power based on the second synthesized signal before the at least one mobile station will make the first transmission of the acknowledge/non-acknowledge signal to the at least one packet-transmitting base station. The second transmission power control function controls the current transmission power based on the third synthesized signal after the at least one mobile station has made the first transmission of the acknowledge/non-acknowledge signal to the at least one packet-transmitting base station. It is preferable that the second number is smaller than the first number.

In accordance with this configuration, it is possible to shorten the transmission power control cycle, for example, in case that after the mobile station has received plural transmission power control signals, then the mobile station renews the transmission power based on a synthesized signal of the received plural transmission power control signals. This improves the responsibility to the requests for the transmission power control based on the transmission power control signal. This makes it easy to achieve and realize that the current transmission power is increased up to the target transmission power within a limited time period defined from commencement of receiving packet to transmission of the acknowledge/non-acknowledge signal (ACK/NACK), thereby improving the receiving quality of the acknowledge/non-acknowledge signal (ACK/NACK) at the packet-transmitting base station.

In accordance with this configuration, after the mobile station has transmitted the first acknowledge/non-acknowledge signal (ACK/NACK), then the mobile station makes the changed transmission power control cycle into the normal or original transmission power control cycle. The plural received transmission power control signals are synthesized about when the current transmission power has been increased up to the target transmission power, thereby improving the reliability of the transmission power control signals and also reducing the probability of erroneous receipt of the transmission power control signals.

It is possible that if the at least one mobile station is placed in the first state, then the second transmission power control function makes a packet-transmitting-base-station priority control for controlling the current transmission power based on a transmission control signal which indicates at least one of a first request for power-increase and a second request for power-decrease and which has been transmitted from the at least one packet-transmitting base station, and if the at least one mobile station is placed in the second state, then the second transmission power control function makes a power-down priority control for decreasing the current transmission power by a predetermined power level if at least one of transmission power control signals transmitted from all of the plural link base stations indicates a request for power-decease, and for increasing the current transmission power by another predetermined power level if all of the transmission power control signals transmitted from all of the plural link base stations indicate another request for power-increase.

In accordance with this configuration, the mobile station adds the off-set power to the current transmission power just after the mobile station is shifted from the power-down priority control mode to the packet-transmitting-base-station priority control mode, where the difference of the current transmission power from the target transmission power is still large, thereby reducing a probability that the addition of the off-set power causes the increased transmission power to exceed the target transmission power, and reducing any interference on the up-link.

Mobile Station

A second aspect of the present invention is a mobile station included in a cellular system and being concurrently linked through dedicated physical channels to plural link base stations in a soft handover state. The mobile station includes: a first transmission power control function of controlling a current transmission power of an up-link of the dedicated physical channel based on a first transmission power control information included in down-links of the dedicated physical channels of the plural link base stations;

and a second transmission power control function of controlling the current transmission power of the up-link of the dedicated physical channel based on a second transmission power control information included in a down-link of the dedicated physical channel of at least one packet-transmitting base station of the plural base stations, and the at least one packet-transmitting base station transmitting at least one packet through a common channel to the mobile station. If the mobile station is placed in a first state to receive a packet from the at least one packet-transmitting base station, then the mobile station activates the second transmission power control function. If the mobile station is placed in a second state other than the first state, then the mobile station activates the first transmission power control function. This realizes a desired acceleration of the current transmission power increase up to a predetermined target power level necessary for causing that the measured signal-to-interference-ratio (SIR) at the packet-transmitting base station reaches a predetermined target signal-to-interference-ratio (SIR), thereby improving a receiving quality of any control signal from said at least one mobile station at the packet-transmitting base station.

It is possible that after the mobile station has been placed in the first state, then the second transmission power control function decides an off-set power based on the second transmission power control information and increases the current transmission power by the off-set power, before the mobile station will make a first transmission of an acknowledge/non-acknowledge signal to the at least one packet-transmitting base station.

In accordance with this configuration, the mobile station adds the off-set power.P to the current transmission power for acceleration of the current transmission power increase up to a predetermined target power level necessary for causing that the measured signal-to-interference-ratio (SIR) at the packet-transmitting base station reaches a predetermined target signal-to-interference-ratio (SIR), thereby improving a receiving quality of the acknowledge/non-acknowledge signal (ACK/NACK) at the packet-transmitting base station.

It is also possible that the second transmission power control function adjusts the off-set power based on the second transmission power control information which includes a difference in propagation loss between the at least one packet-transmitting base station and other of the plural link base stations in the soft handover state than the at least one packet-transmitting base station.

In accordance with this configuration, the mobile station decides the off-set power.P based on the difference between the propagation loss to the packet-transmitting base station and the other propagation loss to the other link base stations. The mobile station adds a large off-set power if the difference of the current transmission power from the target transmission power is large. The mobile station also adds a small off-set power if the difference of the current transmission power from the target transmission power is small. This allows keeping a desired high receiving quality of the acknowledge/non-acknowledge signal (ACK/NACK) at the packet-transmitting base station and also reducing any substantive interference on the up-link, independently from the propagation loss.

It is also possible that the second transmission power control function adjusts the off-set power based on the second transmission power control information which includes the number of times of receipt of a first transmission power control signal indicating a request for power-increase from the at least one packet-transmitting base station for a predetermined period of time.

In accordance with this configuration, the mobile station decides the off-set power.P based on the number of times of the request for power-up from the packet-transmitting base station. If the current transmission power does not reach the target transmission power at the time of transmitting the acknowledge/non-acknowledge signal (ACK/NACK), then the counted number of times of the request for power-up is sill larger than the predetermined threshold value, whereby the large off-set power is added to the current transmission power. Accordingly, the off-set power level can be decided depending upon the issue of whether the current transmission power does not reach the target transmission power at the time of transmitting the acknowledge/non-acknowledge signal (ACK/NACK). This allows keeping a desired high receiving quality of the acknowledge/non-acknowledge signal (ACK/NACK) at the packet-transmitting base station and also reducing any substantive interference on the up-link.

In accordance with this configuration, after the mobile station has been placed into the state of receiving the packet, then the mobile station may commence to count up the number of times of the request for power-up from the base station. This reduces the number of processes by the mobile station if the mobile station is in the other state, thereby making the cellular system free from the above-described problem engaged with the second conventional technique.

It is also possible that the second transmission power control function adjusts the off-set power based on the second transmission power control information which includes a receiving quality of a common pilot signal transmitted from each of the plural link base stations in the soft handover state.

It is also possible that the second transmission power control function adjusts the off-set power based on the second transmission power control information which includes the number of times of receipt of a null transmission power control signal having a receiving quality lower than a predetermined threshold receiving quality level transmitted from the at least one packet-transmitting base station.

In accordance with this configuration, the mobile station decides the off-set power.P based on the counted number of times (Nign) of receipts of the null transmission power control signals having lower receiving qualities than the predetermined threshold receiving quality level transmitted from the packet-transmitting base station. If the propagation loss is light, then a probability of deterioration of the transmission power control signal is also high. In accordance with this configuration, if the propagation loss is light, then a large off-set power is added to the current transmission power. This allows keeping a desired high receiving quality of the acknowledge/non-acknowledge signal (ACK/NACK) at the packet-transmitting base station and also reducing any substantive interference on the up-link.

It is also possible that after the mobile station has activated the second transmission power control function, then the second transmission power control function decides the off-set power.

It is also possible that after the mobile station has activated the second transmission power control function, then the second transmission power control function decides the off-set power based on a difference between the second transmission power control information received from the at least one packet-transmitting base station and other transmission power control information received from other of the plural link base stations in the soft handover state than the at least one packet-transmitting base station.

It is also possible that the second transmission power control information includes a first number of times of receipt of a first transmission power control signal which indicates a first request for power-increase, and a second number of times of receipt of a second transmission power control signal which indicates a second request for power-decrease. The second transmission power control function counts the first and second transmission power control signals separately, and the second transmission power control function compares the first number counted to a predetermined first threshold value and also compares the second number counted to a predetermined second threshold value. If the first number counted exceeds the predetermined first threshold value, then the second transmission power control function increases the current transmission power, and if the number counted exceeds the predetermined second threshold value, then the second transmission power control function decreases the current transmission power. It is preferable that the predetermined first threshold value is smaller than the predetermined second threshold value.

In accordance with this configuration, the mobile station does not change the current transmission power until the mobile station has received plural times of receipts of either the first transmission power control signals or the second transmission power control signals. This reduces a probability that the mobile station makes undesired erroneous transmission power control opposite to the request from the packet-transmitting base station.

In accordance with this configuration, the first predetermined threshold value is smaller than the second predetermined threshold value in order to reduce a probability that the mobile station makes undesired erroneous control of decreasing the transmission power opposite to the request for power-up from the packet-transmitting base station.

In accordance with this configuration, a reduced number of commands is necessary for increasing the current transmission power. This improves the responsibility to the request for power-up. The mobile station accelerates the transmission power increase up to the target power level necessary for causing that the measured signal-to-interference-ratio (SIR) at the packet-transmitting base station reaches the predetermined target signal-to-interference-ratio (SIR), thereby improving the receiving quality of the acknowledge/non-acknowledge signal (ACK/NACK) at the packet-transmitting base station.

In accordance with this configuration, during receipt of the packet, the mobile station adds the off-set power to the current transmission power of the transmission power control signal transmitted from the packet-transmitting base station, so as to reduce a probability that the mobile station erroneously receives the transmission power control signal transmitted from the packet-transmitting base station.

This configuration allows keeping a desired high receiving quality of the acknowledge/non-acknowledge signal (ACK/NACK) at the packet-transmitting base station.

In accordance with this configuration, after the packet transmission has been completed, then the increased transmission power for transmitting the transmission power control signal is made into the original transmission power, thereby improving the high receiving quality of the acknowledge/non-acknowledge signal (ACK/NACK) at the packet-transmitting base station and also reducing any substantive interference on the up-link.

It is also possible that the second transmission power control information includes a transmission power control signal transmitted from the at least one packet-transmitting base station, and the second transmission power control function measures a receiving quality of the transmission power control signal and compares the receiving quality measured to a predetermined threshold value. If the receiving quality measured is lower than the predetermined threshold value, then the second transmission power control function considers that the transmission power control signal indicates a first request for power-increase, and the second transmission power control function increases the current transmission power.

In accordance with this configuration, if the receiving quality of the transmission power control signal transmitted from the packet-transmitting base station is poor which indicates a low reliability, then the mobile station increases the transmission power. This reduces a probability that the mobile station erroneously receives the transmission power control signal and decreases the transmission power opposite to the request for the power-up from the packet-transmitting base station.

As the propagation loss is high, then the probability of the deteriorated receiving quality of the transmission power control signal is high. For this reason, it is, in general, possible that the mobile station erroneously receives the transmission power control signal and decreases the transmission power opposite to the request for the power-up from the packet-transmitting base station. As described above, in accordance with this embodiment, however, the above configuration reduces a probability that the mobile station erroneously receives the transmission power control signal and decreases the transmission power opposite to the request for the power-up from the packet-transmitting base station, thereby improving the receiving quality of the acknowledge/non-acknowledge signal (ACK/NACK) at the packet-transmitting base station.

In case that the transmission power control signal indicates the power-down, if the receiving quality of the transmission power control signal is lower than the predetermined threshold value, then the mobile station unnecessarily increases the current transmission power which reaches the target transmission power. In accordance with this embodiment, after the mobile station transmitted the first acknowledge/non-acknowledge signal (ACK/NACK), then the mobile station makes the changed execution condition for the receiving quality deterioration of the transmission power control signal into the original execution condition, in order to prevent that the controlled transmission power exceeds the target transmission power and also to reduce the interference on the up-link.

It is also possible that the first transmission power control information includes a first synthesized signal from a first number of first transmission control signals received the first number of times and transmitted from each of the plural link base stations. The first transmission power control function controls the current transmission power based on the first synthesized signal. The second transmission power control information includes a second synthesized signal from a second number of second transmission control signals received the second number of times and transmitted from the at least one packet-transmitting base station as well as a third synthesized signal from the first number of second transmission control signals received the first number of times and transmitted from the at least one packet-transmitting base station. The second transmission power control function controls the current transmission power based on the second synthesized signal before the mobile station will make the first transmission of the acknowledge/non-acknowledge signal to the at least one packet-transmitting base station. The second transmission power control function controls the current transmission power based on the third synthesized signal after the mobile station has made the first transmission of the acknowledge/non-acknowledge signal to the at least one packet-transmitting base station. It is preferable that the second number is smaller than the first number.

In accordance with this configuration, it is possible to shorten the transmission power control cycle, for example, in case that after the mobile station has received plural transmission power control signals, then the mobile station renews the transmission power based on a synthesized signal of the received plural transmission power control signals. This improves the responsibility to the requests for the transmission power control based on the transmission power control signal. This makes it easy to achieve and realize that the current transmission power is increased up to the target transmission power within a limited time period defined from commencement of receiving packet to transmission of the acknowledge/non-acknowledge signal (ACK/NACK), thereby improving the receiving quality of the acknowledge/non-acknowledge signal (ACK/NACK) at the packet-transmitting base station.

In accordance with this configuration, after the mobile station has transmitted the first acknowledge/non-acknowledge signal (ACK/NACK), then the mobile station makes the changed transmission power control cycle into the normal or original transmission power control cycle. The plural received transmission power control signals are synthesized about when the current transmission power has been increased up to the target transmission power, thereby improving the reliability of the transmission power control signals and also reducing the probability of erroneous receipt of the transmission power control signals.

It is possible that if the mobile station is placed in the first state, then the second transmission power control function makes a packet-transmitting-base-station priority control for controlling the current transmission power based on a transmission control signal which indicates at least one of a first request for power-increase and a second request for power-decrease and which has been transmitted from the at least one packet-transmitting base station, and if the mobile station is placed in the second state, then the second transmission power control function makes a power-down priority control for decreasing the current transmission power by a predetermined power level if at least one of transmission power control signals transmitted from all of the plural link base stations indicates a request for power-decease, and for increasing the current transmission power by another predetermined power level if all of the transmission power control signals transmitted from all of the plural link base stations indicate another request for power-increase.

In accordance with this configuration, the mobile station adds the off-set power to the current transmission power just after the mobile station is shifted from the power-down priority control mode to the packet-transmitting-base-station priority control mode, where the difference of the current transmission power from the target transmission power is still large, thereby reducing a probability that the addition of the off-set power causes the increased transmission power to exceed the target transmission power, and reducing any interference on the up-link.

Base Station

A third aspect of the present invention is a base station included in a cellular system. The base station in a soft handover is linked through a dedicated physical channel to at least one mobile station. The base station transmits at least one packet through a common channel to the at least one mobile station. The base station includes an additional function of increasing, by a predetermined secondary off-set power, a secondary transmission power for transmitting a transmission power control information to the at least one mobile station, after the base station has transmitted an advance notice of packet transmission to the at least one mobile station. The additional function further decreases the increased secondary transmission power by the predetermined secondary off-set power, after the base station has received a notice of completion of packet transmission from the at least one mobile station.

In accordance with this configuration, after the packet transmission has been completed, then the increased secondary transmission power for transmitting the transmission power control signal is made into the original transmission power, thereby improving the high receiving quality of the acknowledge/non-acknowledge signal (ACK/NACK) at the packet-transmitting base station and also reducing any substantive interference on the up-link.

Transmission Power Control Method

A fourth aspect of the present invention is a method of controlling a transmission power in a cellular system including at least one mobile station being concurrently linked through dedicated physical channels to plural link base stations in a soft handover state. At least one packet-transmitting base station of the plural base stations transmits at least one packet through a common channel to the at least one mobile station. The method includes: a first transmission power control process for controlling a current transmission power of an up-link of the dedicated physical channel based on a first transmission power control information included in down-links of the dedicated physical channels of the plural link base stations; and a second transmission power control process for controlling the current transmission power of the up-link of the dedicated physical channel based on a second transmission power control information included in a down-link of the dedicated physical channel of the at least one packet-transmitting base station. If the at least one mobile station is placed in a first state to receive a packet from the at least one packet-transmitting base station, then the at least one mobile station performs the second transmission power control process. If the at least one mobile station is placed in a second state other than the first state, then the at least one mobile station performs the first transmission power control process. This realizes a desired acceleration of the current transmission power increase up to a predetermined target power level necessary for causing that the measured signal-to-interference-ratio (SIR) at the packet-transmitting base station reaches a predetermined target signal-to-interference-ratio (SIR), thereby improving a receiving quality of any control signal from said at least one mobile station at the packet-transmitting base station.

It is possible that after the at least one mobile station has been placed in the first state, then the second transmission power control process decides an off-set power based on the second transmission power control information and increases the current transmission power by the off-set power, before the at least one mobile station will make a first transmission of an acknowledge/non-acknowledge signal to the at least one packet-transmitting base station.

In accordance with this configuration, the mobile station adds the off-set power.P to the current transmission power for acceleration of the current transmission power increase up to a predetermined target power level necessary for causing that the measured signal-to-interference-ratio (SIR) at the packet-transmitting base station reaches a predetermined target signal-to-interference-ratio (SIR), thereby improving a receiving quality of the acknowledge/non-acknowledge signal (ACK/NACK) at the packet-transmitting base station.

It is also possible that the second transmission power control process adjusts the off-set power based on the second transmission power control information which includes a difference in propagation loss between the at least one packet-transmitting base station and other of the plural link base stations in the soft handover state than the at least one packet-transmitting base station.

In accordance with this configuration, the mobile station decides the off-set power.P based on the difference between the propagation loss to the packet-transmitting base station and the other propagation loss to the other link base stations. The mobile station adds a large off-set power if the difference of the current transmission power from the target transmission power is large. The mobile station also adds a small off-set power if the difference of the current transmission power from the target transmission power is small. This allows keeping a desired high receiving quality of the acknowledge/non-acknowledge signal (ACK/NACK) at the packet-transmitting base station and also reducing any substantive interference on the up-link, independently from the propagation loss.

It is also possible that the second transmission power control process adjusts the off-set power based on the second transmission power control information which includes the number of times of receipt of a first transmission power control signal indicating a request for power-increase from the at least one packet-transmitting base station for a predetermined period of time.

In accordance with this configuration, the mobile station decides the off-set power.P based on the number of times of the request for power-up from the packet-transmitting base station. If the current transmission power does not reach the target transmission power at the time of transmitting the acknowledge/non-acknowledge signal (ACK/NACK), then the counted number of times of the request for power-up is sill larger than the predetermined threshold value, whereby the large off-set power is added to the current transmission power. Accordingly, the off-set power level can be decided depending upon the issue of whether the current transmission power does not reach the target transmission power at the time of transmitting the acknowledge/non-acknowledge signal (ACK/NACK). This allows keeping a desired high receiving quality of the acknowledge/non-acknowledge signal (ACK/NACK) at the packet-transmitting base station and also reducing any substantive interference on the up-link.

In accordance with this configuration, after the mobile station has been placed into the state of receiving the packet, then the mobile station may commence to count up the number of times of the request for power-up from the base station. This reduces the number of processes by the mobile station if the mobile station is in the other state, thereby making the cellular system free from the above-described problem engaged with the second conventional technique.

It is also possible that the second transmission power control process adjusts the off-set power based on the second transmission power control information which includes a receiving quality of a common pilot signal transmitted from each of the plural link base stations in the soft handover state.

It is also possible that the second transmission power control process adjusts the off-set power based on the second transmission power control information which includes the number of times of receipt of a null transmission power control signal having a receiving quality lower than a predetermined threshold receiving quality level transmitted from the at least one packet-transmitting base station.

In accordance with this configuration, the mobile station decides the off-set power.P based on the counted number of times (Nign) of receipts of the null transmission power control signals having lower receiving qualities than the predetermined threshold receiving quality level transmitted from the packet-transmitting base station. If the propagation loss is light, then a probability of deterioration of the transmission power control signal is also high. In accordance with this configuration, if the propagation loss is light, then a large off-set power is added to the current transmission power. This allows keeping a desired high receiving quality of the acknowledge/non-acknowledge signal (ACK/NACK) at the packet-transmitting base station and also reducing any substantive interference on the up-link.

It is also possible that after the at least one mobile station has performed the second transmission power control process, then the second transmission power control process decides the off-set power.

It is also possible that after the at least one mobile station has performed the second transmission power control process, then the second transmission power control process decides the off-set power based on a difference between the second transmission power control information received from the at least one packet-transmitting base station and other transmission power control information received from other of the plural link base stations in the soft handover state than the at least one packet-transmitting base station.

It is also possible that an additional process is performed by the at least one packet-transmitting base station for increasing, by a predetermined secondary off-set power, a secondary transmission power for transmitting the second transmission power control information to the at least one mobile station, after the at least one packet-transmitting base station has transmitted an advance notice of packet transmission to the at least one mobile station. The additional process further decreases the increased secondary transmission power by the predetermined secondary off-set power, after the at least one packet-transmitting base station has received a notice of completion of packet transmission from the at least one mobile station.

In accordance with this configuration, after the packet transmission has been completed, then the increased secondary transmission power for transmitting the transmission power control signal is made into the original transmission power, thereby improving the high receiving quality of the acknowledge/non-acknowledge signal (ACK/NACK) at the packet-transmitting base station and also reducing any substantive interference on the up-link.

It is also possible that the second transmission power control information includes a first number of times of receipt of a first transmission power control signal which indicates a first request for power-increase, and a second number of times of receipt of a second transmission power control signal which indicates a second request for power-decrease. The second transmission power control process counts the first and second transmission power control signals separately, and the second transmission power control process compares the first number counted to a predetermined first threshold value and also compares the second number counted to a predetermined second threshold value.

If the first number counted exceeds the predetermined first threshold value, then the second transmission power control process increases the current transmission power, and if the number counted exceeds the predetermined second threshold value, then the second transmission power control process decreases the current transmission power. It is preferable that the predetermined first threshold value is smaller than the predetermined second threshold value.

In accordance with this configuration, the mobile station does not change the current transmission power until the mobile station has received plural times of receipts of either the first transmission power control signals or the second transmission power control signals. This reduces a probability that the mobile station makes undesired erroneous transmission power control opposite to the request from the packet-transmitting base station.

In accordance with this configuration, the first predetermined threshold value is smaller than the second predetermined threshold value in order to reduce a probability that the mobile station makes undesired erroneous control of decreasing the transmission power opposite to the request for power-up from the packet-transmitting base station.

In accordance with this configuration, a reduced number of commands is necessary for increasing the current transmission power. This improves the responsibility to the request for power-up. The mobile station accelerates the transmission power increase up to the target power level necessary for causing that the measured signal-to-interference-ratio (SIR) at the packet-transmitting base station reaches the predetermined target signal-to-interference-ratio (SIR), thereby improving the receiving quality of the acknowledge/non-acknowledge signal (ACK/NACK) at the packet-transmitting base station.

In accordance with this configuration, during receipt of the packet, the mobile station adds the off-set power to the current transmission power of the transmission power control signal transmitted from the packet-transmitting base station, so as to reduce a probability that the mobile station erroneously receives the transmission power control signal transmitted from the packet-transmitting base station.

This configuration allows keeping a desired high receiving quality of the acknowledge/non-acknowledge signal (ACK/NACK) at the packet-transmitting base station.

In accordance with this configuration, after the packet transmission has been completed, then the increased transmission power for transmitting the transmission power control signal is made into the original transmission power, thereby improving the high receiving quality of the acknowledge/non-acknowledge signal (ACK/NACK) at the packet-transmitting base station and also reducing any substantive interference on the up-link.

It is also possible that the second transmission power control information includes a transmission power control signal transmitted from the at least one packet-transmitting base station, and the second transmission power control process measures a receiving quality of the transmission power control signal and compares the receiving quality measured to a predetermined threshold value. If the receiving quality measured is lower than the predetermined threshold value, then the second transmission power control process considers that the transmission power control signal indicates a first request for power-increase, and the second transmission power control process increases the current transmission power.

In accordance with this configuration, if the receiving quality of the transmission power control signal transmitted from the packet-transmitting base station is poor which indicates a low reliability, then the mobile station increases the transmission power. This reduces a probability that the mobile station erroneously receives the transmission power control signal and decreases the transmission power opposite to the request for the power-up from the packet-transmitting base station.

As the propagation loss is high, then the probability of the deteriorated receiving quality of the transmission power control signal is high. For this reason, it is, in general, possible that the mobile station erroneously receives the transmission power control signal and decreases the transmission power opposite to the request for the power-up from the packet-transmitting base station. As described above, in accordance with this embodiment, however, the above configuration reduces a probability that the mobile station erroneously receives the transmission power control signal and decreases the transmission power opposite to the request for the power-up from the packet-transmitting base station, thereby improving the receiving quality of the acknowledge/non-acknowledge signal (ACK/NACK) at the packet-transmitting base station.

In case that the transmission power control signal indicates the power-down, if the receiving quality of the transmission power control signal is lower than the predetermined threshold value, then the mobile station unnecessarily increases the current transmission power which reaches the target transmission power. In accordance with this embodiment, after the mobile station transmitted the first acknowledge/non-acknowledge signal (ACK/NACK), then the mobile station makes the changed execution condition for the receiving quality deterioration of the transmission power control signal into the original execution condition, in order to prevent that the controlled transmission power exceeds the target transmission power and also to reduce the interference on the up-link.

It is also possible that the first transmission power control information includes a first synthesized signal from a first number of first transmission control signals received the first number of times and transmitted from each of the plural link base stations. The first transmission power control process controls the current transmission power based on the first synthesized signal. The second transmission power control information includes a second synthesized signal from a second number of second transmission control signals received the second number of times and transmitted from the at least one packet-transmitting base station as well as a third synthesized signal from the first number of second transmission control signals received the first number of times and transmitted from the at least one packet-transmitting base station. The second transmission power control process controls the current transmission power based on the second synthesized signal before the at least one mobile station will make the first transmission of the acknowledge/non-acknowledge signal to the at least one packet-transmitting base station. The second transmission power control process controls the current transmission power based on the third synthesized signal after the at least one mobile station has made the first transmission of the acknowledge/non-acknowledge signal to the at least one packet-transmitting base station. It is preferable that the second number is smaller than the first number.

In accordance with this configuration, it is possible to shorten the transmission power control cycle, for example, in case that after the mobile station has received plural transmission power control signals, then the mobile station renews the transmission power based on a synthesized signal of the received plural transmission power control signals.

This improves the responsibility to the requests for the transmission power control based on the transmission power control signal. This makes it easy to achieve and realize that the current transmission power is increased up to the target transmission power within a limited time period defined from commencement of receiving packet to transmission of the acknowledge/non-acknowledge signal (ACK/NACK), thereby improving the receiving quality of the acknowledge/non-acknowledge signal (ACK/NACK) at the packet-transmitting base station.

In accordance with this configuration, after the mobile station has transmitted the first acknowledge/non-acknowledge signal (ACK/NACK), then the mobile station makes the changed transmission power control cycle into the normal or original transmission power control cycle. The plural received transmission power control signals are synthesized about when the current transmission power has been increased up to the target transmission power, thereby improving the reliability of the transmission power control signals and also reducing the probability of erroneous receipt of the transmission power control signals.

It is possible that if the at least one mobile station is placed in the first state, then the second transmission power control process makes a packet-transmitting-base-station priority control for controlling the current transmission power based on a transmission control signal which indicates at least one of a first request for power-increase and a second request for power-decrease and which has been transmitted from the at least one packet-transmitting base station, and if the at least one mobile station is placed in the second state, then the second transmission power control process makes a power-down priority control for decreasing the current transmission power by a predetermined power level if at least one of transmission power control signals transmitted from all of the plural link base stations indicates a request for power-decease, and for increasing the current transmission power by another predetermined power level if all of the transmission power control signals transmitted from all of the plural link base stations indicate another request for power-increase.

In accordance with this configuration, the mobile station adds the off-set power to the current transmission power just after the mobile station is shifted from the power-down priority control mode to the packet-transmitting-base-station priority control mode, where the difference of the current transmission power from the target transmission power is still large, thereby reducing a probability that the addition of the off-set power causes the increased transmission power to exceed the target transmission power, and reducing any interference on the up-link.

Computer Program

A fifth aspect of the present invention is a computer program to be executed for implementing a method of controlling a transmission power in a cellular system including at least one mobile station being concurrently linked through dedicated physical channels to plural link base stations in a soft handover state. At least one packet-transmitting base station of the plural base stations transmits at least one packet through a common channel to the at least one mobile station. The computer program includes: a first transmission power control process for controlling a current transmission power of an up-link of the dedicated physical channel based on a first transmission power control information included in down-links of the dedicated physical channels of the plural link base stations; and a second transmission power control process for controlling the current transmission power of the up-link of the dedicated physical channel based on a second transmission power control information included in a down-link of the dedicated physical channel of the at least one packet-transmitting base station. If the at least one mobile station is placed in a first state to receive a packet from the at least one packet-transmitting base station, then the at least one mobile station performs the second transmission power control process. If the at least one mobile station is placed in a second state other than the first state, then the at least one mobile station performs the first transmission power control process. This realizes a desired acceleration of the current transmission power increase up to a predetermined target power level necessary for causing that the measured signal-to-interference-ratio (SIR) at the packet-transmitting base station reaches a predetermined target signal-to-interference-ratio (SIR), thereby improving a receiving quality of any control signal from said at least one mobile station at the packet-transmitting base station.

It is also possible that after the at least one mobile station has been placed in the first state, then the second transmission power control process decides an off-set power based on the second transmission power control information and increases the current transmission power by the off-set power, before the at least one mobile station will make a first transmission of an acknowledge/non-acknowledge signal to the at least one packet-transmitting base station.

In accordance with this configuration, the mobile station adds the off-set power.P to the current transmission power for acceleration of the current transmission power increase up to a predetermined target power level necessary for causing that the measured signal-to-interference-ratio (SIR) at the packet-transmitting base station reaches a predetermined target signal-to-interference-ratio (SIR), thereby improving a receiving quality of the acknowledge/non-acknowledge signal (ACK/NACK) at the packet-transmitting base station.

It is also possible that the second transmission power control process adjusts the off-set power based on the second transmission power control information which includes a difference in propagation loss between the at least one packet-transmitting base station and other of the plural link base stations in the soft handover state than the at least one packet-transmitting base station.

In accordance with this configuration, the mobile station decides the off-set power.P based on the difference between the propagation loss to the packet-transmitting base station and the other propagation loss to the other link base stations. The mobile station adds a large off-set power if the difference of the current transmission power from the target transmission power is large. The mobile station also adds a small off-set power if the difference of the current transmission power from the target transmission power is small. This allows keeping a desired high receiving quality of the acknowledge/non-acknowledge signal (ACK/NACK) at the packet-transmitting base station and also reducing any substantive interference on the up-link, independently from the propagation loss.

It is also possible that the second transmission power control process adjusts the off-set power based on the second transmission power control information which includes the number of times of receipt of a first transmission power control signal indicating a request for power-increase from the at least one packet-transmitting base station for a predetermined period of time.

In accordance with this configuration, the mobile station decides the off-set power.P based on the number of times of the request for power-up from the packet-transmitting base station. If the current transmission power does not reach the target transmission power at the time of transmitting the acknowledge/non-acknowledge signal (ACK/NACK), then the counted number of times of the request for power-up is sill larger than the predetermined threshold value, whereby the large off-set power is added to the current transmission power. Accordingly, the off-set power level can be decided depending upon the issue of whether the current transmission power does not reach the target transmission power at the time of transmitting the acknowledge/non-acknowledge signal (ACK/NACK). This allows keeping a desired high receiving quality of the acknowledge/non-acknowledge signal (ACK/NACK) at the packet-transmitting base station and also reducing any substantive interference on the up-link.

In accordance with this configuration, after the mobile station has been placed into the state of receiving the packet, then the mobile station may commence to count up the number of times of the request for power-up from the base station. This reduces the number of processes by the mobile station if the mobile station is in the other state, thereby making the cellular system free from the above-described problem engaged with the second conventional technique.

It is also possible that the second transmission power control process adjusts the off-set power based on the second transmission power control information which includes a receiving quality of a common pilot signal transmitted from each of the plural link base stations in the soft handover state.

It is also possible that the second transmission power control process adjusts the off-set power based on the second transmission power control information which includes the number of times of receipt of a null transmission power control signal having a receiving quality lower than a predetermined threshold receiving quality level transmitted from the at least one packet-transmitting base station.

In accordance with this configuration, the mobile station decides the off-set power .P based on the counted number of times (Nign) of receipts of the null transmission power control signals having lower receiving qualities than the predetermined threshold receiving quality level transmitted from the packet-transmitting base station. If the propagation loss is light, then a probability of deterioration of the transmission power control signal is also high. In accordance with this configuration, if the propagation loss is light, then a large off-set power is added to the current transmission power. This allows keeping a desired high receiving quality of the acknowledge/non-acknowledge signal (ACK/NACK) at the packet-transmitting base station and also reducing any substantive interference on the up-link.

It is also possible that after the at least one mobile station has performed the second transmission power control process, then the second transmission power control process decides the off-set power.

It is also possible that after the at least one mobile station has performed the second transmission power control process, then the second transmission power control process decides the off-set power based on a difference between the second transmission power control information received from the at least one packet-transmitting base station and other transmission power control information received from other of the plural link base stations in the soft handover state than the at least one packet-transmitting base station.

It is also possible that an additional process is performed by the at least one packet-transmitting base station for increasing, by a predetermined secondary off-set power, a secondary transmission power for transmitting the second transmission power control information to the at least one mobile station, after the at least one packet-transmitting base station has transmitted an advance notice of packet transmission to the at least one mobile station. The additional process further decreases the increased secondary transmission power by the predetermined secondary off-set power, after the at least one packet-transmitting base station has received a notice of completion of packet transmission from the at least one mobile station.

In accordance with this embodiment, after the packet transmission has been completed, then the increased transmission power for transmitting the transmission power control signal is made into the original transmission power, thereby improving the high receiving quality of the acknowledge/non-acknowledge signal (ACK/NACK) at the packet-transmitting base station and also reducing any substantive interference on the up-link.

It is also possible that the second transmission power control information includes a first number of times of receipt of a first transmission power control signal which indicates a first request for power-increase, and a second number of times of receipt of a second transmission power control signal which indicates a second request for power-decrease. The second transmission power control process counts the first and second transmission power control signals separately, and the second transmission power control process compares the first number counted to a predetermined first threshold value and also compares the second number counted to a predetermined second threshold value. If the first number counted exceeds the predetermined first threshold value, then the second transmission power control process increases the current transmission power, and if the number counted exceeds the predetermined second threshold value, then the second transmission power control process decreases the current transmission power. It is preferable that the predetermined first threshold value is smaller than the predetermined second threshold value.

In accordance with this configuration, the mobile station does not change the current transmission power until the mobile station has received plural times of receipts of either the first transmission power control signals or the second transmission power control signals. This reduces a probability that the mobile station makes undesired erroneous transmission power control opposite to the request from the packet-transmitting base station.

In accordance with this configuration, the first predetermined threshold value is smaller than the second predetermined threshold value in order to reduce a probability that the mobile station makes undesired erroneous control of decreasing the transmission power opposite to the request for power-up from the packet-transmitting base station.

In accordance with this configuration, a reduced number of commands is necessary for increasing the current transmission power. This improves the responsibility to the request for power-up. The mobile station accelerates the transmission power increase up to the target power level necessary for causing that the measured signal-to-interference-ratio (SIR) at the packet-transmitting base station reaches the predetermined target signal-to-interference-ratio (SIR), thereby improving the receiving quality of the acknowledge/non-acknowledge signal (ACK/NACK) at the packet-transmitting base station.

In accordance with this configuration, during receipt of the packet, the mobile station adds the off-set power to the current transmission power of the transmission power control signal transmitted from the packet-transmitting base station, so as to reduce a probability that the mobile station erroneously receives the transmission power control signal transmitted from the packet-transmitting base station.

This configuration allows keeping a desired high receiving quality of the acknowledge/non-acknowledge signal (ACK/NACK) at the packet-transmitting base station.

In accordance with this configuration, after the packet transmission has been completed, then the increased transmission power for transmitting the transmission power control signal is made into the original transmission power, thereby improving the high receiving quality of the acknowledge/non-acknowledge signal (ACK/NACK) at the packet-transmitting base station and also reducing any substantive interference on the up-link.

It is also possible that the second transmission power control information includes a transmission power control signal transmitted from the at least one packet-transmitting base station, and the second transmission power control process measures a receiving quality of the transmission power control signal and compares the receiving quality measured to a predetermined threshold value. If the receiving quality measured is lower than the predetermined threshold value, then the second transmission power control process considers that the transmission power control signal indicates a first request for power-increase, and the second transmission power control process increases the current transmission power.

In accordance with this configuration, if the receiving quality of the transmission power control signal transmitted from the packet-transmitting base station is poor which indicates a low reliability, then the mobile station increases the transmission power. This reduces a probability that the mobile station erroneously receives the transmission power control signal and decreases the transmission power opposite to the request for the power-up from the packet-transmitting base station.

As the propagation loss is high, then the probability of the deteriorated receiving quality of the transmission power control signal is high. For this reason, it is, in general, possible that the mobile station erroneously receives the transmission power control signal and decreases the transmission power opposite to the request for the power-up from the packet-transmitting base station. As described above, in accordance with this embodiment, however, the above configuration reduces a probability that the mobile station erroneously receives the transmission power control signal and decreases the transmission power opposite to the request for the power-up from the packet-transmitting base station, thereby improving the receiving quality of the acknowledge/non-acknowledge signal (ACK/NACK) at the packet-transmitting base station.

In case that the transmission power control signal indicates the power-down, if the receiving quality of the transmission power control signal is lower than the predetermined threshold value, then the mobile station unnecessarily increases the current transmission power which reaches the target transmission power. In accordance with this embodiment, after the mobile station transmitted the first acknowledge/non-acknowledge signal (ACK/NACK), then the mobile station makes the changed execution condition for the receiving quality deterioration of the transmission power control signal into the original execution condition, in order to prevent that the controlled transmission power exceeds the target transmission power and also to reduce the interference on the up-link.

It is also possible that the first transmission power control information includes a first synthesized signal from a first number of first transmission control signals received the first number of times and transmitted from each of the plural link base stations. The first transmission power control process controls the current transmission power based on the first synthesized signal. The second transmission power control information includes a second synthesized signal from a second number of second transmission control signals received the second number of times and transmitted from the at least one packet-transmitting base station as well as a third synthesized signal from the first number of second transmission control signals received the first number of times and transmitted from the at least one packet-transmitting base station. The second transmission power control process controls the current transmission power based on the second synthesized signal before the at least one mobile station will make the first transmission of the acknowledge/non-acknowledge signal to the at least one packet-transmitting base station. The second transmission power control process controls the current transmission power based on the third synthesized signal after the at least one mobile station has made the first transmission of the acknowledge/non-acknowledge signal to the at least one packet-transmitting base station. It is preferable that the second number is smaller than the first number.

In accordance with this configuration, it is possible to shorten the transmission power control cycle, for example, in case that after the mobile station has received plural transmission power control signals, then the mobile station renews the transmission power based on a synthesized signal of the received plural transmission power control signals. This improves the responsibility to the requests for the transmission power control based on the transmission power control signal. This makes it easy to achieve and realize that the current transmission power is increased up to the target transmission power within a limited time period defined from commencement of receiving packet to transmission of the acknowledge/non-acknowledge signal (ACK/NACK), thereby improving the receiving quality of the acknowledge/non-acknowledge signal (ACK/NACK) at the packet-transmitting base station.

In accordance with this configuration, after the mobile station has transmitted the first acknowledge/non-acknowledge signal (ACK/NACK), then the mobile station makes the changed transmission power control cycle into the normal or original transmission power control cycle. The plural received transmission power control signals are synthesized about when the current transmission power has been increased up to the target transmission power, thereby improving the reliability of the transmission power control signals and also reducing the probability of erroneous receipt of the transmission power control signals.

It is possible that if the at least one mobile station is placed in the first state, then the second transmission power control process makes a packet-transmitting-base-station priority control for controlling the current transmission power based on a transmission control signal which indicates at least one of a first request for power-increase and a second request for power-decrease and which has been transmitted from the at least one packet-transmitting base station, and if the at least one mobile station is placed in the second state, then the second transmission power control process makes a power-down priority control for decreasing the current transmission power by a predetermined power level if at least one of transmission power control signals transmitted from all of the plural link base stations indicates a request for power-decease, and for increasing the current transmission power by another predetermined power level if all of the transmission power control signals transmitted from all of the plural link base stations indicate another request for power-increase.

In accordance with this configuration, the mobile station adds the off-set power to the current transmission power just after the mobile station is shifted from the power-down priority control mode to the packet-transmitting-base-station priority control mode, where the difference of the current transmission power from the target transmission power is still large, thereby reducing a probability that the addition of the off-set power causes the increased transmission power to exceed the target transmission power, and reducing any interference on the up-link.

The following embodiments are typical examples for practicing the foregoing aspects of the present invention. Although the subject matters of the present invention have been described in details, the following additional descriptions in one or more typical preferred embodiments or examples will be made with reference to the drawings for making it easy to understand the typical modes for practicing the foregoing aspects of the present invention.

First Embodiment

Figure 4:
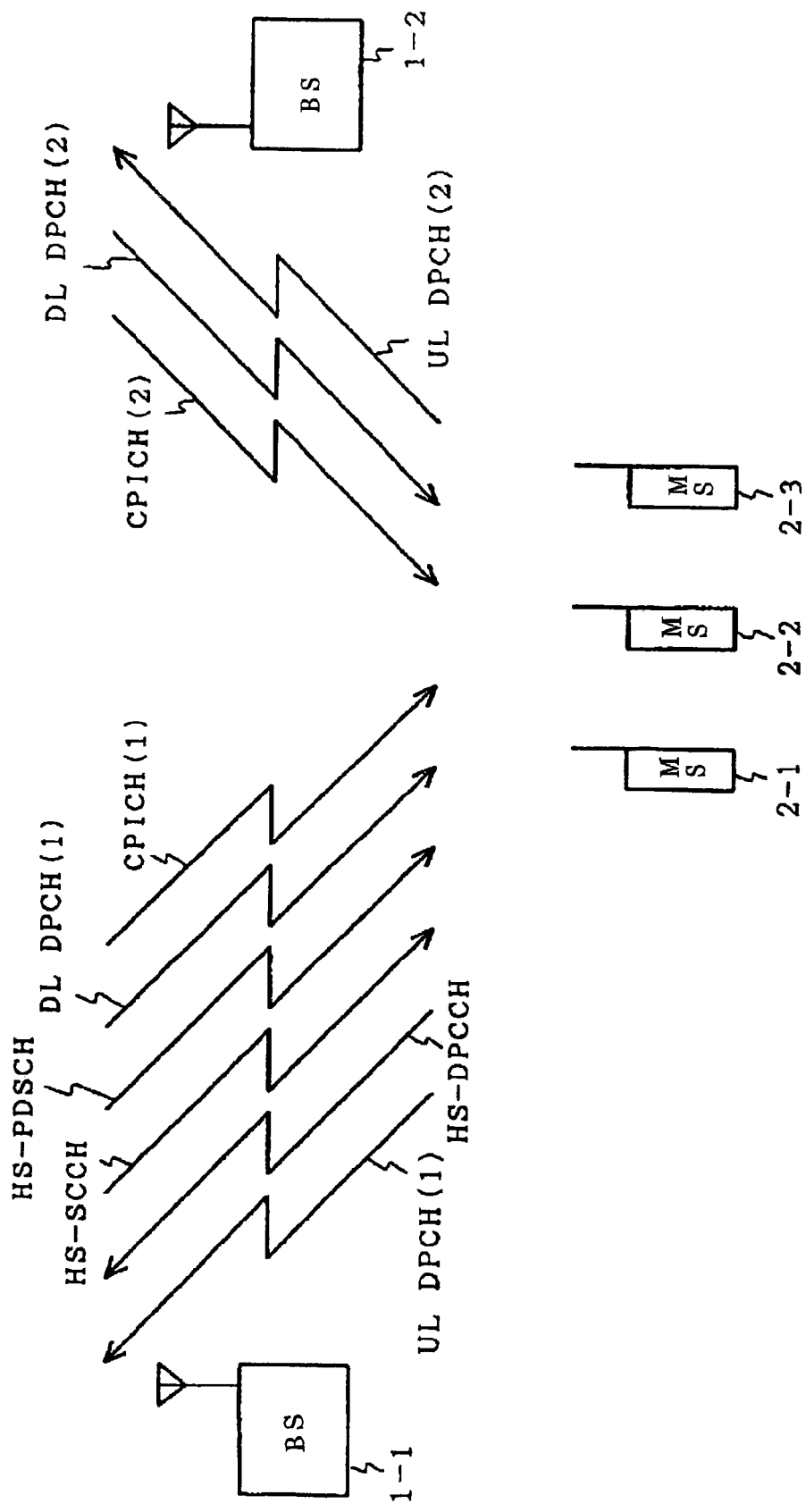
FIG. 4 is a schematic diagram illustrative of a novel configuration of a cellular system in a first embodiment in accordance with the present invention.

A first embodiment according to the present invention will be described in detail with reference to the drawings. FIG. 4 is a schematic diagram illustrative of a novel configuration of a cellular system in a first embodiment in accordance with the present invention. The cellular system may include plural base stations 1-1 and 1-2 and plural mobile stations 2-1, 2-2, and 2-3, provided that the base stations 1-1 and 1-2 are provided in different cells respectively. In this embodiment, the descriptions will be made by taking an example that the two base stations 1-1 and 1-2 are provided for the three mobile stations 2-1, 2-2 and 2-3. The respective numbers of the base stations and the mobile stations are optional. The present invention is, of course, applicable to another example that the three or more base stations are provided for the three mobile stations 2-1, 2-2 and 2-3. In general, however, a large number of mobile stations are provided for each base station. The applicability of the present invention is not limited to the typical example shown in FIG. 4, wherein the three mobile stations 2-1, 2-2 and 2-3 are present in the same transmission system. The present invention is also applicable to still another example that four or more mobile stations are present in the same transmission system. A wire-less access system between the base stations 1-1, and 1-2 and the mobile stations 2-1, 2-2 and 2-3 may be a code division multiple access (CDMA).

As shown in FIG. 4, the following down-link channels are established from the base station 1-1 to the mobile station 2-1. A high-speed physical downlink shared channel (HS-PDSCH) is established for transmitting a signal from the base station 1-1 to the mobile station 2-1. A first down-link dedicated physical channel (DL-DPCH) (1) is also established for transmitting a signal from the base station 1-1 to the mobile station 2-1. A first common pilot channel (CPICH) (1) is also established for transmitting a signal from the base station 1-1 to the mobile station 2-1. A high-speed shared control channel (HS-SCCH) is also established for transmitting a signal from the base station 1-1 to the mobile station 2-1.

The following up-link channels are established from the mobile station 2-1 to the base station 1-1. A first up-link dedicated physical channel (UL-DPCH) (1) is established to transmit a signal from the mobile station 2-1 to the base station 1-1. A high-speed dedicated physical control channel (HS-DPCCH) as an up-link channel is also established to transmit a signal from the mobile station 2-1 to the base station 1-1.

The following down-link channels are established from the base station 1-2 to the mobile station 2-1. A second down-link dedicated physical channel (DL-DPCH) (2) is also established for transmitting a signal from the base station 1-2 to the mobile station 2-1. A second common pilot channel (CPICH) (2) is also established for transmitting a signal from the base station 1-2 to the mobile station 2-1.

The following up-link channels are established from the mobile station 2-1 to the base station 1-2. A second up-link dedicated physical channel (UL-DPCH) (2) is established to transmit a signal from the mobile station 2-1 to the base station 1-2.

The second up-link dedicated physical channel (UL-DPCH) (2) and the first up-link dedicated physical channel (UL-DPCH) (1) are different from each other in the base stations which are linked thereto and are the same as each other in the transmission signal from the mobile station.

The high-speed physical downlink shared channel (HS-PDSCH) is a high speed channel to be used for transmitting a large file such as a dynamic image in a short time. The common pilot channel (CPICH) is a down-link channel for always transmitting a common pilot signal from the base stations 1-1 and 1-2 to the mobile station 2-1.

The dedicated physical channel (DPCH) is an up-link or down-link discrete (physical) channel. The dedicated physical channel (DPCH) comprises a dedicated physical control channel (DPCCH) and a dedicated physical data channel (DPDCH). The dedicated physical control channel (DPCCH) includes discrete pilot channels "Pilot", discrete transmit power control bits "TPC", and discrete feedback informations "FBI". The dedicated physical data channel (DPDCH) comprise data "Data" which include user informations and control informations. The dedicated physical control channel (DPCCH) and the dedicated physical data channel (DPDCH) are modified and multiplexed for subsequent transmission.

The high-speed dedicated physical control channel (HS-DPCCH) has a single slot length corresponding to three slots of each of the dedicated physical control channel (DPCCH) and the dedicated physical data channel (DPDCH). One slot of the dedicated physical control channel (DPCCH) comprises a single set of the pilot channel "Pilot", the transmit power control bit "TPC" and the feedback information "FBI". One slot of the dedicated physical data channel (DPDCH) comprises a single set of data "Data". The single slot length of the high-speed dedicated physical control channel (HS-DPCCH) includes a delivery acknowledge notification (acknowledge/non-acknowledge signal: ACK/NACK signal) and a channel quality indicator (CQI) which indicates the quality of the down-link. A judgement of the acknowledge/non-acknowledge signal (ACK/NACK) included in the high-speed dedicated physical control channel (HS-DPCCH) is made by the base station which has the high-speed dedicated physical control channel (HS-DPCCH) and has transmitted the packet. For this reason, any diversity synthesis between the base stations is not made.

The up-links of the dedicated physical channels (DPCH) are subjected to a diversity synthesis between the link base stations 31-1 and 31-2, wherein the diversity synthesis is made by a wire-less network control station (BSC). This dedicated physical channel (DPCH) is subjected to the above-described high speed closed loop transmission power control, so that the dedicated physical channel (DPCH) has a predetermined receiving quality. A transmission power (PH) of the high-speed dedicated physical control channel (HS-DPCCH) is equal to a sum of a transmission power (PD) of the dedicated physical channel (DPCH) and a predetermined offset power (.).

$$PH=PD+. \quad (1)$$

Informations about the mobile station as the destination for receiving the transmission packet and also control informations necessary for receiving the packet are transmitted through a high-speed shared control channel (HS-SCCH).

The base station 1-1 transmits the signal through the first common pilot channel (CPICH) (1) to the mobile station 2-1. The base station 1-2 transmits the signal through the second common pilot channel (CPICH) (2) to the mobile station 2-1. Those common pilot channels (CPICH) are diffused by scrambled codes which are different for every cells. Each of the mobile stations 2-1, 2-2 and 2-3 identifies the cell based on the scrambled code. Each of the mobile stations 2-1, 2-2 and 2-3 sets the dedicated physical channels (DPCH) of up-link (UL) and down-link (DL) to one or more base stations for waiting for receiving down-link data.

If the mobile station 2-1 has a difference, which is lower than a predetermined value, between receiving powers of the first common pilot channel (CPICH) (1) to the base station 1-1 and of the second common pilot channel (CPICH) (2) to the base station 1-2, then the mobile station 2-1 establishes not only the first dedicated physical channel (DPCH) (1) to the base station 1-2 but also the second dedicated physical channel (DPCH) (2) to the base station 2-2. Namely, the mobile station 2-1 establishes the plural dedicated physical channels (DPCH) to the plural base stations 1-1 and 1-2, for which reason the mobile station 2-1 is placed in a soft handover.

Each of the up-link dedicated physical channel (UL-DPCH) and the down-link dedicated physical channel (DL-DPCH) includes a discrete pilot signal (Pilot) which comprises a predetermined bit string. The transmission power of the up-link dedicated physical channel (UL-DPCH) is controlled by a high speed closed loop transmission power control. The base station utilizes the discrete pilot signal included in the up-link dedicated physical channel (UL-DPCH) in order to measure a received signal-to-interference-ratio (SIR) of the dedicated physical channel (DPCH) and compare the measured value to a predetermined target signal-to-interference-ratio (SIR).

If the measured value is smaller than the target value, then the base station generates a transmit power control bit (TPC_UP) which indicates the power-up, and transmits the down-link signal including this transmit power control bit (TPC_UP) to the mobile station 2-1 through the down-link dedicated physical channel (DL-DPCH). If the measured value is not smaller than the target value, then the base station generates another transmit power control bit (TPC_DOWN) which indicates the power-down, and transmits the down-link signal including this transmit power control bit (TPC_DOWN) to the mobile station 2-1 through the down-link dedicated physical channel (DL-DPCH). The target signal-to-interference-ratio (SIR) is notified from a radio network controller (RNC) which is not illustrated.

Each of the base stations 2-1 and 2-2 establishes the high-speed physical downlink shared channel (HS-PDSCH) to the plural mobile stations 2-1, 2-2 and 2-3. The high-speed physical downlink shared channel (HS-PDSCH) is a high speed channel higher than the dedicated physical channel (DPCH). The transmission power of the high-speed physical downlink shared channel (HS-PDSCH) is higher than the down-link dedicated physical channel (DL-DPCH). Each of the base stations 1-1 and 1-2 utilizes the single high-speed physical downlink shared channel (HS-PDSCH) for transmitting the data to the plural mobile stations 2-1, 2-2 and 2-3.

If the radio network controller (RNC) receives, from a communication network, data to be transmitted to the mobile station 2-1, then the radio network controller (RNC) transfers the received data to the base station 1-2, to which the dedicated physical channel (DPCH) is established from the mobile station 2-1.

Figure 5:
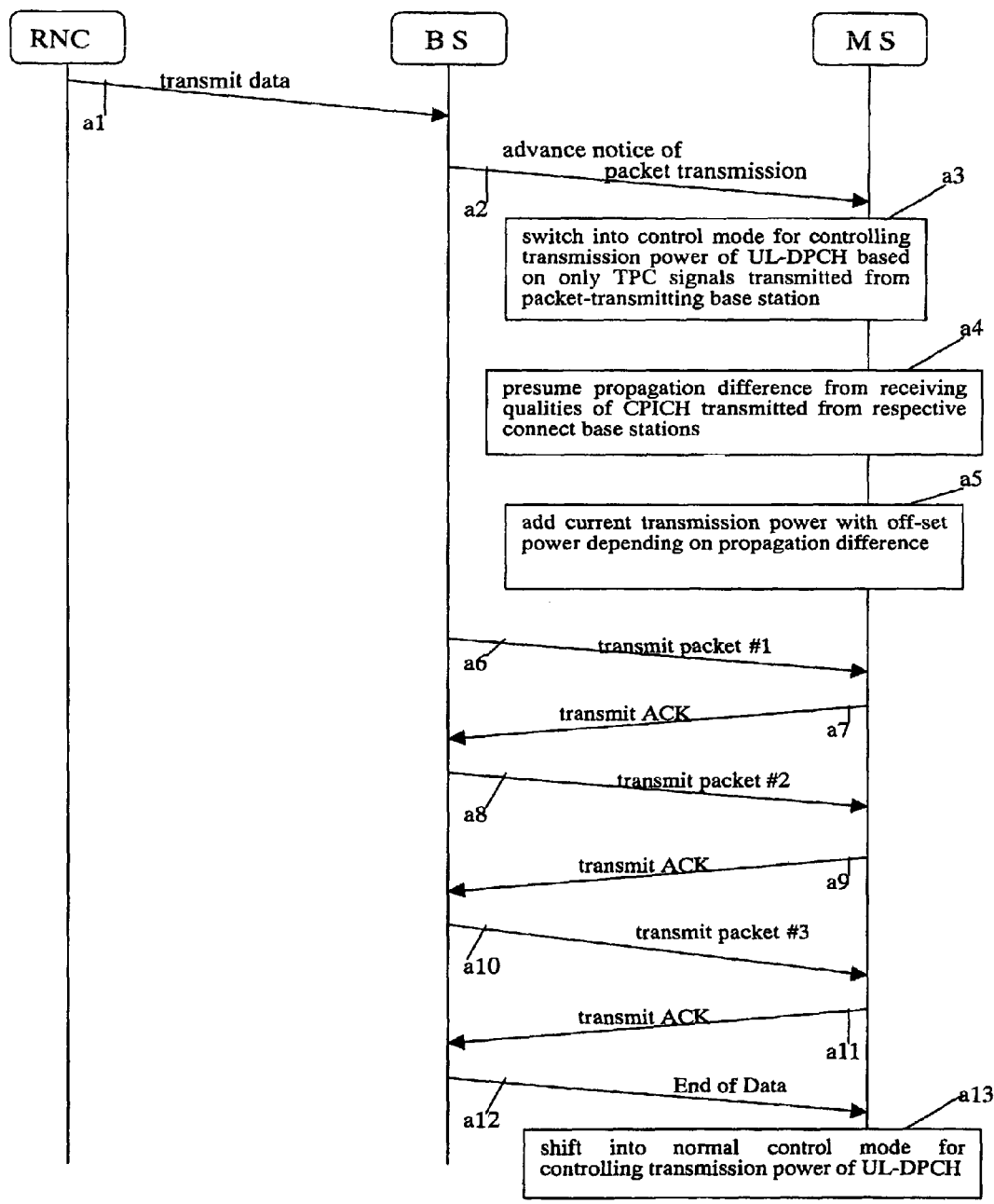
FIG. 5 is a sequence chart illustrative of sequential operations of the cellular system shown in FIG. 4.

FIG. 5 is a sequence chart illustrative of sequential operations of the cellular system shown in FIG. 4. "MS" represents the mobile station 2-1 shown in FIG. 4. "BS" represents the base station 1-1 shown in FIG. 4. "RNC" represents the radio network controller.

In step a1, if the radio network controller (RNC) receives, from a communication network, data to be transmitted to the mobile station 2-1, then the radio network controller (RNC) transfers the received data to the base station 1-1, to which the dedicated physical channel (DPCH) is established from the mobile station 2-1.

In step a2, the base station 1-1 sends the mobile station 2-1 an advance notice to the effect that a packet of data is transmitted.

In step a3, the mobile station 2-1 receives the advance notice of data transmission from the base station 1-1. The mobile station 2-1 is switched into a control mode for controlling the transmission power of the up-link dedicated physical channel (UL-DPCH) from the mobile station 2-1 based on only the transmit power control signal (TPC) transmitted from the packet-transmitting base station 1-1.

In step a4, further, the mobile station 2-1 presumes a difference.PL (=PL1−PL2) between a first propagation loss PL1 with the base station 1-1 and a second propagation loss PL2 with the base station 1-2, from a measurement result of measuring receiving qualities of the first common pilot channel (CPICH) (1) transmitted from the base station 1-1 and of the second common pilot channel (CPICH) (2) transmitted from the base station 1-2.

In step a5, the mobile station 2-1 decides an off-set power P depending upon the presumed difference.PL (=PL1−PL2) and adds the off-set power P to the current transmission power of the up-link dedicated physical channel (UL-DPCH).

In step a6, the base station 1-1 divides the received data into a plurality of packets. The base station 1-1 transmits a first packet #1 through the high-speed physical downlink shared channel (HS-PDSCH) to the mobile station 2-1.

In step a7, if the mobile station 2-1 safely receives the first packet #1 from the base station 1-1, then the mobile station 2-1 transmits the acknowledge signal (ACK) through the high-speed dedicated physical control channel (HS-DPCCH) to the base station 1-1.

In step a8, the base station 1-1 transmits a second packet #2 through the high-speed physical downlink shared channel (HS-PDSCH) to the mobile station 2-1.

In step a9, if the mobile station 2-1 safely receives the second packet #2 from the base station 1-1, then the mobile station 2-1 transmits the acknowledge signal (ACK) through the high-speed dedicated physical control channel (HS-DPCCH) to the base station 1-1.

In step a10, the base station 1-1 transmits a third packet #3 through the high-speed physical downlink shared channel (HS-PDSCH) to the mobile station 2-1.

In step a11, if the mobile station 2-1 safely receives the third packet #3 from the base station 1-1, then the mobile station 2-1 transmits the acknowledge signal (ACK) through the high-speed dedicated physical control channel (HS-DPCCH) to the base station 1-1.

In step a12, after the data transmission has been completed, the base station 1-1 sends the mobile station 2-1 a notice of end of data.

In step a13, upon receipt of the notice of end of data from the base station 1-1, the mobile station 2-1 is shifted from the above control mode into a normal control mode for controlling the transmission power of the up-link dedicated physical channel (UL-DPCH) based on all the transmit power control signals (TPC) transmitted from the link base stations in the soft handover. The above control mode controls the transmission power of the up-link dedicated physical channel (UL-DPCH) based on only the transmit power control signal (TPC) transmitted from the packet-transmitting base station 1-1. Instead of receipt of the notice of end of data, it is possible that if the mobile station 2-1 does not receive any packet from the base station 1-1 for a predetermined period of time, then the mobile station 2-1 is shifted from the above control mode into the normal control mode.

Figure 6:
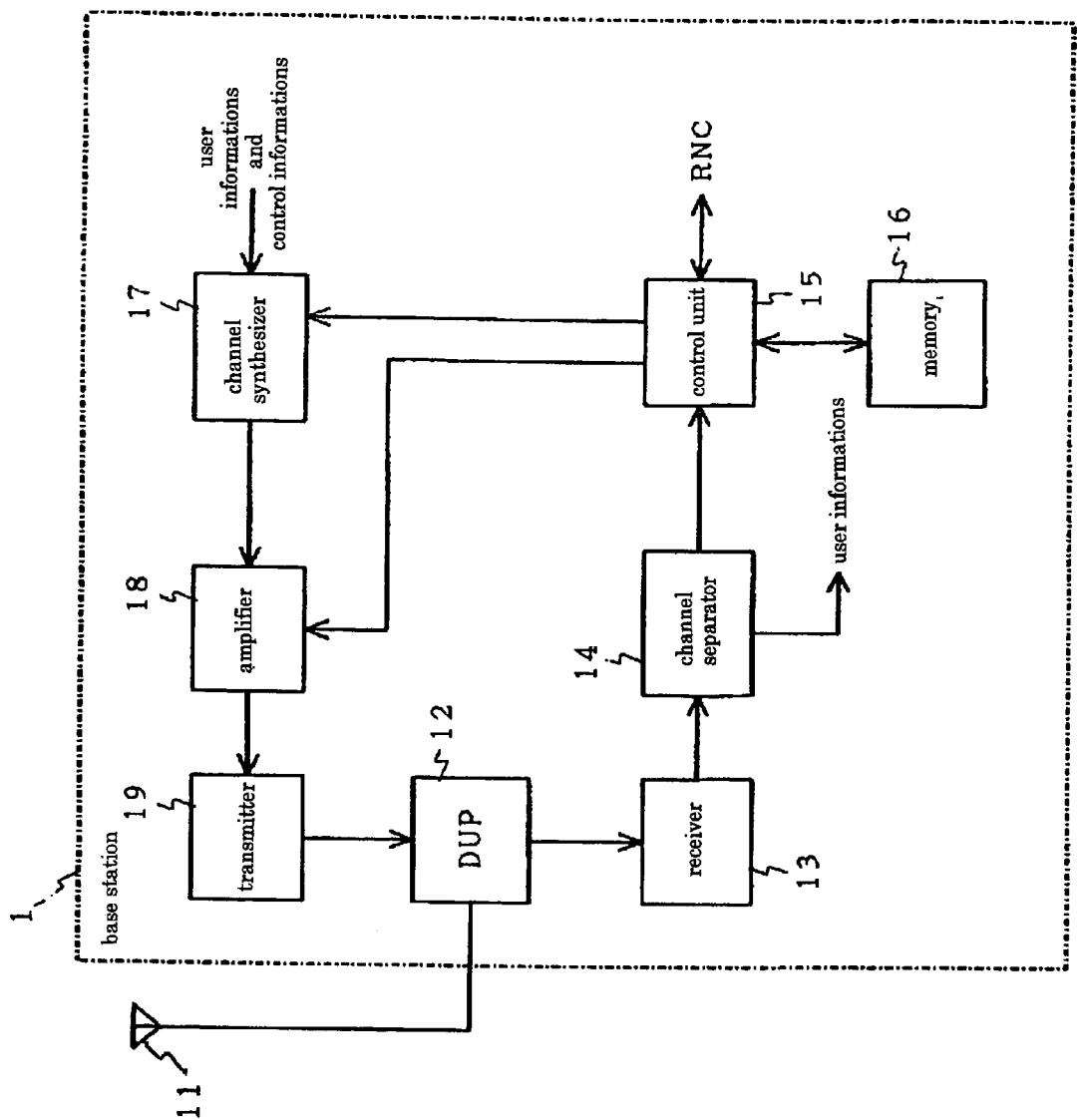
FIG. 6 is a block diagram illustrative of an internal configuration of each of the base stations shown in FIG. 4.

FIG. 6 is a block diagram illustrative of an internal configuration of each of the base stations 1-1 and 1-2 shown in FIG. 4. Each of the base stations 1-1 and 1-2 will be referred to as a base station 1. The base station 1 includes an antenna 11, a duplexer (DUP) 12, a receiver 13, a channel separator 14, a control unit (CPU) 15, a memory 16, a channel synthesizer 17, an amplifier 18 and a transmitter 19.

The antenna 11 receives the transmitted signal. The received signal is then transferred through the duplexer (DUP) 12 to the receiver 13, wherein the received signal is subjected to processes such as amplification, frequency conversion and demodulation. The demodulated signal is then transferred to the channel separator 14 and separated into user informations and various control informations. The control informations are transferred to the control unit (CPU) 15, so that the control unit (CPU) 15 executes a program stored in the memory 16 based on the received control informations.

User informations and control informations for the mobile stations 2-1, 2-2 and 2-3 are synthesized by the channel synthesizer 17. The synthesized signal is then transferred to the amplifier 18 and amplified. The amplified signal is then transferred to the transmitter 19 and subjected to processes such as modulation and frequency conversion. The signal is then transferred through the duplexer (DUP) 12 to the antenna 11, for which the signal is transmitted.

Figure 7:
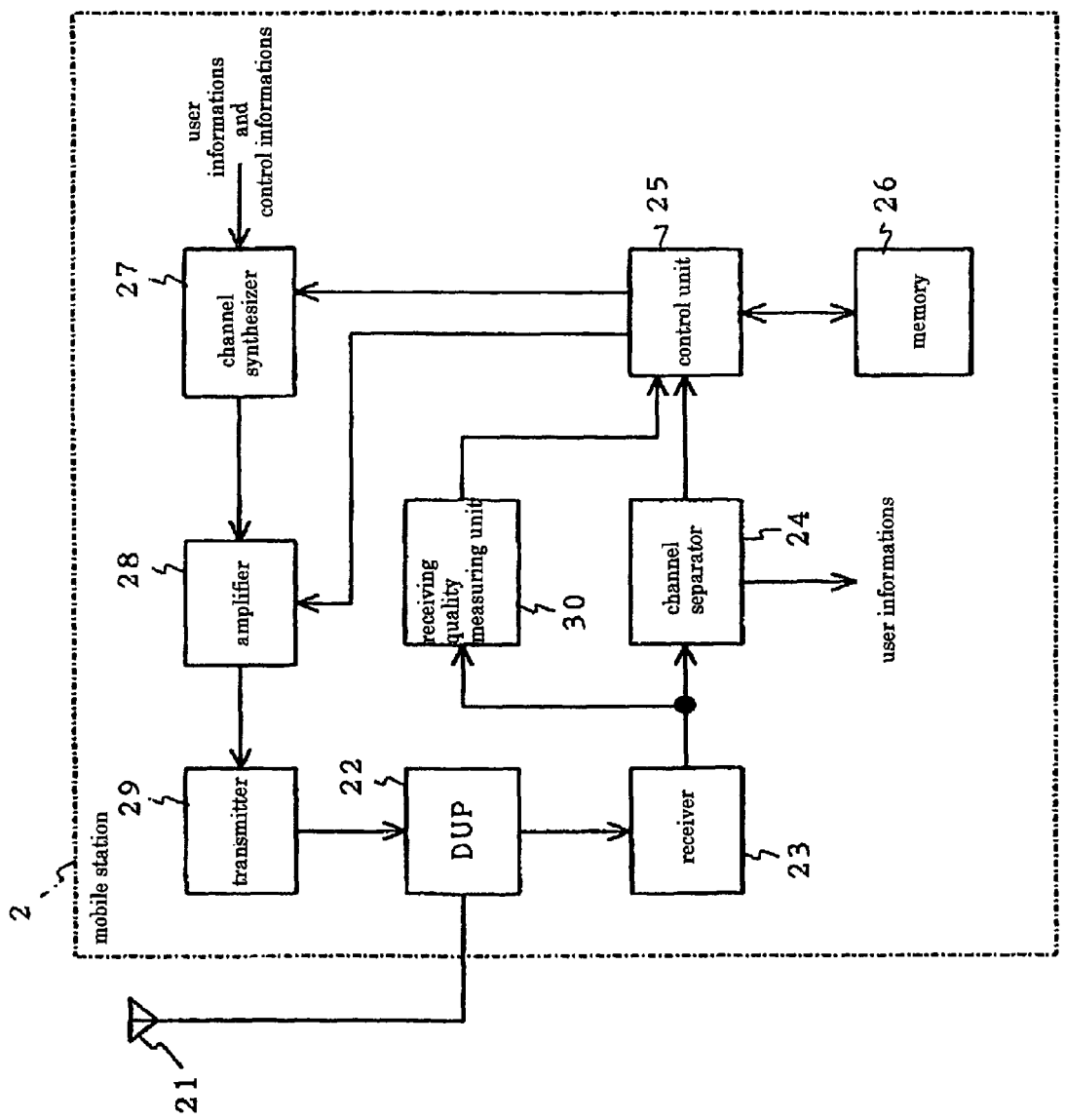
FIG. 7 is a block diagram illustrative of an internal configuration of each of the mobile stations shown in FIG. 4.

FIG. 7 is a block diagram illustrative of an internal configuration of each of the mobile stations 2-1, 2-2 and 2-3 shown in FIG. 4. Each of the mobile stations 2-1, 2-2 and 2-3 will be referred to as a mobile station 2. The mobile station 2 includes an antenna 21, a duplexer (DUP) 22, a receiver 23, a channel separator 24, a control unit (CPU) 25, a memory 26, a channel synthesizer 27, an amplifier 28, a transmitter 29 and a receiving quality measuring unit 30.

The antenna 21 receives the transmitted signal. The received signal is then transferred through the duplexer (DUP) 22 to the receiver 23, wherein the received signal is subjected to processes such as amplification, frequency conversion and demodulation. The demodulated signal is then transferred to the channel separator 24 and separated into user informations and various control informations including the transmit power control signal (TPC). The transmit power control signal (TPC) is transferred to the control unit (CPU) 25. The receiving qualities of the pilot signal and the transmit power control signal (TPC) are measured by the receiving quality measuring unit 30. The measured receiving qualities are then transferred to the control unit (CPU) 25. The control unit (CPU) 25 executes a program stored in the memory 26 for performing the processes of steps a3, a4, a5 and a13 shown in FIG. 5.

User informations and control informations for the base stations 1-1 and 1-2 are synthesized by the channel synthesizer 27. The synthesized signal is then transferred to the amplifier 28 and amplified. The amplified signal is then transferred to the transmitter 29 and subjected to processes such as modulation and frequency conversion. The signal is then transferred through the duplexer (DUP) 22 to the antenna 21, for which the signal is transmitted.

Figure 8:
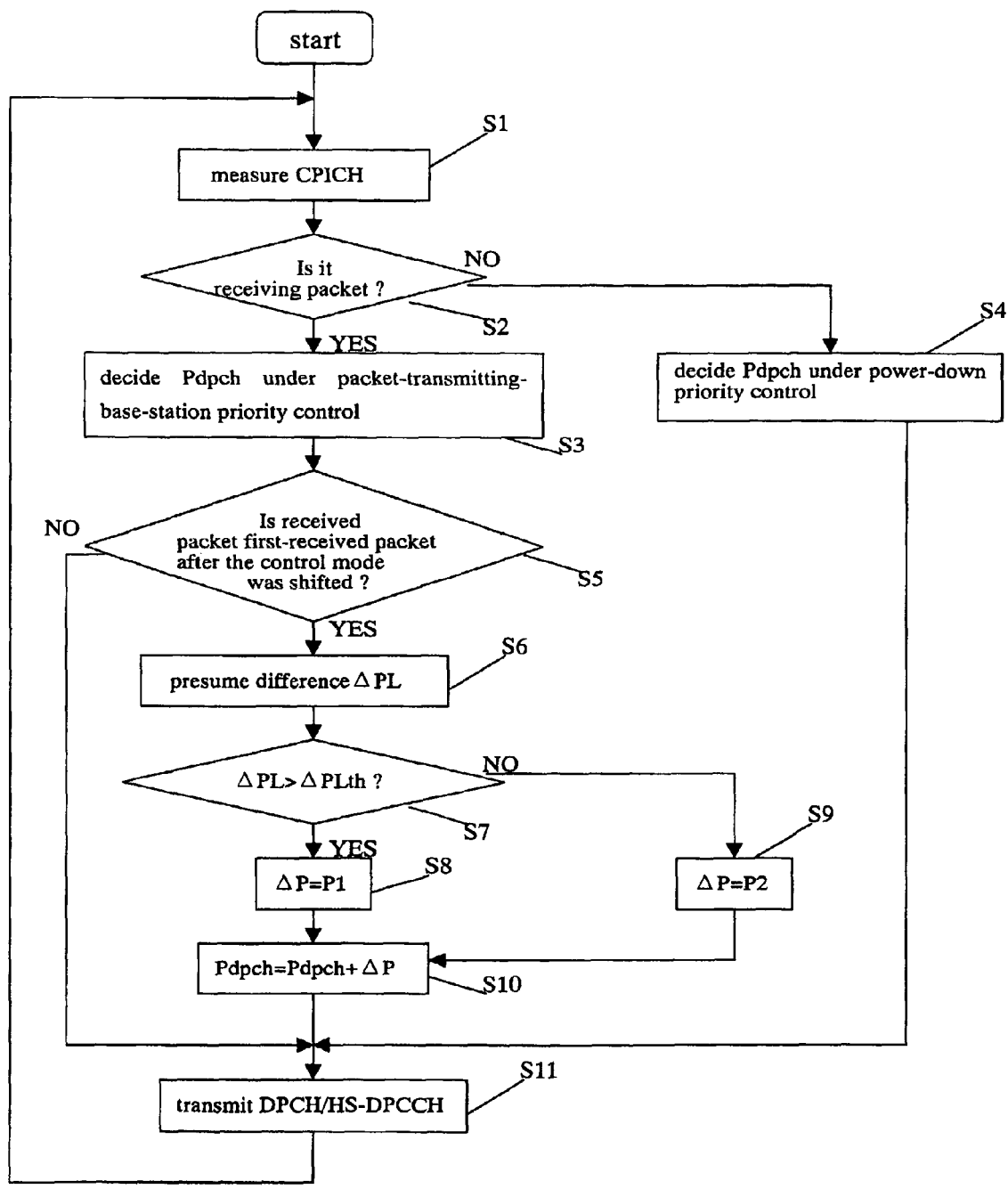
FIG. 8 is a flow chart illustrative of operations of each of the mobile stations shown in FIG. 4.

FIG. 8 is a flow chart illustrative of operations of each of the mobile stations 2-1, 2-2 and 2-3 shown in FIG. 4. Each of the mobile stations 2-1, 2-2 and 2-3 will herein be referred to as a mobile station 2.

In step S1, the mobile station 2 measures the receiving quality of the common pilot channel (CPICH) which is cyclically transmitted from each of the link base stations 1-1 and 1-2.

In step S2, the mobile station 2 receives the transmit power control signal (TPC) transmitted from each of the link base stations 1-1 and 1-2.

In step S3, if the mobile station 2 is in a state of receiving the packet, then the mobile station 2 performs a packet-transmitting-base-station priority control which controls a transmission power Pdpch [dB] of the up-link dedicated physical channel (UL-DPCH) based on only the transmit power control signal (TPC) transmitted from the packet-transmitting base station.

In step S4, if the mobile station 2 is in other states, then the mobile station 2 performs a power-down priority control to decide the transmission power Pdpch [dB]. In accordance with this power-down priority control, if at least one of the transmit power control signals (TPC) transmitted from all of the link base stations indicates the power-down of the transmission power, then the mobile station 2 decreases the transmission power by a predetermined power level. If all of the transmit power control signals (TPC) transmitted from all of the link base stations indicate the power-up of the transmission power, then the mobile station 2 increases the transmission power by a predetermined power level.

In step S5, it is verified whether the mobile station 2 commences to receive a first packet after the mobile station 2 has just been shifted from the power-down priority control to the packet-transmitting-base-station priority control.

In step S6, if the received packet is the first-received packet after the above control mode was shifted, then the mobile station 2 presumes a difference.PL (=PLsrv−PLnsrv) between a propagation loss (PLsrv) of the packet transmitting base station and another propagation loss (PLnsrv) of the other link base station, from the receiving quality of the common pilot channel (CPICH).

In step S7, the mobile station 2 compares the presumed difference.PL to a predetermined threshold value PLth.

In step S8, if the presumed difference.PL is larger than the predetermined threshold value PLth, then the mobile station 2 decides the off-set power.P to be P1[dB](.P=P1).

In step S9, if the presumed difference.PL is smaller than the predetermined threshold value PLth, then the mobile station 2 decides the off-set power.P to be P2[dB](.P=P2), provided that P2 is smaller than P1.

In step S10, the mobile station 2 adds the decided off-set power.P to the current transmission power Pdpch [dB] of the dedicated physical channel (DPCH).

In step S11, the mobile station 2 transmits the signal through the dedicated physical channel (DPCH) at the renewed transmission power Pdpch [dB] and also transmits the signal through the high-speed dedicated physical control channel (HS-DPCCH) at a transmission power Phs (=Pdpch+.Phs), where .Phs is a predetermined off-set power for the high-speed dedicated physical control channel (HS-DPCCH).

The mobile station 2 repeats the above-described sequential processes in a predetermined cycle.

In accordance with this embodiment, the two off-set values P1 and P2 are set. It is also possible that plural threshold values are set and three or more off-set values are set.

In accordance with this embodiment, the mobile station 2 adds the off-set power.P to the current transmission power for acceleration of the transmission power increase up to the target power level necessary for causing that the measured signal-to-interference-ratio (SIR) at the packet-transmitting base station 1-1 reaches the predetermined target signal-to-interference-ratio (SIR), thereby improving the receiving quality of the acknowledge/non-acknowledge signal (ACK/NACK) at the packet-transmitting base station 1-1.

In accordance with this embodiment, the mobile station 2 decides the off-set power.P based on the difference between the propagation loss to the packet-transmitting base station and the other propagation loss to the other link base stations. The mobile station 2 adds a large off-set power if the difference of the current transmission power from the target transmission power is large. The mobile station 2 also adds a small off-set power if the difference of the current transmission power from the target transmission power is small. This allows keeping a desired high receiving quality of the acknowledge/non-acknowledge signal (ACK/NACK) at the packet-transmitting base station 1-1 and also reducing any substantive interference on the up-link, independently from the propagation loss.

In accordance with this embodiment, the mobile station 2 adds the off-set power to the current transmission power just after the mobile station 2 is shifted from the power-down priority control mode to the packet-transmitting-base-station priority control mode, where the difference of the current transmission power from the target transmission power is still large, thereby reducing a probability that the addition of the off-set power causes the increased transmission power to exceed the target transmission power, and reducing any interference on the up-link.

Second Embodiment

A second embodiment according to the present invention will be described in detail with reference to the drawings. The cellular system of this embodiment has the same configuration as described above in the first embodiment with reference to FIG. 4. The duplicate descriptions of the configuration of the cellular system of this embodiment will be omitted. The base station 1 of this embodiment has the same configuration as described above in the first embodiment with reference to FIG. 6. The duplicate descriptions of the configuration of the base station 1 of this embodiment will be omitted. The mobile station 2 of this embodiment has the same configuration as described above in the first embodiment with reference to FIG. 7. The duplicate descriptions of the configuration of the mobile station 2 of this embodiment will be omitted.

Figure 9:
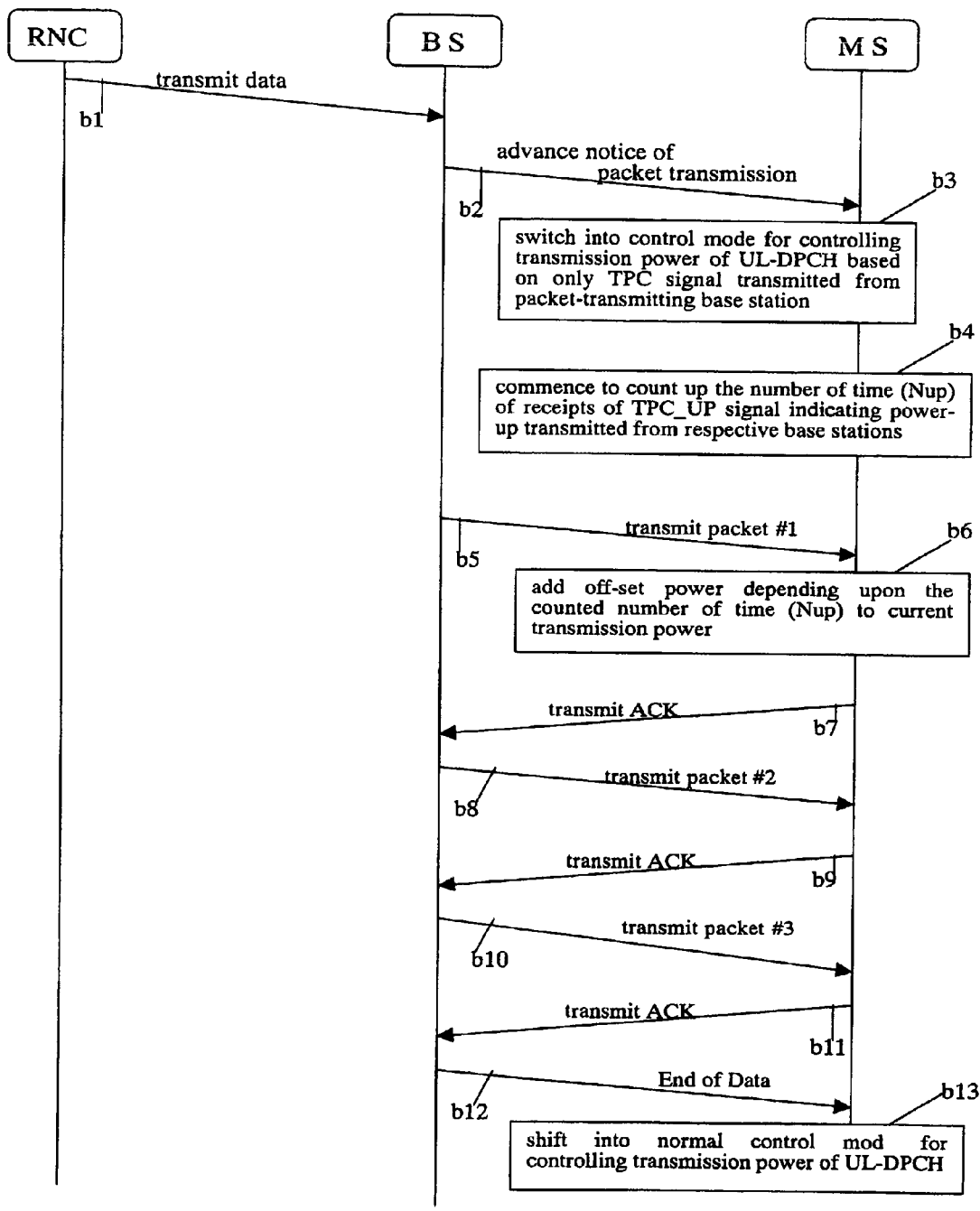
FIG. 9 is a sequence chart illustrative of sequential operations of the cellular system in the second embodiment in accordance with the present invention.

FIG. 9 is a sequence chart illustrative of sequential operations of the cellular system in the second embodiment in accordance with the present invention. Sequential operations of the cellular system will be described with reference to FIGS. 4, 6, 7 and 9. "MS" represents the mobile station 2-1 shown in FIG. 4. "BS" represents the base station 1-1 shown in FIG. 4. "RNC" represents the radio network controller.

In step b1, if the radio network controller (RNC) receives, from a communication network, data to be transmitted to the mobile station 2-1, then the radio network controller (RNC) transfers the received data to the base station 1-1, to which the dedicated physical channel (DPCH) is established from the mobile station 2-1.

In step b2, the base station 1-1 sends the mobile station 2-1 an advance notice to the effect that a packet of data is transmitted.

In step b3, the mobile station 2-1 receives the advance notice of data transmission from the base station 1-1. The mobile station 2-1 is switched into a control mode for controlling the transmission power of the up-link dedicated physical channel (UL-DPCH) from the mobile station 2-1 based on only the transmit power control signal (TPC) transmitted from the packet-transmitting base station 1-1.

In step b4, further, the mobile station 2-1 commences to count up the number of times (Nup) of receipts of the transmit power control (TPC_UP) signal indicating the power-up transmitted from the base station 1-1.

In step b5, the base station 1-1 divides the received data into a plurality of packets. The base station 1-1 transmits a first packet #1 through the high-speed physical downlink shared channel (HS-PDSCH) to the mobile station 2-1.

In step b6, if the mobile station 2-1 safely receives the first packet #1 from the base station 1-1, then the mobile station 2-1 decides an off-set power depending upon the counted number of times (Nup) and adds the off-set power to the current transmission power of the up-link dedicated physical channel (UL-DPCH).

In step b7, further, the mobile station 2-1 transmits the acknowledge signal (ACK) through the high-speed dedicated physical control channel (HS-DPCCH) to the base station 1-1.

In step b8, the base station 1-1 transmits a second packet #2 through the high-speed physical downlink shared channel (HS-PDSCH) to the mobile station 2-1.

In step b9, if the mobile station 2-1 safely receives the second packet #2 from the base station 1-1, then the mobile station 2-1 transmits the acknowledge signal (ACK) through the high-speed dedicated physical control channel (HS-DPCCH) to the base station 1-1.

In step b10, the base station 1-1 transmits a third packet #3 through the high-speed physical downlink shared channel (HS-PDSCH) to the mobile station 2-1.

In step b11, if the mobile station 2-1 safely receives the third packet #3 from the base station 1-1, then the mobile station 2-1 transmits the acknowledge signal (ACK) through the high-speed dedicated physical control channel (HS-DPCCH) to the base station 1-1.

In step b12, after the data transmission has been completed, the base station 1-1 sends the mobile station 2-1 a notice of end of data.

In step b13, upon receipt of the notice of end of data from the base station 1-1, the mobile station 2-1 is shifted from the above control mode into a normal control mode for controlling the transmission power of the up-link dedicated physical channel (UL-DPCH) based on all the transmit power control signals (TPC) transmitted from the link base stations in the soft handover. The above control mode controls the transmission power of the up-link dedicated physical channel (UL-DPCH) based on only the transmit power control signal (TPC) transmitted from the packet-transmitting base station 1-1. Instead of receipt of the notice of end of data, it is possible that if the mobile station 2-1 does not receive any packet from the base station 1-1 for a predetermined period of time, then the mobile station 2-1 is shifted from the above control mode into the normal control mode.

Figure 10:
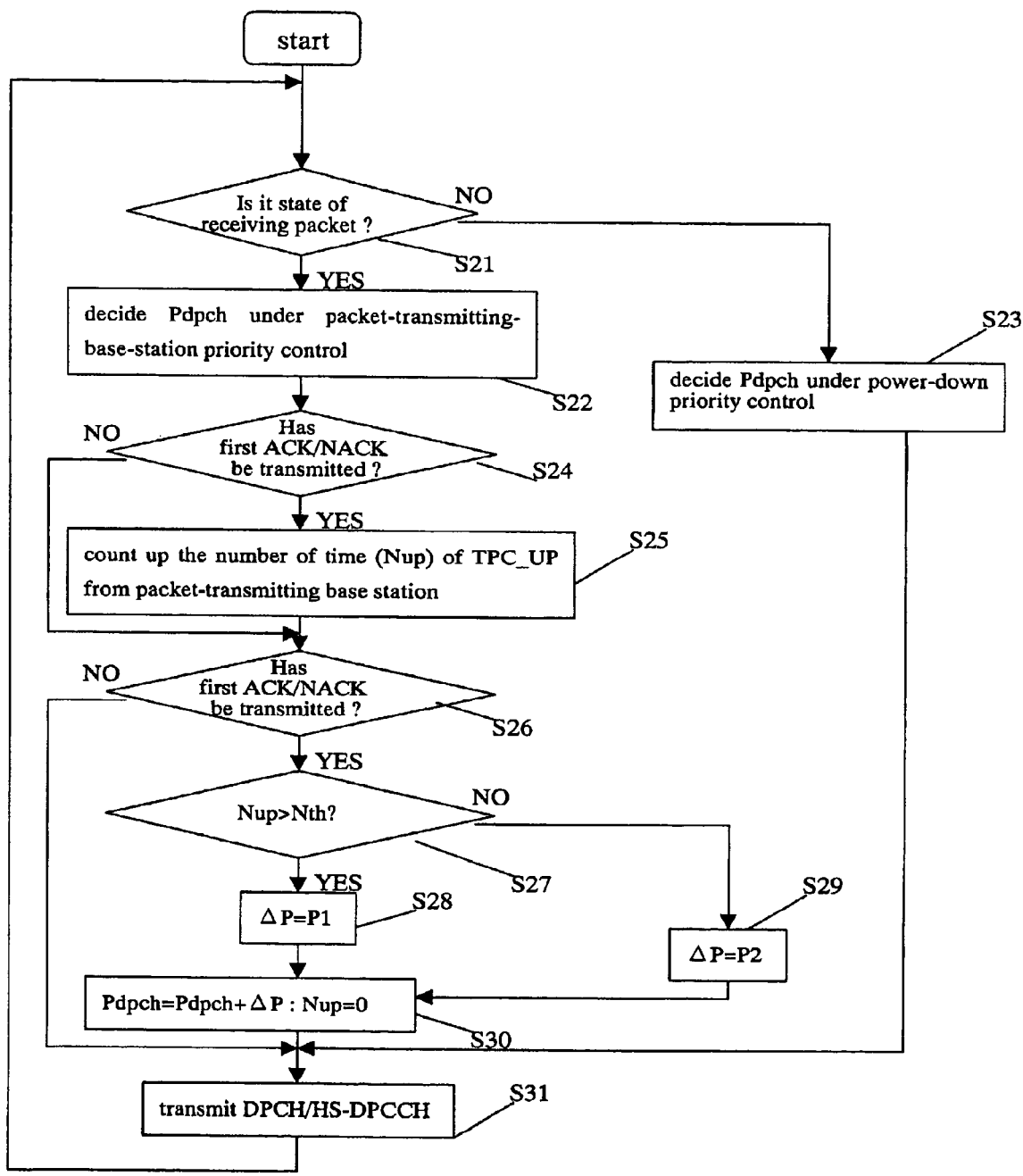
FIG. 10 is a flow chart illustrative of operations of the mobile station in the second embodiment in accordance with the present invention.

FIG. 10 is a flow chart illustrative of operations of the mobile station 2 in the second embodiment in accordance with the present invention. Operations of the mobile station 2 will be described with reference to FIGS. 4, 6, 7 and 10.

In step S21, the mobile station 2 receives the transmit power control signal (TPC) transmitted from each of the link base stations 1-1 and 1-2.

In step S22, if the mobile station 2 is in a state of receiving the packet, then the mobile station 2 performs a packet-transmitting-base-station priority control which controls a transmission power Pdpch [dB] of the up-link dedicated physical channel (UL-DPCH) based on only the transmit power control signal (TPC) transmitted from the packet-transmitting base station.

In step S23, if the mobile station 2 is in other states, then the mobile station 2 performs a power-down priority control to decide the transmission power Pdpch [dB]. In accordance with this power-down priority control, if at least one of the transmit power control signals (TPC) transmitted from all of the link base stations indicates the power-down of the transmission power, then the mobile station 2 decreases the transmission power by a predetermined power step. If all of the transmit power control signals (TPC) transmitted from all of the link base stations indicate the power-up of the transmission power, then the mobile station 2 increases the transmission power by a predetermined power step.

In step S24, it is verified whether or not the mobile station 2 commences to receive a packet, but the mobile station 2 has not yet transmitted the first acknowledge/non-acknowledge signal (ACK/NACK).

In step S25, if the mobile station 2 has not yet transmitted the first acknowledge/non-acknowledge signal (ACK/NACK), then the mobile station 2 counts up the number of times (Nup) of the transmit power control signal (TPC_UP) indicating the power-up transmitted from the packet-transmitting base station 1-1.

In step S26, it is verified whether or not the mobile station 2 transmits the first acknowledge/non-acknowledge signal (ACK/NACK).

In step S27, if the mobile station 2 transmits the first acknowledge/non-acknowledge signal (ACK/NACK), then the mobile station 2 compares the counted number of times (Nup) to a predetermined threshold value (Nth).

In step S28, if the counted number of times (Nup) is larger than the predetermined threshold value (Nth), then the mobile station 2 decides the off-set power.P to be P1[dB] (.P=P1).

In step S29, if the counted number of times (Nup) is smaller than the predetermined threshold value (Nth), then the mobile station 2 decides the off-set power.P to be P2[dB] (.P =P2), provided that P2 is smaller than P1.

In step S30, the mobile station 2 adds the decided off-set power.P to the current transmission power Pdpch [dB] of the dedicated physical channel (DPCH). Further, the mobile station 2 resets the counted number of times (Nup) into zero.

In step S31, the mobile station 2 transmits the signal through the dedicated physical channel (DPCH) at the renewed transmission power Pdpch [dB] and also transmits the signal through the high-speed dedicated physical control channel (HS-DPCCH) at a transmission power Phs (=Pdpch+.Phs), where .Phs is a predetermined off-set power for the high-speed dedicated physical control channel (HS-DPCCH).

The mobile station 2 repeats the above-described sequential processes in a predetermined cycle.

In accordance with this embodiment, the mobile station 2 adds the off-set power.P to the current transmission power for acceleration of the transmission power increase up to the target power level necessary for causing that the measured signal-to-interference-ratio (SIR) at the packet-transmitting base station 1-1 reaches the predetermined target signal-to-interference-ratio (SIR), thereby improving the receiving quality of the acknowledge/non-acknowledge signal (ACK/NACK) at the packet-transmitting base station 1-1.

In accordance with this embodiment, the mobile station 2 decides the off-set power .P based on the number of times of the request for power-up from the packet-transmitting base station. If the current transmission power does not reach the target transmission power at the time of transmitting the acknowledge/non-acknowledge signal (ACK/NACK), then the counted number of times of the request for power-up is sill larger than the predetermined threshold value, whereby the large off-set power is added to the current transmission power. Accordingly, the off-set power level can be decided depending upon the issue of whether the current transmission power does not reach the target transmission power at the time of transmitting the acknowledge/non-acknowledge signal (ACK/NACK). This allows keeping a desired high receiving quality of the acknowledge/non-acknowledge signal (ACK/NACK) at the packet-transmitting base station 1-1 and also reducing any substantive interference on the up-link.

In accordance with this embodiment, after the mobile station 2 has been placed into the state of receiving the packet, then the mobile station 2 may commence to count up the number of times of the request for power-up from the base station. This reduces the number of processes by the mobile station 2 if the mobile station 2 is in the other state, thereby making the cellular system free from the above-described problem engaged with the second conventional technique.

In accordance with this embodiment, the two off-set values P1 and P2 are set. It is also possible that plural threshold values are set and three or more off-set values are set.

In accordance with this embodiment, the off-set power is decided depending upon the counted number of times of the requests for power-up from the packet-transmitting base station 1-1.

It is also possible that the mobile station 2 decides the off-set power depending upon the counted number of times when the transmit power control signal (TPC) transmitted from the packet-transmitting base station 1-1 indicates the power-up while the other transmit power control signals (TPC) transmitted from the other link base stations indicate the power-down.

Third Embodiment

A third embodiment according to the present invention will be described in detail with reference to the drawings. The cellular system of this embodiment has the same configuration as described above in the first embodiment with reference to FIG. 4. The duplicate descriptions of the configuration of the cellular system of this embodiment will be omitted. The base station 1 of this embodiment has the same configuration as described above in the first embodiment with reference to FIG. 6. The duplicate descriptions of the configuration of the base station 1 of this embodiment will be omitted. The mobile station 2 of this embodiment has the same configuration as described above in the first embodiment with reference to FIG. 7. The duplicate descriptions of the configuration of the mobile station 2 of this embodiment will be omitted.

Figure 11:
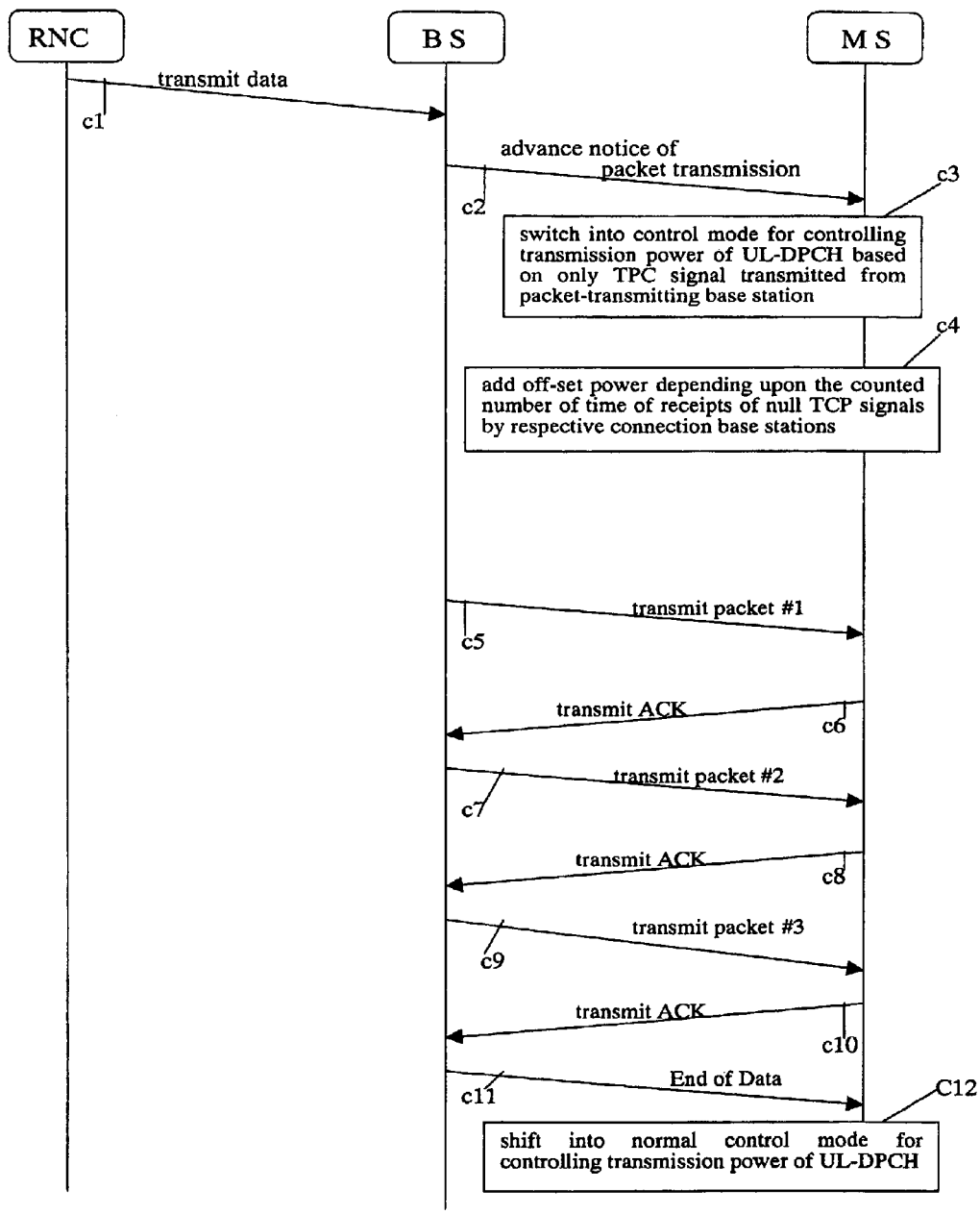
FIG. 11 is a sequence chart illustrative of sequential operations of the cellular system in the third embodiment in accordance with the present invention.

FIG. 11 is a sequence chart illustrative of sequential operations of the cellular system in the third embodiment in accordance with the present invention. Sequential operations of the cellular system will be described with reference to FIGS. 4, 6, 7 and 11. "MS" represents the mobile station 2-1 shown in FIG. 4. "BS" represents the base station 1-1 shown in FIG. 4. "RNC" represents the radio network controller.

In the above-described first embodiment, the mobile station 2 decides the off-set power based on the presumed difference.PL (=PL1−PL2) between the first propagation loss PL1 with the base station 1-1 and the second propagation loss PL2 with the base station 1-2, from the measurement result of measuring receiving qualities of the first common pilot channel (CPICH) (1) transmitted from the base station 1-1 and of the second common pilot channel (CPICH) (2) transmitted from the base station 1-2.

In this embodiment, the mobile station 2 decides the off-set power based on the number of times of receipts of a null transmit power control signal (TPC) having a lower receiving quality than the predetermined threshold receiving quality level transmitted from the packet-transmitting base station.

In step c1, if the radio network controller (RNC) receives, from a communication network, data to be transmitted to the mobile station 2-1, then the radio network controller (RNC) transfers the received data to the base station 1-1, to which the dedicated physical channel (DPCH) is established from the mobile station 2-1.

In step c2, the base station 1-1 sends the mobile station 2-1 an advance notice to the effect that a packet of data is transmitted.

In step c3, the mobile station 2-1 receives the advance notice of data transmission from the base station 1-1. The mobile station 2-1 is switched into a control mode for controlling the transmission power of the up-link dedicated physical channel (UL-DPCH) from the mobile station 2-1 based on only the transmit power control signal (TPC) transmitted from the packet-transmitting base station 1-1.

In step c4, the mobile station 2 decides the off-set power based on the number of times of receipts of null transmit power control signals (TPC) having lower receiving qualities than the predetermined threshold receiving quality level transmitted from the packet-transmitting base station 1-1. The mobile station 2 adds the off-set power to the current transmission power.

In step c5, the base station 1-1 divides the received data into a plurality of packets. The base station 1-1 transmits a first packet #1 through the high-speed physical downlink shared channel (HS-PDSCH) to the mobile station 2-1.

In step c6, if the mobile station 2-1 safely receives the first packet #1 from the base station 1-1, then the mobile station 2-1 transmits the acknowledge signal (ACK) through the high-speed dedicated physical control channel (HS-DPCCH) to the base station 1-1.

In step c7, the base station 1-1 transmits a second packet #2 through the high-speed physical downlink shared channel (HS-PDSCH) to the mobile station 2-1.

In step c8, if the mobile station 2-1 safely receives the second packet #2 from the base station 1-1, then the mobile station 2-1 transmits the acknowledge signal (ACK) through the high-speed dedicated physical control channel (HS-DPCCH) to the base station 1-1.

In step c9, the base station 1-1 transmits a third packet #3 through the high-speed physical downlink shared channel (HS-PDSCH) to the mobile station 2-1.

In step c10, if the mobile station 2-1 safely receives the third packet #3 from the base station 1-1, then the mobile station 2-1 transmits the acknowledge signal (ACK) through the high-speed dedicated physical control channel (HS-DPCCH) to the base station 1-1.

In step c11, after the data transmission has been completed, the base station 1-1 sends the mobile station 2-1 a notice of end of data.

In step c12, upon receipt of the notice of end of data from the base station 1-1, the mobile station 2-1 is shifted from the above control mode into a normal control mode for controlling the transmission power of the up-link dedicated physical channel (UL-DPCH) based on all the transmit power control signals (TPC) transmitted from the link base stations in the soft handover. The above control mode controls the transmission power of the up-link dedicated physical channel (UL-DPCH) based on only the transmit power control signal (TPC) transmitted from the packet-transmitting base station 1-1. Instead of receipt of the notice of end of data, it is possible that if the mobile station 2-1 does not receive any packet from the base station 1-1 for a predetermined period of time, then the mobile station 2-1 is shifted from the above control mode into the normal control mode.

Figure 12:
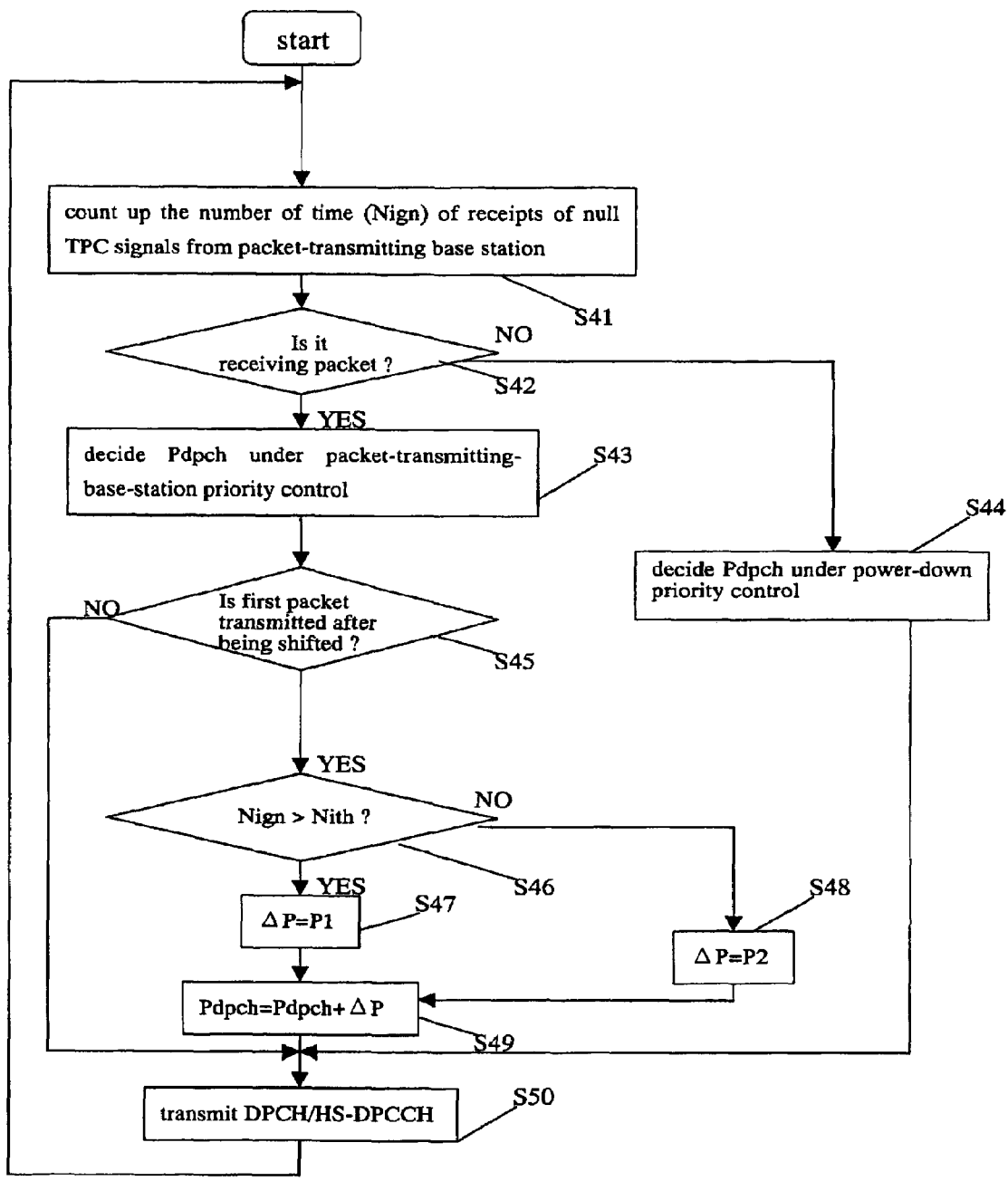
FIG. 12 is a flow chart illustrative of operations of the mobile station in the third embodiment in accordance with the present invention.

FIG. 12 is a flow chart illustrative of operations of the mobile station 2 in the third embodiment in accordance with the present invention. Each of the mobile stations 2-1, 2-2 and 2-3 will herein be referred to as a mobile station 2.

In step S41, the mobile station 2 counts up the number of times (Nign) of receipts of null transmit power control signals (TPC) having lower receiving qualities than the predetermined threshold receiving quality level transmitted from the packet-transmitting base station 1-1.

In step S42, the mobile station 2 receives the transmit power control signal (TPC) transmitted from each of the link base stations 1-1 and 1-2.

In step S43, if the mobile station 2 is in a state of receiving the packet, then the mobile station 2 performs a packet-transmitting-base-station priority control which controls a transmission power Pdpch [dB] of the up-link dedicated physical channel (UL-DPCH) based on only the transmit power control signal (TPC) transmitted from the packet-transmitting base station.

In step S44, if the mobile station 2 is in other states, then the mobile station 2 performs a power-down priority control to decide the transmission power Pdpch [dB]. In accordance with this power-down priority control, if at least one of the transmit power control signals (TPC) transmitted from all of the link base stations indicates the power-down of the transmission power, then the mobile station 2 decreases the transmission power by a predetermined power step. If all of the transmit power control signals (TPC) transmitted from all of the link base stations indicate the power-up of the transmission power, then the mobile station 2 increases the transmission power by a predetermined power step.

In step S45, it is verified whether the mobile station 2 commences to receive a first packet after the mobile station 2 has just been shifted from the power-down priority control to the packet-transmitting-base-station priority control.

In step S46, the mobile station 2 compares the counted number of times (Nign) to a predetermined threshold value (Nith).

In step S47, if the counted number of times (Nign) is larger than the predetermined threshold value (Nith), then the mobile station 2 decides the off-set power.P to be P1[dB] (.P=P1).

In step S48, if the counted number of times (Nign) is smaller than the predetermined threshold value (Nith), then the mobile station 2 decides the off-set power.P to be P2[dB] (.P=P2), provided that P2 is smaller than P1.

In step S49, the mobile station 2 adds the decided off-set power.P to the current transmission power Pdpch [dB] of the dedicated physical channel (DPCH).

In step S50, the mobile station 2 transmits the signal through the dedicated physical channel (DPCH) at the renewed transmission power Pdpch [dB] and also transmits the signal through the high-speed dedicated physical control channel (HS-DPCCH) at a transmission power Phs (=Pdpch+.Phs), where .Phs is a predetermined off-set power for the high-speed dedicated physical control channel (HS-DPCCH).

The mobile station 2 repeats the above-described sequential processes in a predetermined cycle.

In accordance with this embodiment, the two off-set values P1 and P2 are set. It is also possible that plural threshold values are set and three or more off-set values are set.

In accordance with this embodiment, the mobile station 2 decides the off-set power .P based on the counted number of times (Nign) of receipts of the null transmit power control signals (TPC) having lower receiving qualities than the predetermined threshold receiving quality level transmitted from the packet-transmitting base station. If the propagation loss is light, then a probability of deterioration of the transmit power control signal (TPC) is also high. In accordance with this embodiment, if the propagation loss is light, then a large off-set power is added to the current transmission power. This allows keeping a desired high receiving quality of the acknowledge/non-acknowledge signal (ACK/NACK) at the packet-transmitting base station 1-1 and also reducing any substantive interference on the up-link.

Fourth Embodiment

A fourth embodiment according to the present invention will be described in detail with reference to the drawings. The cellular system of this embodiment has the same configuration as described above in the first embodiment with reference to FIG. 4. The duplicate descriptions of the configuration of the cellular system of this embodiment will be omitted. The base station 1 of this embodiment has the same configuration as described above in the first embodiment with reference to FIG. 6. The duplicate descriptions of the configuration of the base station 1 of this embodiment will be omitted. The mobile station 2 of this embodiment has the same configuration as described above in the first embodiment with reference to FIG. 7. The duplicate descriptions of the configuration of the mobile station 2 of this embodiment will be omitted.

Figure 13:
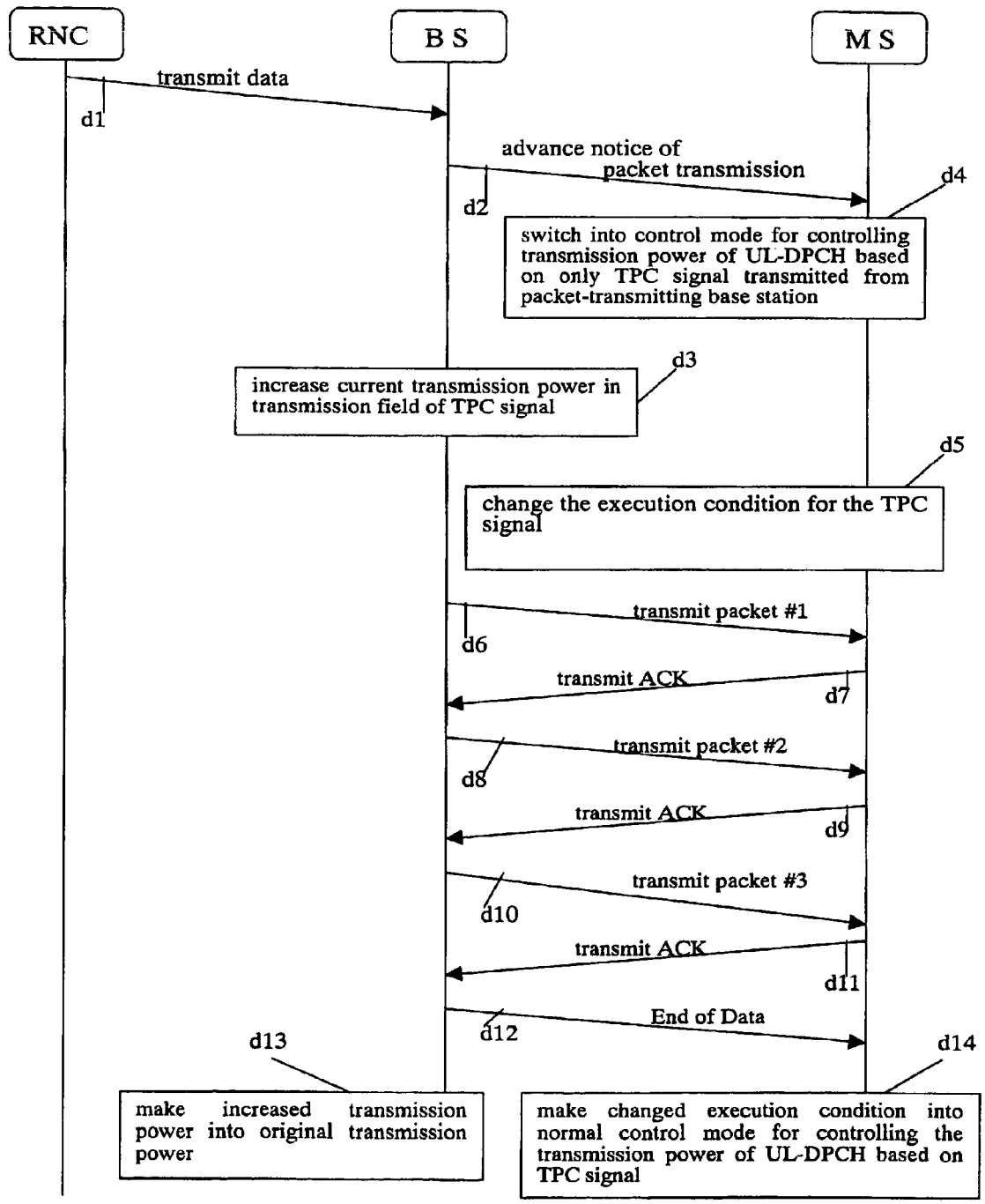
FIG. 13 is a sequence chart illustrative of sequential operations of the cellular system in the fourth embodiment in accordance with the present invention.

FIG. 13 is a sequence chart illustrative of sequential operations of the cellular system in the fourth embodiment in accordance with the present invention. Sequential operations of the cellular system will be described with reference to FIGS. 4, 6, 7 and 13. "MS" represents the mobile station 2-1 shown in FIG. 4. "BS" represents the base station 1-1 shown in FIG. 4. "RNC" represents the radio network controller.

In step d1, if the radio network controller (RNC) receives, from a communication network, data to be transmitted to the mobile station 2-1, then the radio network controller (RNC) transfers the received data to the base station 1-1, to which the dedicated physical channel (DPCH) is established from the mobile station 2-1.

In step d2, the base station 1-1 sends the mobile station 2-1 an advance notice to the effect that a packet of data is transmitted.

In step d3, the base station 1-1 adds a predetermined off-set power value to the current transmission power in the transmission field for transmitting the transmit power control signal (TPC) to the mobile station 2-1.

In step d4, the mobile station 2-1 receives the advance notice of data transmission from the base station 1-1. The mobile station 2-1 is switched into a control mode for controlling the transmission power of the up-link dedicated physical channel (UL-DPCH) from the mobile station 2-1 based on only the transmit power control signal (TPC) transmitted from the packet-transmitting base station 1-1.

In step d5, the mobile station 2-1 changes the execution condition for the received transmit power control signal (TPC) as follows. The mobile station 2-1 counts the first number of times of receipts of the transmit power control signals (TPC_UP) indicating the power-up and also the second number of times of receipts of the transmit power control signals (TPC_DOWN) indicating the power-down after the mobile station 2-1 made the last change to the execution condition. If the counted first number of times of receipts of the transmit power control signals (TPC_UP) exceeds a first predetermined threshold value (Th_UP) or the counted second number of times of receipts of the transmit power control signals (TPC_DOWN) exceeds a second predetermined threshold value (Th_DOWN) whichever appears first, then the mobile station 2-1 performs the corresponding control, for example, increases or decreases the current transmission power. If it is first appeared that the counted first number of times of receipts of the transmit power control signals (TPC_UP) exceeds the first predetermined threshold value (Th_UP), then the mobile station 2-1 increases the current transmission power. If it is first appeared that the counted second number of times of receipts of the transmit power control signals (TPC_DOWN) exceeds the second predetermined threshold value (Th_DOWN), then the mobile station 2-1 decreases the current transmission power. It should be noted that the first predetermined threshold value (Th_UP) is smaller than the second predetermined threshold value (Th_DOWN).

In step d6, the base station 1-1 divides the received data into a plurality of packets. The base station 1-1 transmits a first packet #1 through the high-speed physical downlink shared channel (HS-PDSCH) to the mobile station 2-1.

In step d7, if the mobile station 2-1 safely receives the first packet #1 from the base station 1-1, then the mobile station 2-1 transmits the acknowledge signal (ACK) through the high-speed dedicated physical control channel (HS-DPCCH) to the base station 1-1.

In step d8, the base station 1-1 transmits a second packet #2 through the high-speed physical downlink shared channel (HS-PDSCH) to the mobile station 2-1.

In step d9, if the mobile station 2-1 safely receives the second packet #2 from the base station 1-1, then the mobile station 2-1 transmits the acknowledge signal (ACK) through the high-speed dedicated physical control channel (HS-DPCCH) to the base station 1-1.

In step d10, the base station 1-1 transmits a third packet #3 through the high-speed physical downlink shared channel (HS-PDSCH) to the mobile station 2-1.

In step d11, if the mobile station 2-1 safely receives the third packet #3 from the base station 1-1, then the mobile station 2-1 transmits the acknowledge signal (ACK) through the high-speed dedicated physical control channel (HS-DPCCH) to the base station 1-1.

In step d12, after the data transmission has been completed, the base station 1-1 sends the mobile station 2-1 a notice of end of data.

In step d13, the base station 1-1 makes the increased transmission power into the original transmission power for the transmit power control signal (TPC).

In step d14, upon receipt of the notice of end of data from the base station 1-1, the mobile station 2-1 is shifted from the above control mode into a normal control mode for controlling the transmission power of the up-link dedicated physical channel (UL-DPCH) based on all the transmit power control signals (TPC) transmitted from the link base stations in the soft handover. The above control mode controls the transmission power of the up-link dedicated physical channel (UL-DPCH) based on only the transmit power control signal (TPC) transmitted from the packet-transmitting base station 1-1. Further, the changed execution condition for the received transmit power control signal (TPC) is made into the original execution condition. Instead of receipt of the notice of end of data, it is possible that if the mobile station 2-1 does not receive any packet from the base station 1-1 for a predetermined period of time, then the mobile station 2-1 is shifted from the above control mode into the normal control mode.

Figure 14:
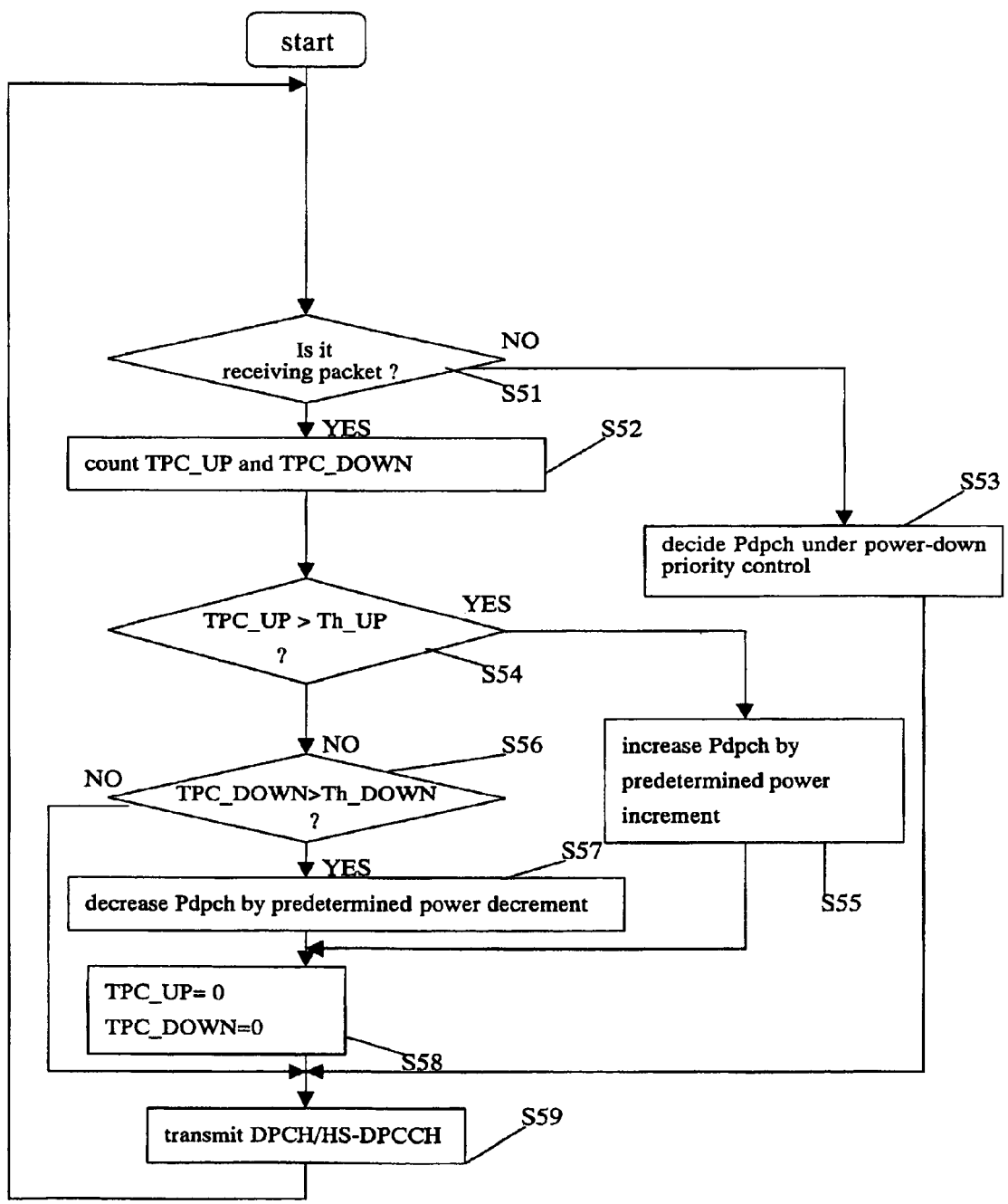
FIG. 14 is a flow chart illustrative of operations of the mobile station in the fourth embodiment in accordance with the present invention.

FIG. 14 is a flow chart illustrative of operations of the mobile station 2 in the fourth embodiment in accordance with the present invention. Each of the mobile stations 2-1, 2-2 and 2-3 will herein be referred to as a mobile station 2.

In step S51, the mobile station 2 receives the transmit power control signal (TPC) transmitted from each of the link base stations 1-1 and 1-2.

In step S52, if the mobile station 2 is in a state of receiving the packet, then the mobile station 2 the first number of times of receipts of the transmit power control signals (TPC_UP) indicating the power-up and also the second number of times of receipts of the transmit power control signals (TPC_DOWN) indicating the power-down after the mobile station 2-1 made the last change to the execution condition.

In step S53, if the mobile station 2 is in other states, then the mobile station 2 performs a power-down priority control to decide the transmission power Pdpch [dB]. In accordance with this power-down priority control, if at least one of the transmit power control signals (TPC) transmitted from all of the link base stations indicates the power-down of the transmission power, then the mobile station 2 decreases the transmission power by a predetermined power step. If all of the transmit power control signals (TPC) transmitted from all of the link base stations indicate the power-up of the transmission power, then the mobile station 2 increases the transmission power by a predetermined power step.

In step S54, the mobile station 2 compares the counted first number of times of receipts of the transmit power control signals (TPC_UP) to the first predetermined threshold value (Th_UP). The mobile station 2 also compares the counted second number of times of receipts of the transmit power control signals (TPC_DOWN) to the second predetermined threshold value (Th_DOWN). If the counted first number of times of receipts of the transmit power control signals (TPC_UP) exceeds the first predetermined threshold value (Th_UP) or the counted second number of times of receipts of the transmit power control signals (TPC_DOWN) exceeds the second predetermined threshold value (Th_DOWN) whichever appears first, then the mobile station 2-1 performs the corresponding control, for example, increases or decreases the current transmission power.

In step S55, if it is first appeared that the counted first number of times of receipts of the transmit power control signals (TPC_UP) exceeds the first predetermined threshold value (Th_UP), then the mobile station 2 increases the current transmission power Pdpch [dB] by a predetermined power increment.

In step S56, it is verified whether or not the counted second number of times of receipts of the transmit power control signals (TPC_DOWN) exceeds the second predetermined threshold value (Th_DOWN).

In step S57, if it is appeared that the counted second number of times of receipts of the transmit power control signals (TPC_DOWN) exceeds the second predetermined threshold value (Th_DOWN), then the mobile station 2-1 decreases the current transmission power Pdpch [dB] by a predetermined power decrement. It should be noted that the first predetermined threshold value (Th_UP) is smaller than the second predetermined threshold value (Th_DOWN).

In step S58, the mobile station 2-1 resets the counted first number of times of receipts of the transmit power control signals (TPC_UP) and the counted second number of times of receipts of the transmit power control signals (TPC_DOWN) into zero.

In step S59, the mobile station 2 transmits the signal through the dedicated physical channel (DPCH) at the renewed transmission power Pdpch [dB] and also transmits the signal through the high-speed dedicated physical control channel (HS-DPCCH) at a transmission power Phs (=Pdpch+.Phs), where .Phs is a predetermined off-set power for the high-speed dedicated physical control channel (HS-DPCCH).

The mobile station 2 repeats the above-described sequential processes in a predetermined cycle.

In accordance with this embodiment, the mobile station 2 does not change the transmission power until the mobile station 2 has received plural times of receipts of either the transmit power control signals (TPC_UP) or the transmit power control signals (TPC_DOWN). This reduces a probability that the mobile station 2 makes undesired erroneous transmission power control opposite to the request from the packet-transmitting base station.

In accordance with this embodiment, the first predetermined threshold value (Th_UP) is smaller than the second predetermined threshold value (Th_DOWN) in order to reduce a probability that the mobile station 2 makes undesired erroneous control of decreasing the transmission power opposite to the request for power-up from the packet-transmitting base station.

In accordance with this embodiment, a reduced number of commands is necessary for increasing the transmission power. This improves the responsibility to the request for power-up. The mobile station 2 accelerates the transmission power increase up to the target power level necessary for causing that the measured signal-to-interference-ratio (SIR) at the packet-transmitting base station 1-1 reaches the predetermined target signal-to-interference-ratio (SIR), thereby improving the receiving quality of the acknowledge/non-acknowledge signal (ACK/NACK) at the packet-transmitting base station 1-1.

In accordance with this embodiment, during receipt of the packet, the mobile station 2 adds the off-set power to the current transmission power of the transmit power control signal (TPC) transmitted from the packet-transmitting base station, so as to reduce a probability that the mobile station 2 erroneously receives the transmit power control signal (TPC) transmitted from the packet-transmitting base station.

This configuration allows keeping a desired high receiving quality of the acknowledge/non-acknowledge signal (ACK/NACK) at the packet-transmitting base station 1-1.

In accordance with this embodiment, after the packet transmission has been completed, then the increased transmission power for transmitting the transmit power control signal (TPC) is made into the original transmission power, thereby improving the high receiving quality of the acknowledge/non-acknowledge signal (ACK/NACK) at the packet-transmitting base station 1-1 and also reducing any substantive interference on the up-link.

Fifth Embodiment

A fifth embodiment according to the present invention will be described in detail with reference to the drawings. The cellular system of this embodiment has the same configuration as described above in the first embodiment with reference to FIG. 4. The duplicate descriptions of the configuration of the cellular system of this embodiment will be omitted. The base station 1 of this embodiment has the same configuration as described above in the first embodiment with reference to FIG. 6. The duplicate descriptions of the configuration of the base station 1 of this embodiment will be omitted. The mobile station 2 of this embodiment has the same configuration as described above in the first embodiment with reference to FIG. 7. The duplicate descriptions of the configuration of the mobile station 2 of this embodiment will be omitted.

Figure 15:
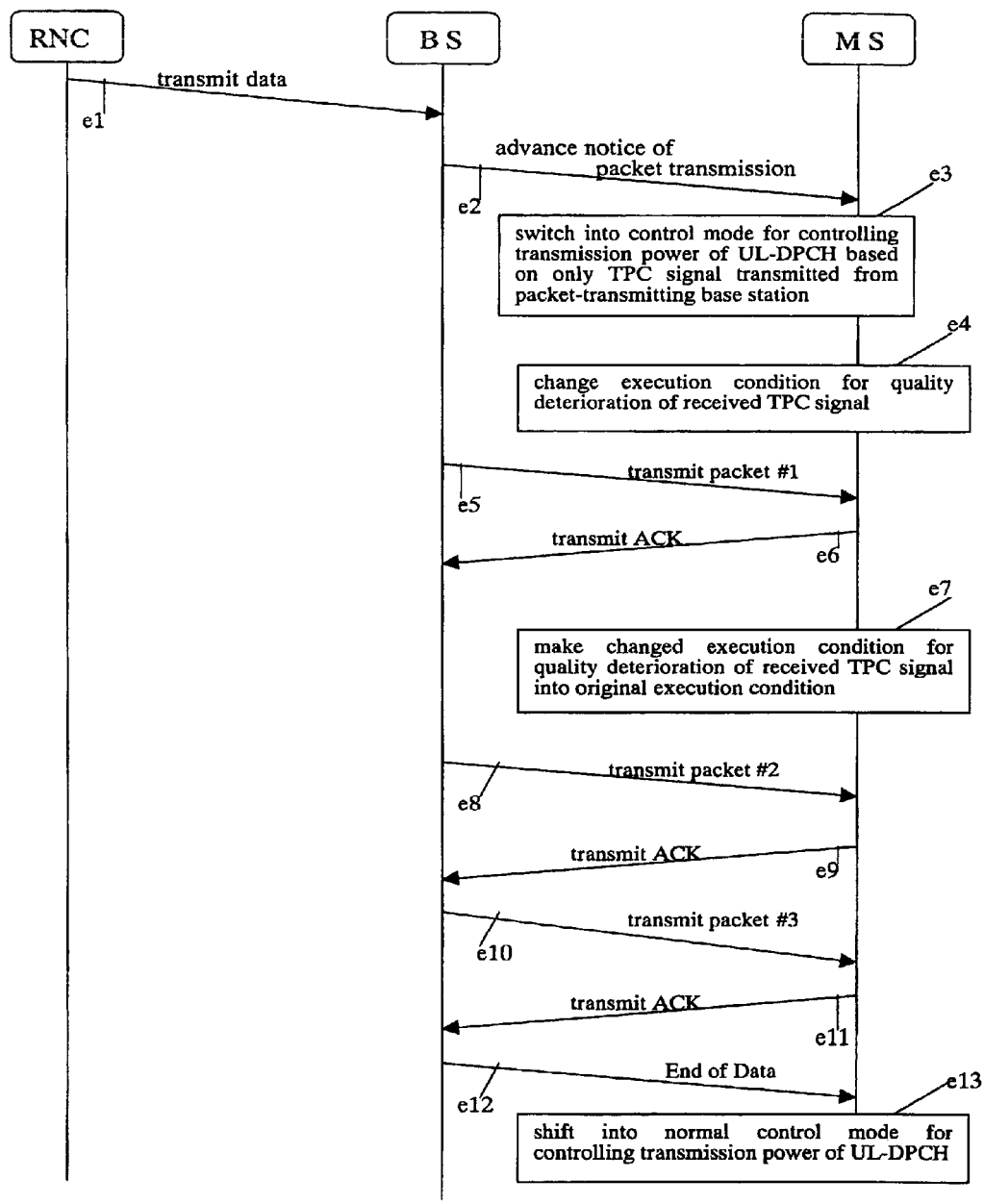
FIG. 15 is a sequence chart illustrative of sequential operations of the cellular system in the fifth embodiment in accordance with the present invention.

FIG. 15 is a sequence chart illustrative of sequential operations of the cellular system in the fifth embodiment in accordance with the present invention. Sequential operations of the cellular system will be described with reference to FIGS. 4, 6, 7 and 15. "MS" represents the mobile station 2-1 shown in FIG. 4. "BS" represents the base station 1-1 shown in FIG. 4. "RNC" represents the radio network controller.

In step e1, if the radio network controller (RNC) receives, from a communication network, data to be transmitted to the mobile station 2-1, then the radio network controller (RNC) transfers the received data to the base station 1-1, to which the dedicated physical channel (DPCH) is established from the mobile station 2-1.

In step e2, the base station 1-1 sends the mobile station 2-1 an advance notice to the effect that a packet of data is transmitted.

In step e3, the mobile station 2-1 receives the advance notice of data transmission from the base station 1-1. The mobile station 2-1 is switched into a control mode for controlling the transmission power of the up-link dedicated physical channel (UL-DPCH) from the mobile station 2-1 based on only the transmit power control signal (TPC) transmitted from the packet-transmitting base station 1-1.

In step e4, the mobile station 2-1 changes the execution condition for the quality deterioration of the received transmit power control signal (TPC) as follows. The mobile station 2-1 measures the receiving quality of the received transmit power control signal (TPC) transmitted from the packet-transmitting base station 1-1 and compares the measured receiving quality to a predetermined threshold value Qth. If the measured receiving quality is lower than the predetermined threshold value Qth, then the mobile station 2-1 considers that the received transmit power control signal (TPC) with the poor receiving quality indicates the power-up.

In step e5, the base station 1-1 divides the received data into a plurality of packets. The base station 1-1 transmits a first packet #1 through the high-speed physical downlink shared channel (HS-PDSCH) to the mobile station 2-1.

In step e6, if the mobile station 2-1 safely receives the first packet #1 from the base station 1-1, then the mobile station 2-1 transmits the acknowledge signal (ACK) through the high-speed dedicated physical control channel (HS-DPCCH) to the base station 1-1.

In step e7, the mobile station 2-1 makes the changed execution condition for the receiving quality of the transmit power control signal (TPC) into the original execution condition.

In step e8, the base station 1-1 transmits a second packet #2 through the high-speed physical downlink shared channel (HS-PDSCH) to the mobile station 2-1.

In step e9, if the mobile station 2-1 safely receives the second packet #2 from the base station 1-1, then the mobile station 2-1 transmits the acknowledge signal (ACK) through the high-speed dedicated physical control channel (HS-DPCCH) to the base station 1-1.

In step e10, the base station 1-1 transmits a third packet #3 through the high-speed physical downlink shared channel (HS-PDSCH) to the mobile station 2-1.

In step e11, if the mobile station 2-1 safely receives the third packet #3 from the base station 1-1, then the mobile station 2-1 transmits the acknowledge signal (ACK) through the high-speed dedicated physical control channel (HS-DPCCH) to the base station 1-1.

In step e12, after the data transmission has been completed, the base station 1-1 sends the mobile station 2-1 a notice of end of data.

In step e13, upon receipt of the notice of end of data from the base station 1-1, the mobile station 2-1 is shifted from the above control mode into a normal control mode for controlling the transmission power of the up-link dedicated physical channel (UL-DPCH) based on all the transmit power control signals (TPC) transmitted from the link base stations in the soft handover. The above control mode controls the transmission power of the up-link dedicated physical channel (UL-DPCH) based on only the transmit power control signal (TPC) transmitted from the packet-transmitting base station 1-1. Instead of receipt of the notice of end of data, it is possible that if the mobile station 2-1 does not receive any packet from the base station 1-1 for a predetermined period of time, then the mobile station 2-1 is shifted from the above control mode into the normal control mode.

Figure 16:
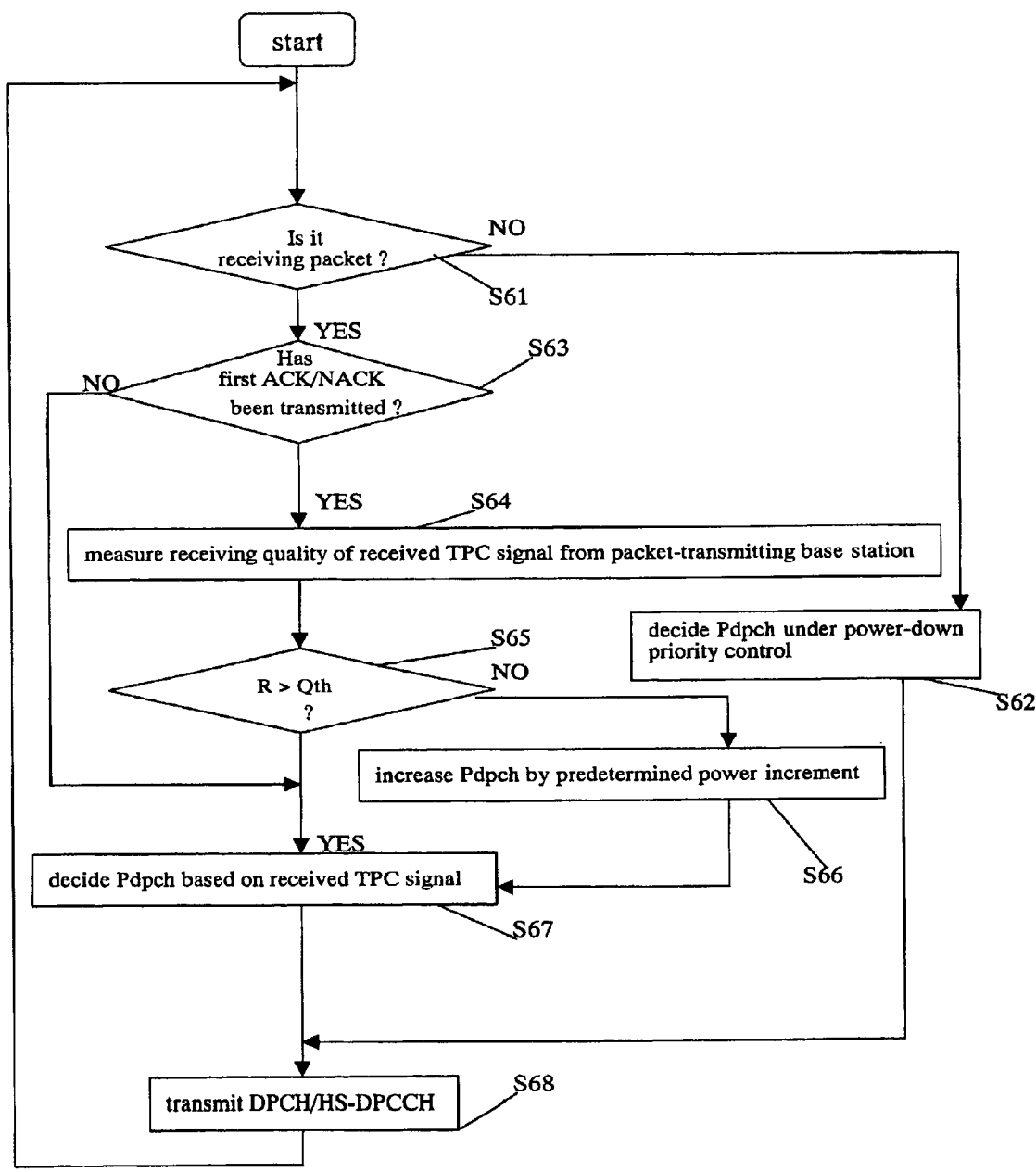
FIG. 16 is a flow chart illustrative of operations of the mobile station in the fifth embodiment in accordance with the present invention.

FIG. 16 is a flow chart illustrative of operations of the mobile station 2 in the fifth embodiment in accordance with the present invention. Each of the mobile stations 2-1, 2-2 and 2-3 will herein be referred to as a mobile station 2.

In step S61, it is verified that the mobile station 2 receives the transmit power control signal (TPC) transmitted from each of the link base stations 1-1 and 1-2.

In step S62, if the mobile station 2 is in other states, then the mobile station 2 performs a power-down priority control to decide the transmission power Pdpch [dB]. In accordance with this power-down priority control, if at least one of the transmit power control signals (TPC) transmitted from all of the link base stations indicates the power-down of the transmission power, then the mobile station 2 decreases the transmission power by a predetermined power step. If all of the transmit power control signals (TPC) transmitted from all of the link base stations indicate the power-up of the transmission power, then the mobile station 2 increases the transmission power by a predetermined power step.

In step S63, if the mobile station 2 is in a state of receiving the packet, then the mobile station 2, then it is verified whether or not the mobile station 2 commences to receive a packet, but the mobile station 2 has not yet transmitted the first acknowledge/non-acknowledge signal (ACK/NACK).

In step S64, if the mobile station 2 has not yet transmitted the first acknowledge/non-acknowledge signal (ACK/NACK), then the mobile station 2 measures the receiving quality (R) of the received transmit power control signal (TPC) transmitted from the packet-transmitting base station 1-1.

In step S65, the mobile station 2 compares the measured receiving quality (R) to a predetermined threshold value (Qth).

In step S66, if the measured receiving quality (R) is lower than the predetermined threshold value (Qth), then the mobile station 2 considers that the received transmit power control signal (TPC) with the poor receiving quality indicates the power-up, and increases the transmission power Pdpch [dB] by a predetermined power increment.

In step S67, the mobile station 2 decides the transmission power Pdpch [dB] based on the received transmit power control signal (TPC) transmitted from the packet-transmitting base station 1-1.

In step S67, if the measured receiving quality (R) is higher than the predetermined threshold value (Qth), then the mobile station 2 decides the transmission power Pdpch [dB] based on the received transmit power control signal (TPC) transmitted from the packet-transmitting base station 1-1.

In step S68, the mobile station 2 transmits the signal through the dedicated physical channel (DPCH) at the renewed transmission power Pdpch [dB] and also transmits the signal through the high-speed dedicated physical control channel (HS-DPCCH) at a transmission power Phs (=Pdpch+.Phs), where .Phs is a predetermined off-set power for the high-speed dedicated physical control channel (HS-DPCCH).

The mobile station 2 repeats the above-described sequential processes in a predetermined cycle.

In accordance with this embodiment, if the receiving quality of the transmit power control signal (TPC) transmitted from the packet-transmitting base station 1-1 is poor which indicates a low reliability, then the mobile station 2-1 increases the transmission power. This reduces a probability that the mobile station 2-1 erroneously receives the transmit power control signal (TPC) and decreases the transmission power opposite to the request for the power-up from the packet-transmitting base station.

As the propagation loss is high, then the probability of the deteriorated receiving quality of the transmit power control signal (TPC) is high. For this reason, it is, in general, possible that the mobile station 2-1 erroneously receives the transmit power control signal (TPC) and decreases the transmission power opposite to the request for the power-up from the packet-transmitting base station. As described above, in accordance with this embodiment, however, the above configuration reduces a probability that the mobile station 2-1 erroneously receives the transmit power control signal (TPC) and decreases the transmission power opposite to the request for the power-up from the packet-transmitting base station, thereby improving the receiving quality of the acknowledge/non-acknowledge signal (ACK/NACK) at the packet-transmitting base station 1-1.

In case that the transmit power control signal (TPC) indicates the power-down, if the receiving quality of the transmit power control signal (TPC) is lower than the predetermined threshold value (Qth), then the mobile station 2 unnecessarily increases the current transmission power which reaches the target transmission power. In accordance with this embodiment, after the mobile station 2 transmitted the first acknowledge/non-acknowledge signal (ACK/NACK), then the mobile station 2 makes the changed execution condition for the receiving quality deterioration of the transmit power control signal (TPC) into the original execution condition, in order to prevent that the controlled transmission power exceeds the target transmission power and also to reduce the interference on the up-link.

SIXTH EMBODIMENT

A sixth embodiment according to the present invention will be described in detail with reference to the drawings. The cellular system of this embodiment has the same configuration as described above in the first embodiment with reference to FIG. 4. The duplicate descriptions of the configuration of the cellular system of this embodiment will be omitted. The base station 1 of this embodiment has the same configuration as described above in the first embodiment with reference to FIG. 6. The duplicate descriptions of the configuration of the base station 1 of this embodiment will be omitted. The mobile station 2 of this embodiment has the same configuration as described above in the first embodiment with reference to FIG. 7. The duplicate descriptions of the configuration of the mobile station 2 of this embodiment will be omitted.

Figure 17:
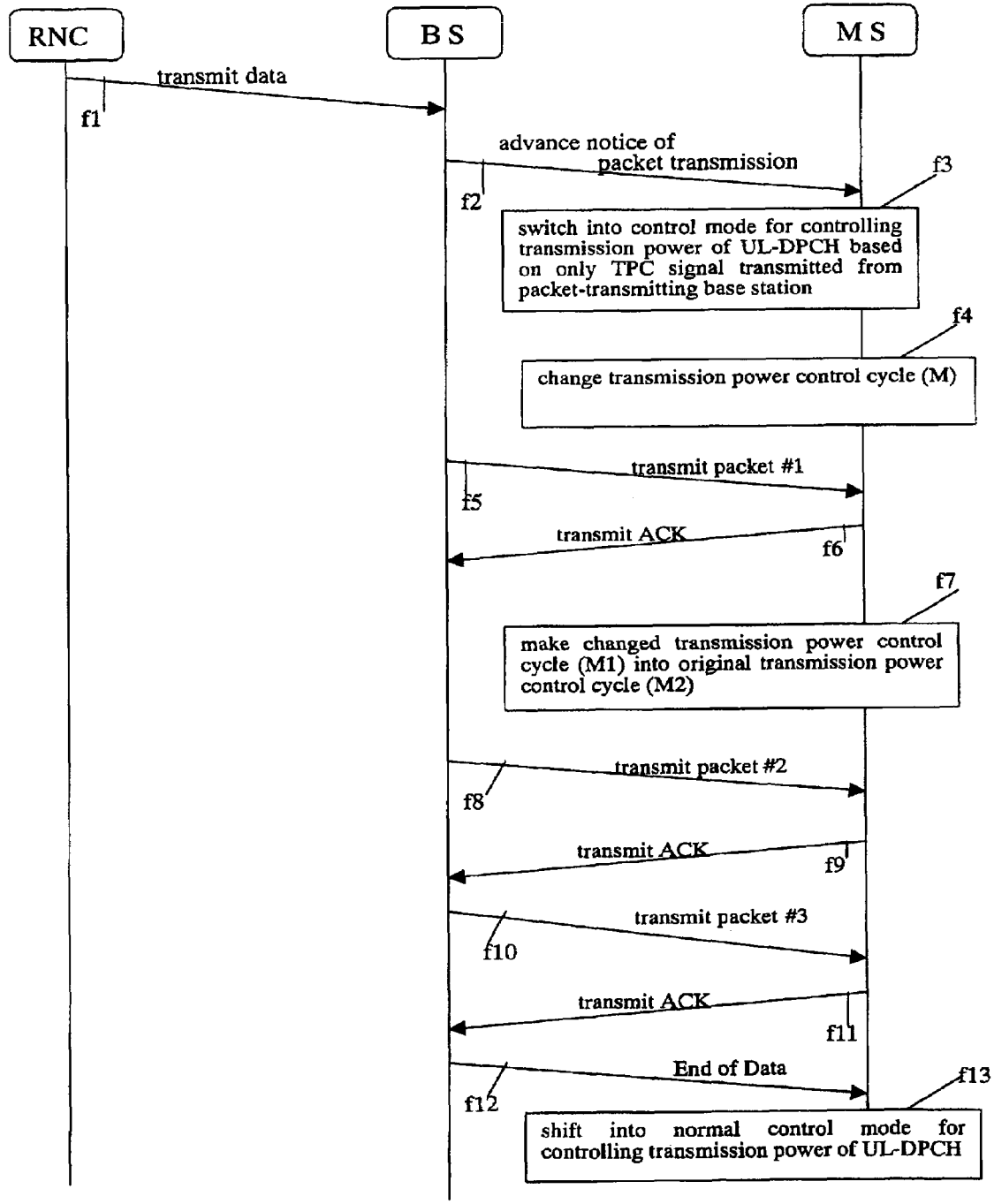
FIG. 17 is a sequence chart illustrative of sequential operations of the cellular system in the sixth embodiment in accordance with the present invention.

FIG. 17 is a sequence chart illustrative of sequential operations of the cellular system in the sixth embodiment in accordance with the present invention. Sequential operations of the cellular system will be described with reference to FIGS. 4, 6, 7 and 17. "MS" represents the mobile station 2-1 shown in FIG. 4. "BS" represents the base station 1-1 shown in FIG. 4. "RNC" represents the radio network controller.

In step f1, if the radio network controller (RNC) receives, from a communication network, data to be transmitted to the mobile station 2-1, then the radio network controller (RNC) transfers the received data to the base station 1-1, to which the dedicated physical channel (DPCH) is established from the mobile station 2-1.

In step f2, the base station 1-1 sends the mobile station 2-1 an advance notice to the effect that a packet of data is transmitted.

In step f3, the mobile station 2-1 receives the advance notice of data transmission from the base station 1-1. The mobile station 2-1 is switched into a control mode for controlling the transmission power of the up-link dedicated physical channel (UL-DPCH) from the mobile station 2-1 based on only the transmit power control signal (TPC) transmitted from the packet-transmitting base station 1-1.

In step f4, the mobile station 2-1 changes a transmission power control cycle (M) from the original cycle (M2) into another cycle (M1), wherein the original cycle (M2) is greater than another cycle (M1). The transmission power control cycle (M) is defined to be the number of times that the mobile station 2-1 receives respective transmit power control signals (TPC) transmitted from the respective link base stations until the mobile station 2-1 executes the transmission power control.

In step f5, the base station 1-1 divides the received data into a plurality of packets. The base station 1-1 transmits a first packet #1 through the high-speed physical downlink shared channel (HS-PDSCH) to the mobile station 2-1.

In step f6, if the mobile station 2-1 safely receives the first packet #1 from the base station 1-1, then the mobile station 2-1 transmits the acknowledge signal (ACK) through the high-speed dedicated physical control channel (HS-DPCCH) to the base station 1-1.

In step f7, the mobile station 2-1 makes the changed transmission power control cycle (M1) into the original transmission power control cycle (M2).

In step f8, the base station 1-1 transmits a second packet #2 through the high-speed physical downlink shared channel (HS-PDSCH) to the mobile station 2-1.

In step f9, if the mobile station 2-1 safely receives the second packet #2 from the base station 1-1, then the mobile station 2-1 transmits the acknowledge signal (ACK) through the high-speed dedicated physical control channel (HS-DPCCH) to the base station 1-1.

In step f10, the base station 1-1 transmits a third packet #3 through the high-speed physical downlink shared channel (HS-PDSCH) to the mobile station 2-1.

In step f11, if the mobile station 2-1 safely receives the third packet #3 from the base station 1-1, then the mobile station 2-1 transmits the acknowledge signal (ACK) through the high-speed dedicated physical control channel (HS-DPCCH) to the base station 1-1.

In step f12, after the data transmission has been completed, the base station 1-1 sends the mobile station 2-1 a notice of end of data.

In step f13, upon receipt of the notice of end of data from the base station 1-1, the mobile station 2-1 is shifted from the above control mode into a normal control mode for controlling the transmission power of the up-link dedicated physical channel (UL-DPCH) based on all the transmit power control signals (TPC) transmitted from the link base stations in the soft handover. The above control mode controls the transmission power of the up-link dedicated physical channel (UL-DPCH) based on only the transmit power control signal (TPC) transmitted from the packet-transmitting base station 1-1. Instead of receipt of the notice of end of data, it is possible that if the mobile station 2-1 does not receive any packet from the base station 1-1 for a predetermined period of time, then the mobile station 2-1 is shifted from the above control mode into the normal control mode.

Figure 18:
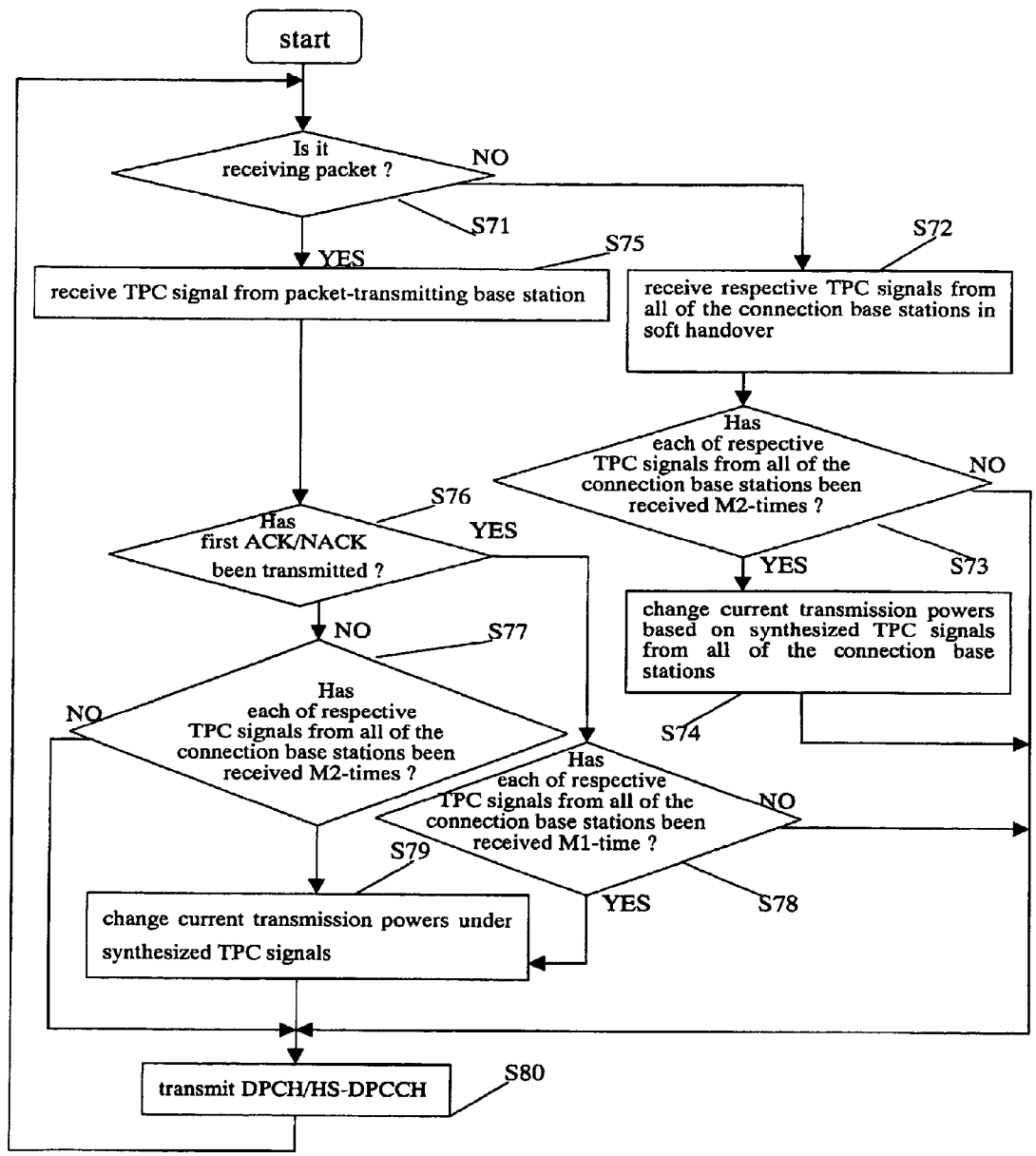
FIG. 18 is a flow chart illustrative of operations of the mobile station in the sixth embodiment in accordance with the present invention.

FIG. 18 is a flow chart illustrative of operations of the mobile station 2 in the sixth embodiment in accordance with the present invention. Each of the mobile stations 2-1, 2-2 and 2-3 will herein be referred to as a mobile station 2.

In step S71, it is verified that the mobile station 2 receives the transmit power control signal (TPC) transmitted from each of the link base stations 1-1 and 1-2.

In step S72, if the mobile station 2 is in other states, then the mobile station 2 does not change the transmission power until the mobile station 2 receives M2-times each of the respective transmit power control signals (TPC) from all of the link base stations. Namely, the mobile station 2 receives all the transmit power control signals (TPC) from all of the link base stations in the soft-handover.

In step S73, it is verified whether or not the mobile station 2 receives M2-times each of the respective transmit power control signals (TPC) from all of the link base stations.

In step S74, if the mobile station 2 receives M2-times each of the respective transmit power control signals (TPC) from all of the link base stations, then the mobile station 2 respectively synthesizes M2 of the received transmit power control signals (TPC) from each of the link base stations. The mobile station 2 changes the respectively current transmission powers Pdpch [dB] to the link base stations, based on the respective synthesized signals In step S75, the mobile station 2 is in a state of receiving the packet, then the mobile station 2.

In step S76, it is verified whether or not the mobile station 2 commences to receive a packet, but the mobile station 2 has not yet transmitted the first acknowledge/non-acknowledge signal (ACK/NACK).

In step S78, if the mobile station 2 has not yet transmitted the first acknowledge/non-acknowledge signal (ACK/NACK), then the mobile station 2 does not change the transmission power until the mobile station 2 receives M1-times the transmit power control signal (TPC) transmitted from the packet-transmitting base station 1-1. Namely, it is verified whether or not the mobile station 2 has received M1-times the transmit power control signal (TPC) transmitted from the packet-transmitting base station 1-1.

Normally, the mobile station 2-1 in the state of receiving the packet transmits the channel quality indicator (CQI), for which reason, the mobile station 2-1 receives M1-times the transmit power control signal (TPC) even before the mobile station 2-1 transmits the first acknowledge/non-acknowledge signal (ACK/NACK).

In step S78, it is verified that the mobile station 2-1 receives M1-times the transmit power control signals (TPC) transmitted from the packet-transmitting base station 1-1.

In step S79, if the mobile station 2-1 receives M1-times the transmit power control signals (TPC) transmitted from the packet-transmitting base station 1-1, then the mobile station 2-1 synthesizes M1 of the received transmit power control signals (TPC) and changes the current transmission power Pdpch [dB] based on the synthesized signal.

In step S77, if the mobile station 2-1 has already transmitted the first acknowledge/non-acknowledge signal (ACK/NACK), then the mobile station 2 does not change the transmission power until the mobile station 2 receives M2-times the transmit power control signal (TPC) transmitted from the packet-transmitting base station 1-1. Namely, it is verified whether or not the mobile station 2 has received M2-times the transmit power control signal (TPC) transmitted from the packet-transmitting base station 1-1.

In step S79, if the mobile station 2-1 receives M2-times the transmit power control signals (TPC) transmitted from the packet-transmitting base station 1-1, then the mobile station 2-1 synthesizes M2 of the received transmit power control signals (TPC) and changes the current transmission power Pdpch [dB] based on the synthesized signal.

It should be noted that M1 is smaller than M2.

In step S80, the mobile station 2 transmits the signal through the dedicated physical channel (DPCH) at the renewed transmission power Pdpch [dB] and also transmits the signal through the high-speed dedicated physical control channel (HS-DPCCH) at a transmission power Phs (=Pdpch+.Phs), where .Phs is a predetermined off-set power for the high-speed dedicated physical control channel (HS-DPCCH).

The mobile station 2 repeats the above-described sequential processes in a predetermined cycle.

In accordance with this embodiment, it is possible to shorten the transmission power control cycle, for example, in case that after the mobile station 2-1 has received plural transmit power control signals (TPC), then the mobile station 2-1 renews the transmission power based on a synthesized signal of the received plural transmit power control signals (TPC). This improves the responsibility to the requests for the transmission power control based on the transmit power control signal (TPC). This makes it easy to achieve and realize that the current transmission power is increased up to the target transmission power within a limited time period defined from commencement of receiving packet to transmission of the acknowledge/non-acknowledge signal (ACK/NACK), thereby improving the receiving quality of the acknowledge/non-acknowledge signal (ACK/NACK) at the packet-transmitting base station 1-1.

In accordance with this embodiment, after the mobile station 2 has transmitted the first acknowledge/non-acknowledge signal (ACK/NACK), then the mobile station 2 makes the changed transmission power control cycle into the normal or original transmission power control cycle. The plural received transmit power control signals (TPC) are synthesized about when the current transmission power has been increased up to the target transmission power, thereby improving the reliability of the transmit power control signals (TPC) and also reducing the probability of erroneous receipt of the transmit power control signals (TPC).

In accordance with the foregoing first to sixth embodiments, an appropriate off-set power is added to the current transmission power even if the mobile stations 2-1, 2-2 and 2-3 are in the soft handover state and establish the dedicated physical channels (DPCH) to the plural base stations 1-1 and 1-2, and the propagation loss of the packet-transmitting base station 1-1 is larger than the propagation loss of the other link base stations, thereby reducing the interference on the up-link and allowing the packet-transmitting base station 1-1 to receive the acknowledge/non-acknowledge signal (ACK/NACK) at a high receiving quality.

Further, it is possible to reduce the probability that the current transmission power is erroneously decreased due to the undesired erroneous receipt of the transmit power control signal (TPC) even the packet-transmitting base station has transmitted the request for power-up. The allows the packet-transmitting base station 1-1 to receive the acknowledge/non-acknowledge signal (ACK/NACK) at a high receiving quality.

Furthermore, it is possible to shorten the transmission power control cycle and improve the responsibility to the request for power-up from the packet-transmitting base station, so as to allow the packet-transmitting base station 1-1 to receive the acknowledge/non-acknowledge signal (ACK/NACK) at a high receiving quality, thereby reducing a probability of erroneous receipt of the acknowledge/non-acknowledge signal (ACK/NACK) and avoiding any packet loss, resulting in an improvement in the throughput.

After the mobile station commences to receive the packet, then the mobile station decides an index to be used for reducing the error rate of the acknowledge/non-acknowledge signal (ACK/NACK), thereby to reduce the process load to the mobile station.

Consequently, the mobile station adds the off-set power to the current transmission power for acceleration of the transmission power increase up to the target power level necessary for causing that the measured signal-to-interference-ratio (SIR) at the packet-transmitting base station reaches the predetermined target signal-to-interference-ratio (SIR), thereby improving the receiving quality of the acknowledge/non-acknowledge signal (ACK/NACK) at the packet-transmitting base station.

Although the invention has been described above in connection with several preferred embodiments therefor, it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the appended claims.

What is claimed is:

1. A cellular system including:
   at least one mobile station being concurrently linked through dedicated physical channels to plural link base stations in a soft handover state,
   wherein at least one packet-transmitting base station of said plural base stations transmits at least one packet through a common channel to said at least one mobile station,
   wherein said at least one mobile station includes:
     a first transmission power control function of controlling a current transmission power of an up-link of said dedicated physical channel based on a first transmission power control information included in down-links of said dedicated physical channels of said plural link base stations; and
     a second transmission power control function of controlling said current transmission power of said up-link of said dedicated physical channel based on a second transmission power control information included in a down-link of said dedicated physical channel of said at least one packet-transmitting base station,
   wherein if said at least one mobile station is placed in a first state to receive a packet from said at least one packet-transmitting base station, then said at least one mobile station activates said second transmission power control function, and wherein if said at least one mobile station is placed in a second state other than said first state, then said at least one mobile station activates said first transmission power control function, and
   wherein after said at least one mobile station has been placed in said first state, then said second transmission power control function decides an off-set power based on said second transmission power control information and increases said current transmission power by said off-set power, before said at least one mobile station will make a first transmission of an acknowledge/non-acknowledge signal to said at least one packet-transmitting base station.

2. The system as claimed in claim 1, wherein said second transmission power control function adjusts said off-set power based on said second transmission power control information which includes a difference in propagation loss between said at least one packet-transmitting base station and other of said plural link base stations in said soft handover state than said at least one packet-transmitting base station.

3. The system as claimed in claim 1, wherein said second transmission power control function adjusts said off-set power based on said second transmission power control information which includes the number of times of receipt of a first transmission power control signal indicating a request for power-increase from said at least one packet-transmitting base station for a predetermined period of time.

4. The system as claimed in claim 1, wherein said second transmission power control function adjusts said off-set power based on said second transmission power control information which includes a receiving quality of a common pilot signal transmitted from each of said plural link base stations in said soft handover state.

5. The system as claimed in claim 1, wherein said second transmission power control function adjusts said off set power based on said second transmission power control information which includes the number of times of receipt of a null transmit power control signal having a receiving quality lower than a predetermined threshold receiving quality level transmitted from said at least one packet-transmitting base station.

6. The system as claimed in claim 1, wherein after said at least one mobile station has activated said second transmission power control function, then said second transmission power control function decides said off-set power.

7. The system as claimed in claim 1, wherein after said at least one mobile station has activated said second transmission power control function, then said second transmission power control function decides said off-set power based on a difference between said second transmission power control information received from said at least one packet-transmitting base station and other transmission power control information received from other of said plural link base stations in said soft handover state than said at least one packet-transmitting base station.

8. The system as claimed in claim 1, wherein said at least one packet-transmitting base station includes an additional function of increasing, by a predetermined secondary off-set power, a secondary transmission power for transmitting said second transmit power control information to said at least one mobile station, after said at least one packet-transmitting base station has transmitted an advance notice of packet transmission to said at least one mobile station.

9. The system as claimed in claim 8, wherein said additional function further decreases said increased secondary transmission power by said predetermined secondary off-set power, after said at least one packet-transmitting base station has received a notice of completion of packet transmission from said at least one mobile station.

10. The system as claimed in claim 1, wherein said second transmission power control information includes a first number of times of receipt of a first transmission power control signal which indicates a first request for power-increase, and a second number of times of receipt of a second transmission power control signal which indicates a second request for power-decrease,
wherein said second transmission power control function counts said first and second transmission power control signals separately, and said second transmission power control function compares said first number counted to a predetermined first threshold value and also compares said second number counted to a predetermined second threshold value, and
wherein if said first number counted exceeds said predetermined first threshold value, then said second transmission power control function increases said current transmission power, and if said number counted exceeds said predetermined second threshold value, then said second transmission power control function decreases said current transmission power.

11. The system as claimed in claim 10, wherein said predetermined first threshold value is smaller than said predetermined second threshold value.

12. The system as claimed in claim 1, wherein said second transmission power control information includes a transmission power control signal transmitted from said at least one packet-transmitting base station, and said second transmission power control function measures a receiving quality of said transmission power control signal and compares said receiving quality measured to a predetermined threshold value, and
wherein if said receiving quality measured is lower than said predetermined threshold value, then said second transmission power control function considers that said transmission power control signal indicates a first request for power-increase, and said second transmission power control function increases said current transmission power.

13. The system as claimed in claim 1, wherein said first transmission power control information includes a first synthesized signal from a first number of first transmission control signals received said first number of times and transmitted from each of said plural link base stations, and said first transmission power control function controls said current transmission power based on said first synthesized signal,
wherein said second transmission power control information includes a second synthesized signal from a second number of second transmission control signals received said second number of times and transmitted from said at least one packet-transmitting base station as well as a third synthesized signal from said first number of second transmission control signals received said first number of times and transmitted from said at least one packet-transmitting base station, and said second transmission power control function controls said current transmission power based on said second synthesized signal before said at least one mobile station will make said first transmission of said acknowledge/non-acknowledge signal to said at least one packet-transmitting base station, and said second transmission power control function controls said current transmission power based on said third synthesized signal after said at least one mobile station has made said first transmission of said acknowledge/non-acknowledge signal to said at least one packet-transmitting base station.

14. The system as claimed in claim 13, wherein said second number is smaller than said first number.

15. A cellular system including:
at least one mobile station being concurrently linked through dedicated physical channels to plural link base stations in a soft handover state,
wherein at least one packet-transmitting base station of said plural base stations transmits at least one packet through a common channel to said at least one mobile station,
wherein said at least one mobile station includes:
a first transmission power control function of controlling a current transmission power of an up-link of said dedicated physical channel based on a first transmission power control information included in down-links of said dedicated physical channels of said plural link base stations; and
a second transmission power control function of controlling said current transmission power of said up-link of said dedicated physical channel based on a second transmission power control information included in a down-link of said dedicated physical channel of said at least one packet-transmitting base station,
wherein if said at least one mobile station is placed in a first state to receive a packet from said at least one packet-transmitting base station, then said at least one mobile station activates said second transmission power control function, and wherein if said at least one mobile station is placed in a second state other than said first state, then said at least one mobile station activates said first transmission power control function, and
wherein if said at least one mobile station is placed in said first state, then said second transmission power control function makes a packet-transmitting-base-station priority control for controlling said current transmission power based on a transmission control signal which indicates at least one of a first request for power-increase and a second request for power-decrease and which has been transmitted from said at least one packet-transmitting base station, and wherein if said at least one mobile station is placed in said second state, then said second transmission power control function makes a power-down priority control for decreasing said current transmission power by a predetermined power level if at least one of transmission power control signals transmitted from all of said plural link base stations indicates a request for power-decease, and for increasing said current transmission power by another predetermined power level if all of said transmission power control signals transmitted from all of said plural link base stations indicate another request for power-increase.

16. A mobile station included in a cellular system and being concurrently linked through dedicated physical channels to plural link base stations in a soft handover state, said mobile station including:

a first transmission power control function of controlling a current transmission power of an up-link of said dedicated physical channel based on a first transmission power control information included in down-links of said dedicated physical channels of said plural link base stations; and a second transmission power control function of controlling said current transmission power of said up-link of said dedicated physical channel based on a second transmission power control information included in a down-link of said dedicated physical channel of at least one packet-transmitting base station of said plural base stations, and said at least one packet-transmitting base station transmitting at least one packet through a common channel to said mobile station, wherein if said mobile station is placed in a first state to receive a packet from said at least one packet-transmitting base station, then said mobile station activates said second transmission power control function, wherein if said mobile station is placed in a second state other than said first state, then said mobile station activates said first transmission power control function, and wherein after said mobile station has been placed in said first state, then said second transmission power control function decides an off-set power based on said second transmission power control information and increases said current transmission power by said off-set power, before said mobile station will make a first transmission of an acknowledge/non-acknowledge signal to said at least one packet-transmitting base station.

17. The mobile station as claimed in claim 16, wherein said second transmission power control function adjusts said off-set power based on said second transmission power control information which includes a difference in propagation loss between said at least one packet-transmitting base station and other of said plural link base stations in said soft handover state than said at least one packet-transmitting base station.

18. The mobile station as claimed in claim 16, wherein said second transmission power control function adjusts said off-set power based on said second transmission power control information which includes the number of times of receipt of a first transmission power control signal indicating a request for power-increase from said at least one packet-transmitting base station for a predetermined period of time.

19. The mobile station as claimed in claim 16, wherein said second transmission power control function adjusts said off-set power based on said second transmission power control information which includes a receiving quality of a common pilot signal transmitted from each of said plural link base stations in said soft handover state.

20. The mobile station as claimed in claim 16, wherein said second transmission power control function adjusts said off-set power based on said second transmission power control information which includes the number of times of receipt of a null transmit power control signal having a receiving quality lower than a predetermined threshold receiving quality level transmitted from said at least one packet-transmitting base station.

21. The mobile station as claimed in claim 16, wherein after said mobile station has activated said second transmission power control function, then said second transmission power control function decides said off-set power.

22. The mobile station as claimed in claim 16, wherein after said mobile station has activated said second transmission power control function, then said second transmission power control function decides said off-set power based on a difference between said second transmission power control information received from said at least one packet-transmitting base station and other transmission power control information received from other of said plural link base stations in said soft handover state than said at least one packet-transmitting base station.

23. The mobile station as claimed in claim 16, wherein said second transmission power control information includes a first number of times of receipt of a first transmission power control signal which indicates a first request for power-increase, and a second number of times of receipt of a second transmission power control signal which indicates a second request for power-decrease, wherein said second transmission power control function counts said first and second transmission power control signals separately, and said second transmission power control function compares said first number counted to a predetermined first threshold value and also compares said second number counted to a predetermined second threshold value, and wherein if said first number counted exceeds said predetermined first threshold value, then said second transmission power control function increases said current transmission power, and if said number counted exceeds said predetermined second threshold value, then said second transmission power control function decreases said current transmission power.

24. The mobile station as claimed in claim 23, wherein said predetermined first threshold value is smaller than said predetermined second threshold value.

25. The mobile station as claimed in claim 16, wherein said second transmission power control information includes a transmission power control signal transmitted from said at least one packet-transmitting base station, and said second transmission power control function measures a receiving quality of said transmission power control signal and compares said receiving quality measured to a predetermined threshold value, and wherein if said receiving quality measured is lower than said predetermined threshold value, then said second transmission power control function considers that said transmission power control signal indicates a first request for power-increase, and said second transmission power control function increases said current transmission power.

26. The mobile station as claimed in claim 16, wherein said first transmission power control information includes a first synthesized signal from a first number of first transmission control signals received said first number of times and transmitted from each of said plural link base stations, and said first transmission power control function controls said current transmission power based on said first synthesized signal, wherein said second transmission power control information includes a second synthesized signal from a second number of second transmission control signals received said second number of times and transmitted from said at least one packet-transmitting base station as well as a third synthesized signal from said first number of second transmission control signals received said first number of times and transmitted from said at least one packet-transmitting base station, and said second transmission power control function controls said current transmission power based on said second synthesized signal before said mobile station will make said first transmission of said acknowledge/non-acknowledge signal to said at least one packet-transmitting base station, and said second transmission power control function controls said current transmission power based on said third synthesized signal after said mobile station has made said first transmission of said acknowledge/non-acknowledge signal to said at least one packet-transmitting base station.

27. The mobile station as claimed in claim 16, wherein said second number is smaller than said first number.

28. A mobile station included in a cellular system and being concurrently linked through dedicated physical channels to plural link base stations in a soft handover state, said mobile station including:

a first transmission power control function of controlling a current transmission power of an up-link of said dedicated physical channel based on a first transmission power control information included in down-links of said dedicated physical channels of said plural link base stations; and a second transmission power control function of controlling said current transmission power of said up-link of said dedicated physical channel based on a second transmission power control information included in a down-link of said dedicated physical channel of at least one packet-transmitting base station of said plural base stations, and said at least one packet-transmitting base station transmitting at least one packet through a common channel to said mobile station, wherein if said mobile station is placed in a first state to receive a packet from said at least one packet-transmitting base station, then said mobile station activates said second transmission power control function, wherein if said mobile station is placed in a second state other than said first state, then said mobile station activates said first transmission power control function, wherein if said mobile station is placed in said first state, then said second transmission power control function makes a packet-transmitting-base-station priority control for controlling said current transmission power based on a transmission control signal which indicates at least one of a first request for power-increase and a second request for power-decrease and which has been transmitted from said at least one packet-transmitting base station, and wherein if said mobile station is placed in said second state, then said second transmission power control function makes a power-down priority control for decreasing said current transmission power by a predetermined power level if at least one of transmission power control signals transmitted from all of said plural link base stations indicates a request for power-decease, and for increasing said current transmission power by another predetermined power level if all of said transmission power control signals transmitted from all of said plural link base stations indicate another request for power-increase.

29. A method of controlling a transmission power in a cellular system including at least one mobile station being concurrently linked through dedicated physical channels to plural link base stations in a soft handover state, and at least one packet-transmitting base station of said plural base stations transmitting at least one packet through a common channel to said at least one mobile station, said method comprising:

a first transmission power control process for controlling a current transmission power of an up-link of said dedicated physical channel based on a first transmission power control information included in down-links of said dedicated physical channels of said plural link base stations; and a second transmission power control process for controlling said current transmission power of said up-link of said dedicated physical channel based on a second transmission power control information included in a down-link of said dedicated physical channel of said at least one packet-transmitting base station, wherein if said at least one mobile station is placed in a first state to receive a packet from said at least one packet-transmitting base station, then said at least one mobile station performs said second transmission power control process, wherein if said at least one mobile station is placed in a second state other than said first state, then said at least one mobile station performs said first transmission power control process, and wherein after said at least one mobile station has been placed in said first state, then said second transmission power control process decides an off-set power based on said second transmission power control information and increases said current transmission power by said off-set power, before said at least one mobile station will make a first transmission of an acknowledge/non-acknowledge signal to said at least one packet-transmitting base station.

30. The method as claimed in claim 29, wherein said second transmission power control process adjusts said off-set power based on said second transmission power control information which includes a difference in propagation loss between said at least one packet-transmitting base station and other of said plural link base stations in said soft handover state than said at least one packet-transmitting base station.

31. The method as claimed in claim 29, wherein said second transmission power control process adjusts said off-set power based on said second transmission power control information which includes the number of times of receipt of a first transmission power control signal indicating a request for power-increase from said at least one packet-transmitting base station for a predetermined period of time.

32. The method as claimed in claim 29, wherein said second transmission power control process adjusts said off-set power based on said second transmission power control information which includes a receiving quality of a common pilot signal transmitted from each of said plural link base stations in said soft handover state.

33. The method as claimed in claim 29, wherein said second transmission power control process adjusts said off-set power based on said second transmission power control information which includes the number of times of receipt of a null transmit power control signal having a receiving quality lower than a predetermined threshold receiving quality level transmitted from said at least one packet-transmitting base station.

34. The method as claimed in claim 29, wherein after said at least one mobile station has performed said second transmission power control process, then said second transmission power control process decides said off-set power.

35. The method as claimed in claim 29, wherein after said at least one mobile station has performed said second transmission power control process, then said second transmission power control process decides said off-set power based on a difference between said second transmission power control information received from said at least one packet-transmitting base station and other transmission power control information received from other of said plural link base stations in said soft handover state than said at least one packet-transmitting base station.

36. The method as claimed in claim 29, further including an additional process performed by said at least one packet-transmitting base station for increasing, by a predetermined secondary off-set power, a secondary transmission power for transmitting said second transmit power control information to said at least one mobile station, after said at least one packet-transmitting base station has transmitted an advance notice of packet transmission to said at least one mobile station.

37. The method as claimed in claim 36, wherein said additional process further decreases said increased secondary transmission power by said predetermined secondary off-set power, after said at least one packet-transmitting base station has received a notice of completion of packet transmission from said at least one mobile station.

38. The method as claimed in claim 29, wherein said second transmission power control information includes a first number of times of receipt of a first transmission power control signal which indicates a first request for power-increase, and a second number of times of receipt of a second transmission power control signal which indicates a second request for power-decrease,
wherein said second transmission power control process counts said first and second transmission power control signals separately, and said second transmission power control process compares said first number counted to a predetermined first threshold value and also compares said second number counted to a predetermined second threshold value, and
wherein if said first number counted exceeds said predetermined first threshold value, then said second transmission power control process increases said current transmission power, and if said number counted exceeds said predetermined second threshold value, then said second transmission power control process decreases said current transmission power.

39. The method as claimed in claim 38, wherein said predetermined first threshold value is smaller than said predetermined second threshold value.

40. The method as claimed in claim 29, wherein said second transmission power control information includes a transmission power control signal transmitted from said at least one packet-transmitting base station, and second transmission power control process measures a receiving quality of said transmission power control signal and compares said receiving quality measured to a predetermined threshold value, and
wherein if said receiving quality measured is lower than said predetermined threshold value, then said second transmission power control process considers that said transmission power control signal indicates a first request for power-increase, and said second transmission power control process increases said current transmission power.

41. The method as claimed in claim 29, wherein said first transmission power control information includes a first synthesized signal from a first number of first transmission control signals received said first number of times and transmitted from each of said plural link base stations, and said first transmission power control process controls said current transmission power based on said first synthesized signal,
wherein said second transmission power control information includes a second synthesized signal from a second number of second transmission control signals received said second number of times and transmitted from said at least one packet-transmitting base station as well as a third synthesized signal from said first number of second transmission control signals received said first number of times and transmitted from said at least one packet-transmitting base station, and said second transmission power control process controls said current transmission power based on said second synthesized signal before said at least one mobile station will make said first transmission of said acknowledge/non-acknowledge signal to said at least one packet-transmitting base station, and said second transmission power control process controls said current transmission power based on said third synthesized signal after said at least one mobile station has made said first transmission of said acknowledge/non-acknowledge signal to said at least one packet-transmitting base station.

42. The method as claimed in claim 41, wherein said second number is smaller than said first number.

43. A method of controlling a transmission power in a cellular system including at least one mobile station being concurrently linked through dedicated physical channels to plural link base stations in a soft handover state, and at least one packet-transmitting base station of said plural base stations transmitting at least one packet through a common channel to said at least one mobile station, said method comprising:
a first transmission power control process for controlling a current transmission power of an up-link of said dedicated physical channel based on a first transmission power control information included in down-links of said dedicated physical channels of said plural link base stations; and
a second transmission power control process for controlling said current transmission power of said up-link of said dedicated physical channel based on a second transmission power control information included in a down-link of said dedicated physical channel of said at least one packet-transmitting base station,
wherein if said at least one mobile station is placed in a first state to receive a packet from said at least one packet-transmitting base station, then said at least one mobile station performs said second transmission power control process, wherein if said at least one mobile station is placed in a second state other than said first state, then said at least one mobile station performs said first transmission power control process, wherein if said at least one mobile station is placed in said first state, then said second transmission power control process makes a packet-transmitting-base-station priority control for controlling said current transmission power based on a transmission control signal which indicates at least one of a first request for power-increase and a second request for power-decrease and which has been transmitted from said at least one packet-transmitting base station, and wherein if said at least one mobile station is placed in said second state, then said second transmission power control process makes a power-down priority control for decreasing said current transmission power by a predetermined power level if at least one of transmission power control signals transmitted from all of said plural link base stations indicates a request for power-decease, and for increasing said current transmission power by another predetermined power level if all of said transmission power control signals transmitted from all of said plural link base stations indicate another request for power-increase.

44. A computer-readable recording medium having recorded thereon a computer program, the computer program implementing, when executed, a method of controlling a transmission power in a cellular system including at least one mobile station being concurrently linked through dedicated physical channels to plural link base stations in a soft handover state, and at least one packet-transmitting base station of said plural base stations transmitting at least one packet through a common channel to said at least one mobile station, and wherein said computer program includes:
a first transmission power control process for controlling a current transmission power of an up-link of said dedicated physical channel based on a first transmission power control information included in down-links of said dedicated physical channels of said plural link base stations; and
a second transmission power control process for controlling said current transmission power of said up-link of said dedicated physical channel based on a second transmission power control information included in a down-link of said dedicated physical channel of said at least one packet-transmitting base station, wherein if said at least one mobile station is placed in a first state to receive a packet from said at least one packet-transmitting base station, then said at least one mobile station performs said second transmission power control process, wherein if said at least one mobile station is placed in a second state other than said first state, then said at least one mobile station performs said first transmission power control process, and wherein after said at least one mobile station has been placed in said first state, then said second transmission power control process decides an off-set power based on said second transmission power control information and increases said current transmission power by said off-set power, before said at least one mobile station will make a first transmission of an acknowledge/non-acknowledge signal to said at least one packet-transmitting base station.

45. The computer program as claimed in claim 44, wherein said second transmission power control process adjusts said off-set power based on said second transmission power control information which includes a difference in propagation loss between said at least one packet-transmitting base station and other of said plural link base stations in said soft handover state than said at least one packet-transmitting base station.

46. The computer program as claimed in claim 44, wherein said second transmission power control process adjusts said off-set power based on said second transmission power control information which includes the number of times of receipt of a first transmission power control signal indicating a request for power-increase from said at least one packet-transmitting base station for a predetermined period of time.

47. The computer program as claimed in claim 44, wherein said second transmission power control process adjusts said off-set power based on said second transmission power control information which includes a receiving quality of a common pilot signal transmitted from each of said plural link base stations in said soft handover state.

48. The computer program as claimed in claim 44, wherein said second transmission power control process adjusts said off-set power based on said second transmission power control information which includes the number of times of receipt of a null transmit power control signal having a receiving quality lower than a predetermined threshold receiving quality level transmitted from said at least one packet-transmitting base station.

49. The computer program as claimed in claim 44, wherein after said at least one mobile station has performed said second transmission power control process, then said second transmission power control process decides said off-set power.

50. The computer program as claimed in claim 44, wherein after said at least one mobile station has performed said second transmission power control process, then said second transmission power control process decides said off-set power based on a difference between said second transmission power control information received from said at least one packet-transmitting base station and other transmission power control information received from other of said plural link base stations in said soft handover state than said at least one packet-transmitting base station.

51. The computer program as claimed in claim 44, further including an additional process performed by said at least one packet-transmitting base station for increasing, by a predetermined secondary off-set power, a secondary transmission power for transmitting said second transmit power control information to said at least one mobile station, after said at least one packet-transmitting base station has transmitted an advance notice of packet transmission to said at least one mobile station.

52. The computer program as claimed in claim 51, wherein said additional process further decreases said increased secondary transmission power by said predetermined secondary off-set power, after said at least one packet-transmitting base station has received a notice of completion of packet transmission from said at least one mobile station.

53. The computer program as claimed in claim 44, wherein said second transmission power control information includes a first number of times of receipt of a first transmission power control signal which indicates a first request for power-increase, and a second number of times of receipt of a second transmission power control signal which indicates a second request for power-decrease,
- wherein said second transmission power control process counts said first and second transmission power control signals separately, and said second transmission power control process compares said first number counted to a predetermined first threshold value and also compares said second number counted to a predetermined second threshold value, and
- wherein if said first number counted exceeds said predetermined first threshold value, then said second transmission power control process increases said current transmission power, and if said number counted exceeds said predetermined second threshold value, then said second transmission power control process decreases said current transmission power.

54. The computer program as claimed in claim 53, wherein said predetermined first threshold value is smaller than said predetermined second threshold value.

55. The computer program as claimed in claim 44, wherein said second transmission power control information includes a transmission power control signal transmitted from said at least one packet-transmitting base station, and said second transmission power control process measures a receiving quality of said transmission power control signal and compares said receiving quality measured to a predetermined threshold value, and
- wherein if said receiving quality measured is lower than said predetermined threshold value, then said second transmission power control process considers that said transmission power control signal indicates a first request for power-increase, and said second transmission power control process increases said current transmission power.

56. The computer program as claimed in claim 44, wherein said first transmission power control information includes a first synthesized signal from a first number of first transmission control signals received said first number of times and transmitted from each of said plural link base stations, and said first transmission power control process controls said current transmission power based on said first synthesized signal,
- wherein said second transmission power control information includes a second synthesized signal from a second number of second transmission control signals received said second number of times and transmitted from said at least one packet-transmitting base station as well as a third synthesized signal from said first number of second transmission control signals received said first number of times and transmitted from said at least one packet-transmitting base station, and said second transmission power control process controls said current transmission power based on said second synthesized signal before said at least one mobile station will make said first transmission of said acknowledge/non-acknowledge signal to said at least one packet-transmitting base station, and said second transmission power control process controls said current transmission power based on said third synthesized signal after said at least one mobile station has made said first transmission of said acknowledge/non-acknowledge signal to said at least one packet-transmitting base station.

57. The computer program as claimed in claim 56, wherein said second number is smaller than said first number.

58. A computer-readable recording medium having recorded thereon a computer program, the computer program implementing, when executed, a method of controlling a transmission power in a cellular system including at least one mobile station being concurrently linked through dedicated physical channels to plural link base stations in a soft handover state, and at least one packet-transmitting base station of said plural base stations transmitting at least one packet through a common channel to said at least one mobile station, and
- wherein said computer program includes:
  - a first transmission power control process for controlling a current transmission power of an up-link of said dedicated physical channel based on a first transmission power control information included in down-links of said dedicated physical channels of said plural link base stations; and
  - a second transmission power control process for controlling said current transmission power of said up-link of said dedicated physical channel based on a second transmission power control information included in a down-link of said dedicated physical channel of said at least one packet-transmitting base station,
- wherein if said at least one mobile station is placed in a first state to receive a packet from said at least one packet-transmitting base station, then said at least one mobile station performs said second transmission power control process,
- wherein if said at least one mobile station is placed in a second state other than said first state, then said at least one mobile station performs said first transmission power control process,
- wherein if said at least one mobile station is placed in said first state, then said second transmission power control process makes a packet-transmitting-base-station priority control for controlling said current transmission power based on a transmission control signal which indicates at least one of a first request for power-increase and a second request for power-decrease and which has been transmitted from said at least one packet-transmitting base station, and
- wherein if said at least one mobile station is placed in said second state, then said second transmission power control process makes a power-down priority control for decreasing said current transmission power by a predetermined power level if at least one of transmission power control signals transmitted from all of said plural link base stations indicates a request for power-decease, and for increasing said current transmission power by another predetermined power level if all of said transmission power control signals transmitted from all of said plural link base stations indicate another request for power-increase.

* * * * *